US011180262B2

(12) United States Patent
Rix et al.

(10) Patent No.: US 11,180,262 B2
(45) Date of Patent: Nov. 23, 2021

(54) DEVICES, SYSTEMS AND METHODS FOR REFUELING AIR VEHICLES

(71) Applicant: ISRAEL AEROSPACE INDUSTRIES LTD., Lod (IL)

(72) Inventors: Ohad Rix, Nes Ziona (IL); Joshua Gur, Jerusalem (IL); Michael Litvak, Tel Aviv (IL); Elie Koskas, Rosh Haayin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 74 days.

(21) Appl. No.: 16/537,084

(22) Filed: Aug. 9, 2019

(65) Prior Publication Data

US 2019/0359345 A1    Nov. 28, 2019

Related U.S. Application Data

(63) Continuation of application No. 14/370,017, filed as application No. PCT/IL2013/050016 on Jan. 3, 2013, now Pat. No. 10,427,801.

(Continued)

(30) Foreign Application Priority Data

Jan. 4, 2012 (IL) .......................................... 217364
Jan. 4, 2012 (IL) .......................................... 217365

(51) Int. Cl.
*B64D 39/06* (2006.01)
*B64D 39/00* (2006.01)
(Continued)

(52) U.S. Cl.
CPC ............... *B64D 39/06* (2013.01); *B64D 3/00* (2013.01); *B64D 39/00* (2013.01); *B64D 39/04* (2013.01); *G05D 1/0094* (2013.01); *G05D 1/101* (2013.01)

(58) Field of Classification Search
CPC .......... B64D 39/06; B64D 3/00; B64D 39/04; B64D 39/00; G05D 1/0094; G05D 1/101; B64C 2201/82
See application file for complete search history.

(56) References Cited

U.S. PATENT DOCUMENTS 439,876 A    11/1890   Hill
2,582,609 A   1/1952   Steele
(Continued)

FOREIGN PATENT DOCUMENTS

DE    1188374 B    3/1965
DE   10013751 A1   10/2001
(Continued)

OTHER PUBLICATIONS

Author Unknow, PMD Technologies, PMD[vision] CamCube 3.0, http://www.pmdtec.com/products-services/pmdvisionr-cameras/pmdvisionr-camcube-30, Jun. 15, 2009.
(Continued)

*Primary Examiner* — Medhat Badawi
*Assistant Examiner* — Vicente Rodriguez
(74) *Attorney, Agent, or Firm* — Dorsey & Whitney LLP

(57) ABSTRACT

A variety of refueling devices, systems and methods are disclosed for use in in-flight refueling. In one example one such device is towed by a tanker aircraft via a fuel hose at least during in-flight refueling, and has a boom member with a boom axis. The boom member enables fuel to be transferred from the fuel hose to a receiver aircraft along the boom axis during in-flight refueling. The device maintains a
(Continued)

desired non-zero angular disposition between the boom axis and a forward direction at least when the refueling device is towed by the tanker aircraft in the forward direction via the fuel hose.

22 Claims, 41 Drawing Sheets

Related U.S. Application Data

(60) Provisional application No. 61/728,985, filed on Nov. 21, 2012.

(51) Int. Cl.
  *B64D 39/04* (2006.01)
  *B64D 3/00* (2006.01)
  *G05D 1/00* (2006.01)
  *G05D 1/10* (2006.01)

(56) References Cited

U.S. PATENT DOCUMENTS

| | | |
|---|---|---|
| 2,663,523 A * | 12/1953 | Leisy ............... B64D 39/00 244/135 A |
| 2,879,017 A | 3/1959 | Smith |
| 2,941,761 A | 6/1960 | Cox et al. |
| 2,954,190 A | 9/1960 | Le Clair |
| 3,038,632 A | 6/1962 | Brown et al. |
| 3,059,895 A | 10/1962 | Brown |
| 3,091,419 A | 5/1963 | Mosher |
| 3,144,954 A | 8/1964 | Brown et al. |
| 3,391,817 A | 7/1968 | Francis |
| 3,547,402 A | 12/1970 | Millar |
| 3,587,618 A | 6/1971 | Kenyon |
| 3,691,730 A | 9/1972 | Hickey et al. |
| 3,693,915 A | 9/1972 | Ulanovsky |
| 3,710,549 A | 1/1973 | Nichols et al. |
| 3,747,873 A | 7/1973 | Layer et al. |
| 3,788,040 A | 1/1974 | Bragg et al. |
| 3,830,307 A | 8/1974 | Bragg et al. |
| 3,948,626 A | 4/1976 | Bragg |
| 3,954,123 A | 5/1976 | Duckworth, Jr. |
| 4,014,481 A | 3/1977 | Daikeler et al. |
| 4,072,283 A | 2/1978 | Weiland |
| 4,098,427 A | 7/1978 | Duckworth, Jr. |
| 4,126,162 A | 11/1978 | Clark et al. |
| 4,129,270 A | 12/1978 | Robinson et al. |
| 4,157,976 A | 6/1979 | Jones et al. |
| 4,189,059 A | 2/1980 | Shaw |
| 4,228,246 A | 10/1980 | Taub et al. |
| 4,231,536 A | 11/1980 | Ishimitsu et al. |
| 4,282,909 A | 8/1981 | Clark et al. |
| 4,294,203 A | 10/1981 | Jones |
| 4,295,617 A | 10/1981 | Oswell et al. |
| 4,366,669 A | 1/1983 | Jones |
| 4,377,243 A | 3/1983 | Shaw et al. |
| D274,548 S | 7/1984 | Shaw |
| 4,467,937 A | 8/1984 | Shaw |
| D275,512 S | 9/1984 | Shaw |
| D275,984 S | 10/1984 | Shaw |
| 4,586,683 A * | 5/1986 | Kerker ............... B64D 39/00 244/135 A |
| 4,607,313 A | 8/1986 | Shaw et al. |
| 4,806,167 A | 2/1989 | Raythatha |
| 4,830,673 A | 5/1989 | Jones et al. |
| 4,879,856 A | 11/1989 | Jones et al. |
| 5,167,340 A | 12/1992 | Shaw |
| 5,246,131 A | 9/1993 | Shaw et al. |
| 5,258,931 A | 11/1993 | Hassler, Jr. |
| 5,326,052 A | 7/1994 | Krispin et al. |
| 5,499,784 A | 3/1996 | Crabere et al. |
| 5,541,405 A | 7/1996 | Hassler, Jr. et al. |
| 5,781,151 A | 7/1998 | Stratton |
| 5,785,276 A | 7/1998 | Ruzicka |
| 5,906,336 A | 5/1999 | Eckstein |
| 6,141,546 A | 10/2000 | Thomas et al. |
| 6,192,245 B1 | 2/2001 | Jones et al. |
| D439,876 S | 4/2001 | Simonov et al. |
| 6,348,087 B1 | 2/2002 | Aslin |
| 6,604,711 B1 | 8/2003 | Stevens et al. |
| 6,644,594 B1 | 11/2003 | Hunn et al. |
| 6,729,359 B2 | 5/2004 | Jones |
| 6,739,359 B2 | 5/2004 | Jones et al. |
| 6,819,982 B2 | 11/2004 | Doane |
| 6,966,525 B1 | 11/2005 | Schroeder |
| 6,994,294 B2 * | 2/2006 | Saggio, III ............ B64D 39/00 141/382 |
| 6,997,013 B2 | 2/2006 | Jones |
| 6,997,434 B2 | 2/2006 | Scott |
| 7,007,894 B1 | 3/2006 | Takacs et al. |
| 7,013,905 B2 | 3/2006 | Jones et al. |
| 7,021,586 B2 | 4/2006 | Bolling |
| 7,028,947 B2 | 4/2006 | Burns |
| 7,048,231 B2 | 5/2006 | Jones |
| 7,082,906 B2 | 8/2006 | Jones et al. |
| 7,097,139 B2 | 8/2006 | Schroeder |
| 7,137,597 B2 | 11/2006 | Schuster et al. |
| 7,137,598 B2 | 11/2006 | Von Thal |
| 7,172,156 B1 | 2/2007 | Jones |
| 7,172,157 B2 | 2/2007 | Jones |
| 7,185,854 B2 * | 3/2007 | Von Thal ............... B64D 39/00 244/135 A |
| 7,198,229 B2 | 4/2007 | Schroeder |
| 7,219,510 B2 | 5/2007 | Jones |
| 7,246,774 B2 | 7/2007 | Von Thal et al. |
| 7,275,718 B2 | 10/2007 | Saggio, Iii et al. |
| 7,281,687 B2 | 10/2007 | Schroeder |
| 7,464,736 B2 | 12/2008 | Jones et al. |
| 7,481,237 B2 | 1/2009 | Jones et al. |
| 7,516,920 B2 | 4/2009 | Schroeder |
| 7,562,847 B2 | 7/2009 | Jones |
| 7,798,449 B2 | 9/2010 | Small et al. |
| 8,056,860 B2 | 11/2011 | Small et al. |
| 9,150,311 B2 | 10/2015 | Rix |
| 9,315,277 B2 * | 4/2016 | Foo ............... B64D 39/02 |
| 9,457,912 B2 | 10/2016 | Rix |
| 9,573,696 B2 | 2/2017 | Rix |
| 2003/0136874 A1 | 7/2003 | Gjerdrum |
| 2004/0102876 A1 | 5/2004 | Doane |
| 2005/0166983 A1 | 8/2005 | Shaw et al. |
| 2005/0224657 A1 | 10/2005 | Bolling |
| 2006/0000949 A1 | 1/2006 | Schroeder |
| 2006/0043241 A1 | 3/2006 | Schuster et al. |
| 2006/0060709 A1 | 3/2006 | Thal |
| 2006/0060710 A1 | 3/2006 | Takacs et al. |
| 2006/0065785 A1 | 3/2006 | Enig et al. |
| 2006/0208132 A1 * | 9/2006 | Jones ............... B64D 39/00 244/10 |
| 2006/0292018 A1 | 12/2006 | Jones |
| 2007/0023570 A1 | 2/2007 | Bernard |
| 2007/0084968 A1 | 4/2007 | Thal et al. |
| 2007/0108339 A1 | 5/2007 | Plotkin |
| 2008/0234884 A1 | 9/2008 | Von Thal |
| 2010/0001124 A1 * | 1/2010 | Feldmann ............ B64D 39/06 244/58 |
| 2010/0025536 A1 | 2/2010 | Schroeder |
| 2010/0321011 A1 | 12/2010 | Small et al. |
| 2011/0180666 A1 | 7/2011 | Speer et al. |

FOREIGN PATENT DOCUMENTS

| | | |
|---|---|---|
| EP | 2045186 A1 | 4/2009 |
| GB | 781059 A | 8/1957 |
| GB | 1085040 A | 9/1967 |
| GB | 2237251 A | 5/1991 |
| GB | 2303418 A | 2/1997 |
| GB | 2304498 A | 3/1997 |
| GB | 2313740 A | 12/1997 |
| GB | 2318252 A | 4/1998 |
| GB | 2320646 A | 6/1998 |

(56) References Cited

FOREIGN PATENT DOCUMENTS

| GB | 2347068 A | 8/2000 |
|---|---|---|
| GB | 2364207 A | 1/2002 |
| WO | 9001199 A1 | 2/1990 |

OTHER PUBLICATIONS

Author Unknown, Eye R640, "High Resolution Miniaturized Infrared Engine", http://www.opgal.com/products.php?actions=show&id=51, Nov. 29, 2010.
Author Unknown, MESA Imaging, SwissRanger SR40000, http://www.mesa-imaging.ch/prodview4K.php, Nov. 29, 2010.
Author Unknown, Miricle, Camera and Cores, http://www.thermoteknix.com/brochures/miricle/high_resolution_miniature_infared_thermal_imagers/miricle_lo_res.pdf, Nov. 29, 2010.
Author Unknown, Photon HRC Camera Core, Miniature, Light Weight 640 MWIR Cooled Camera Core, http://flir.com/uploadedFiles/PhotonHRC.pdf, Nov. 29, 2010.
International Preliminary Report on Patentability from International Application No. PCT/IL2013/050016 dated May 30, 2014.
International Search Report and Written Opinion from International Application No. PCT/IL2013/050016 dated Dec. 16, 2013.
Klass, "Towed Decoys, Flares Displayed", Electronic Warfare, available at least as of Dec. 5, 2017, 1 page.

\* cited by examiner

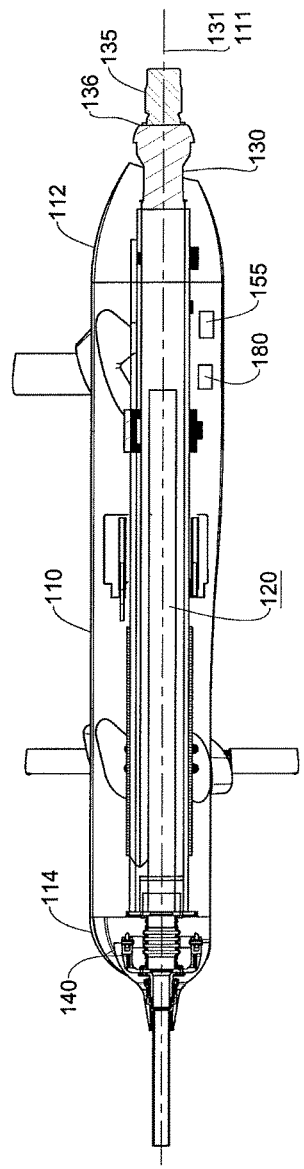
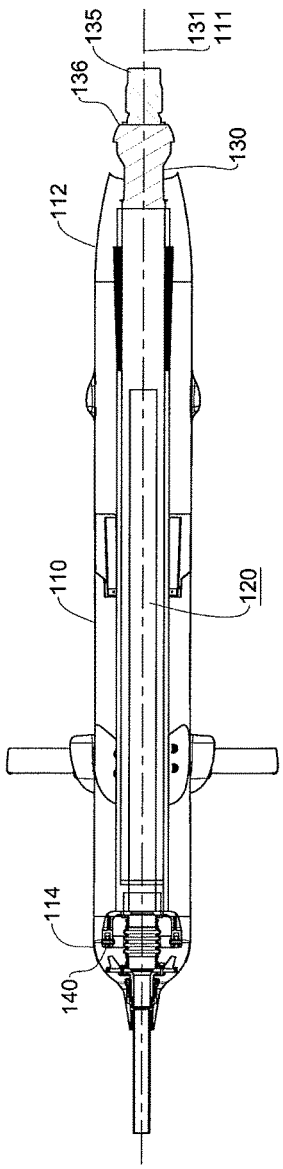

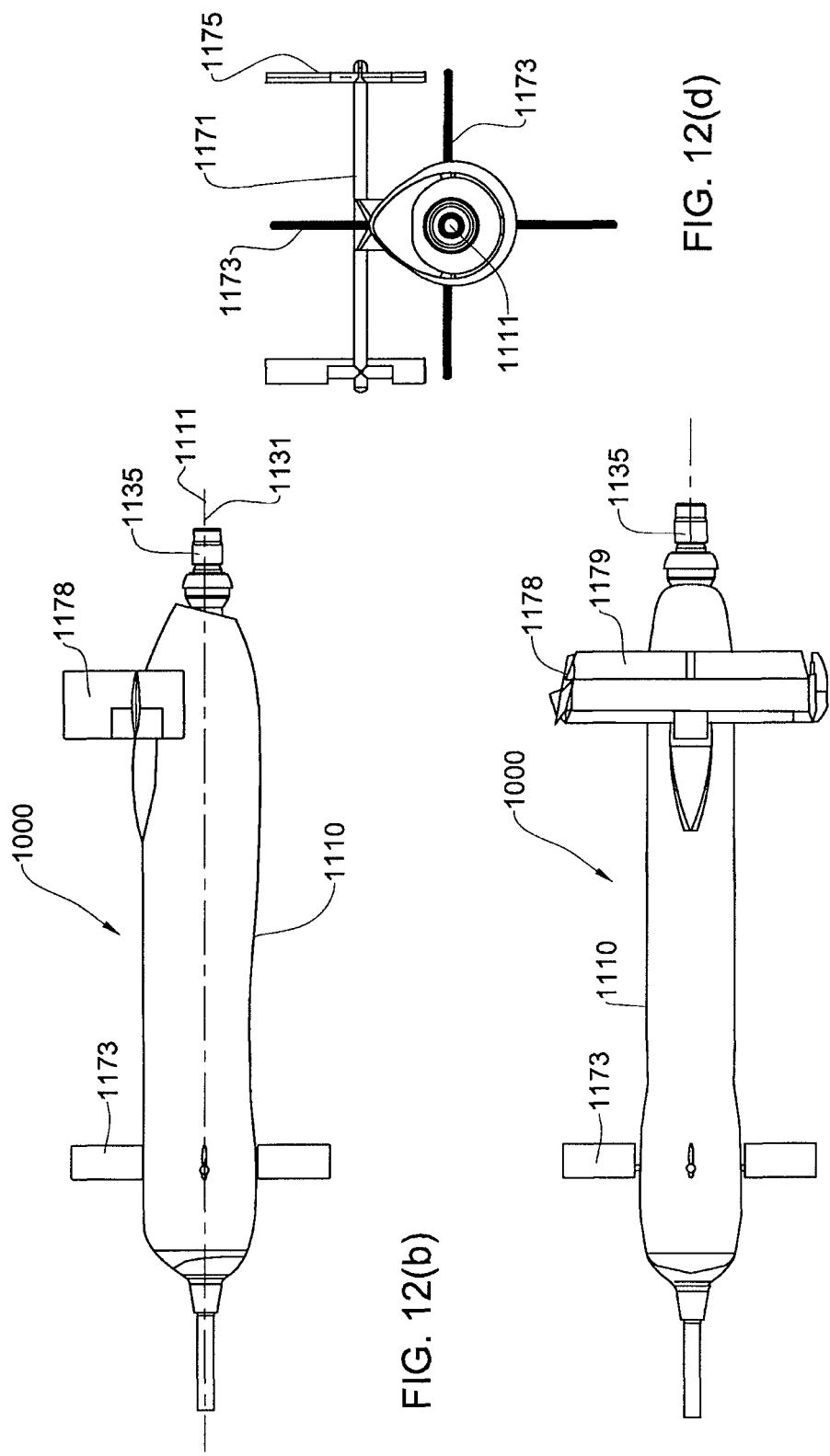

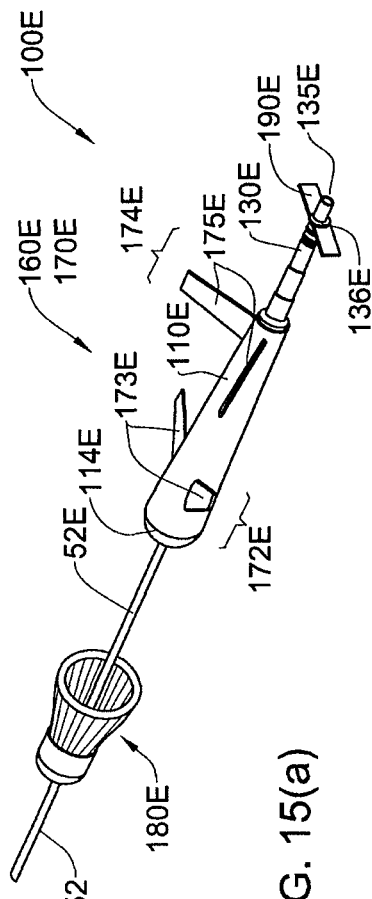
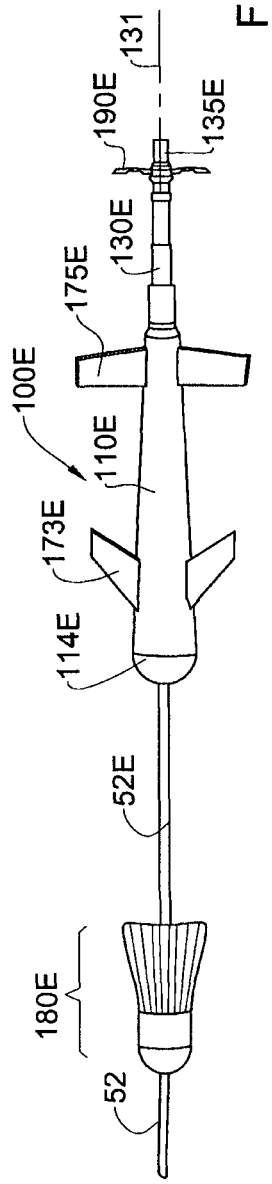
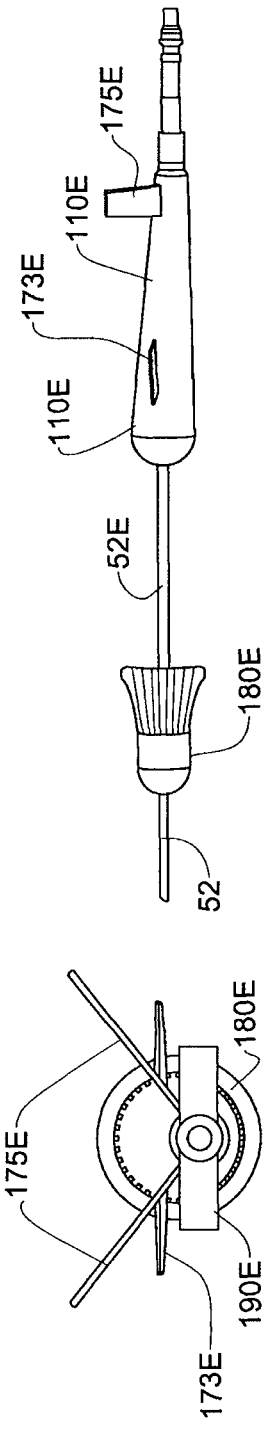
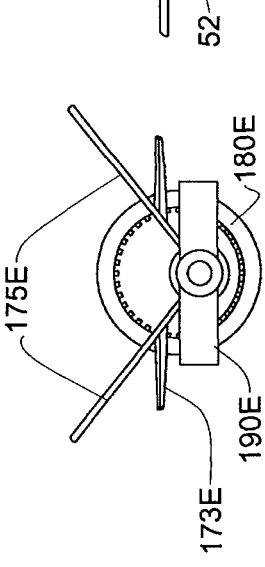
FIG. 15(a)
FIG. 15(b)
FIG. 15(c)
FIG. 15(d)

DEVICES, SYSTEMS AND METHODS FOR REFUELING AIR VEHICLES

TECHNOLOGICAL FIELD

The presently disclosed subject matter relates to systems and methods for refueling air vehicles, especially aircraft, in particular for refueling aircraft during flight.

BACKGROUND

Airborne refueling (also referred to interchangeably herein as air refueling, in-flight refueling, air to air refueling (AAR), aerial refueling, tanking, and the like) refers to the process of transferring fuel from a tanker aircraft to a receiver aircraft during flight.

Two types of airborne refueling systems are currently in use for refueling airborne military aircraft:
the so-called "hose and drogue" system, used by the US Navy and many non-US air forces;
the so-called "boom and receptacle" or "flying boom" system, used by the US Air Force, and also used by Israel, Turkey and the Netherlands.

In the hose and drogue system, the refueling aircraft is provided with one or more non-rigid refueling lines, at the end of each of which there is a drogue which functions as a stabilizer and includes a receptacle, while the receiver aircraft is fitted with a probe that is configured for engaging with the receptacle. In use, the drogue is not actively controlled, but rather aligns itself freely in the airflow aft of the tanker. The pilot of the receiver aircraft controls the flight path thereof to ensure engaging contact between the probe and the receptacle. Thereafter, the receiver aircraft is refueled via the refueling line and probe.

In the boom and receptacle system, the tanker includes a so-called "flying boom", which is a rigid tube that telescopes outwardly and is gimbaled to the rear of the tanker aircraft, and is otherwise retracted into the tanker fuselage when not in use. The boom carries a fuel line and comprises a fuel transfer nozzle at the end thereof, and the boom is equipped with adjustable flight control surfaces. Once the tanker and receiver aircraft are in close proximity and flying in formation, with the receiver aircraft at a position behind the tanker within an air refueling envelope (i.e., safe limits of travel for the boom with respect to the receiver aircraft and within which contact between the receiving aircraft and the boom is safe), a dedicated operator in the tanker controls the position of the boom via the control surfaces, and inserts the end of the boom including the nozzle into a receptacle provided on an upper part of the receiving aircraft, ensuring proper mating between the nozzle and receptacle, after which fuel transfer can begin. During refueling, and while the boom is engaged with the receptacle, the pilot of the receiver aircraft must continue to fly within the air refueling envelope, and if the receiver aircraft approaches these limits the operator in the tanker requires the receiver aircraft pilot to correct the position thereof, and if necessary the boom is disconnected to prevent accidents. All current tankers of this type carry a single boom and can refuel a single receiver aircraft of this type at a time.

In addition, there are some tankers that comprise a flying boom system and at least one hose and drogue system as well, and are commonly known as Multi-Point Refueling Systems (MPRS). In some cases a hose and drogue system is provided at the aircraft tail, and thus only this system or the flying boom system may be used at any one time. In other cases, two under-wing hose and drogue pods, known as Wing Air Refueling Pods (WARPs), can be provided, one under each wing, in addition to the flying boom system.

U.S. Pat. No. 7,562,847 discloses an autonomous in-flight refueling hose end unit including a first end configured to be coupled to a fuel hose of a tanker aircraft. and a second end configured to be coupled to receiver aircraft and adjustable control surfaces, and a flight control computer autonomously controls the control surfaces to fly the refueling hose end into contact with the receiver aircraft.

In GB 2,237,251 an in flight refueling apparatus mountable on a tanker aircraft has a probe receptor coupled with a fuel line and is arranged to be deployed outboard of the aircraft, and can be provided on a drogue or a boom. In one mode, the apparatus is arranged to provide a parameter which is representative of the deviation of the path of the receptor from a predetermined initial path for actuating control means for changing automatically the position of the receptor relative to the initial path. In another mode, a parameter which is representative of the relative angular position of the receptor with respect to the probe of an approaching refueling aircraft for actuating control means for changing automatically the relative angular position to achieve alignment of receptor and probe.

Additional references considered to be relevant as background to the presently disclosed subject matter are listed below: U.S. 2007/108,339, U.S. 2007/084,968, U.S. 2006/065,785, U.S. 2006/043,241, U.S. 2006/060,710, U.S. 2006/060,709, U.S. 2005/224,657, U.S. 2004/102,876, U.S. Pat. Nos. 7,097,139, 6,966,525, 6,994,294, 6,644,594, 5,906,336, 5,785,276, 5,499,784, 5,326,052, 4,282,909, 4,126,162, 4,072,283, 3,948,626, 3,091,419, 3,059,895, 2,954,190, 2,582,609, U.S. D 439,876, DE 100 13 751.

Acknowledgement of the above references herein is not to be inferred as meaning that these are in any way relevant to the patentability of the presently disclosed subject matter

GENERAL DESCRIPTION

In accordance with an aspect of the presently disclosed subject matter, there is provided a variety of refueling devices, systems and methods for use in in-flight refueling. In at least one example one such device is towed by a tanker aircraft via a fuel hose at least during in-flight refueling, and has a boom member with a boom axis. The boom member enables fuel to be transferred from the fuel hose to a receiver aircraft along the boom axis during in-flight refueling. The device maintains a desired non-zero angular disposition between the boom axis and a forward direction at least when the refueling device is towed by the tanker aircraft in the forward direction via the fuel hose.

In accordance with an aspect of the presently disclosed subject matter, there is provided a method for controlling in-flight refueling of a receiver aircraft having a fuel receptacle, comprising automatically steering a refueling device to an engagement enabling position, including:
(i) repeatedly determining a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;
(ii) repeatedly calculating steering commands based at least on the repeatedly determined spatial dispositions and characteristics of a spatial control system of the refueling device;

(iii) sending the steering commands to the spatial control system;

whereby at the engagement enabling position, the boom member of the refueling device is capable of engaging with the fuel receptacle to enable refueling of the receiver aircraft.

The method can optionally further comprise one or more of the features (c1) to (c15), in any desired combination or permutation:

(c1) providing an instruction to the refueling device, in response to its arriving at the engagement enabling position, causing the refueling device to move the boom member in a predetermined trajectory for automatically engaging with the fuel receptacle.

(c2) wherein the boom member has a boom axis and wherein at least a final part of the predetermined trajectory is parallel to the boom axis.

(c3) determining an engagement area specification condition; repeatedly calculating maneuvering instructions for the receiver aircraft based on the spatial dispositions and an engagement area specification; and invoking the automatic steering in response to meeting the engagement area specification condition.

(c4) wherein the refueling device is connected to a tanker aircraft by a fuel hose, and further comprising providing the maneuvering instructions to at least one of a pilot of the receiver aircraft pilot or a pilot of the tanker aircraft.

(c5) wherein providing the maneuvering instructions comprises activating a signaling system, optionally mounted on the refueling device or the tanker aircraft.

(c6) activating a force generating arrangement in the refueling device for generating force in the direction of the fuel receptacle of the receiver aircraft in response to receiving an engagement command for enabling refueling.

(c7) wherein the determining a spatial disposition comprises acquiring an image of said receiver aircraft, comparing the image with a reference image depicting a desired spatial disposition of the refueling device with respect to a receiver aircraft, and determining, based on the comparing, the spatial disposition of the refueling device with respect to the receiver aircraft.

(c8) wherein the spatial control system characteristics are related to operation parameters of aero-dynamic control surfaces of the refueling device.

(c9) wherein the aero-dynamic control surfaces are one or more vanes.

(c10) wherein the spatial control system characteristics are related to operation parameters of reaction control thrusters associated with the refueling device and capable of steering the refueling device.

(c11) wherein the engagement area specification condition is a spatial disposition within a pre-determined volume with respect to the refueling device and wherein the pre-determined volume is optionally substantially in the shape of a cube or substantially in the shape of a sphere.

(c12) wherein the calculating steering commands comprises obtaining data of an initial trail position of the refueling device and wherein the steering commands are based also on the data of an initial trail position.

(c13) wherein the data of an initial trail position includes at least one of a pitch angle of the refueling device, a yaw angle of the refueling device, and a deployment length of a fuel hose connecting the refueling device to the tanker aircraft.

(c14) wherein the automatic steering and the automatic engaging are performed autonomously by the refueling device.

(c15) wherein said refueling device is non-aircraft-fixed.

In accordance with an aspect of the presently disclosed subject matter, there is yet further provided a method for controlling in-flight refueling of a receiver aircraft having a fuel receptacle, comprising:

(a) automatically steering a refueling device to an engagement enabling position, including:
  (i) repeatedly determining a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;
  (ii) repeatedly calculating steering commands based at least on the repeatedly determined spatial dispositions and characteristics of a spatial control system of the refueling device;
  (iii) sending the steering commands to the spatial control system;
(b) providing an instruction to the refueling device, when it arrives at the engagement enabling position, for causing the refueling device to move the boom member along a predetermined trajectory for automatically engaging with the fuel receptacle.

The method can optionally further comprise one or more of the features (c2) and/or (c4) to (c15) detailed hereinabove and/or one or more of the features (d1) to (d2), in any desired combination or permutation:

(d1) invoking the automatic steering in response to a spatial disposition between the refueling device and the receiver aircraft meeting an engagement area specification condition.

(d2) repeatedly calculating maneuvering instructions for the receiver aircraft based on spatial dispositions and an engagement area specification, for establishing the spatial disposition between the refueling device and the receiver aircraft that meets the engagement area specification condition.

In accordance with an aspect of the presently disclosed subject matter, there is yet further provided a method for controlling in-flight refueling of a receiver aircraft having a fuel receptacle, comprising:

(a) repeatedly calculating maneuvering instructions for the receiver aircraft based on spatial dispositions of the receiver aircraft and an engagement area specification until an engagement area specification condition is met;
(b) in response to meeting the engagement area specification condition, automatically steering a refueling device to an engagement enabling position, including:
  (i) repeatedly determining a spatial disposition of the refueling device with respect to the receiver aircraft, the refueling device being capable of engaging and refueling the receiver aircraft via a boom member, when the refueling device arrives to the engagement enabling position at which the boom member is in a predetermined spaced and spatial relationship with respect to the fuel receptacle of the receiver aircraft;
  (ii) repeatedly calculating steering commands based at least on the repeatedly determined spatial dispositions and characteristics of a spatial control system of the refueling device;
  (iii) sending the steering commands to the spatial control system;
(c) providing an instruction to the refueling device, in response to its arriving at the engagement enabling position, causing the refueling device to move the boom member in a predetermined trajectory for automatically engaging with the fuel receptacle.

The method can optionally further comprise one or more of the features (c2) and/or (c4) to (c15) detailed hereinabove, in any desired combination or permutation.

In accordance with an aspect of the presently disclosed subject matter, there is yet further provided a system for controlling in-flight refueling of a receiver aircraft having a fuel receptacle, comprising a steering control module configured to automatically steer a refueling device to an engagement enabling position, including:

(i) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;

(ii) repeatedly calculate steering commands based at least on the repeatedly determined spatial dispositions and characteristics of a spatial control system of the refueling device;

(iii) send the steering commands to the spatial control system for automatically steering the refueling device to the engagement enabling position;

whereby at the engagement enabling position, the boom member of the refueling device is capable of engaging with the fuel receptacle to enable refueling of the receiver aircraft.

The system can optionally further comprise one or more of the features (c2) and/or (c8) to (c11) and/or (c13) and/or (c15) detailed hereinabove and/or one or more of the features (e1) to (e10), in any desired combination or permutation:

(e1) an engagement/disengagement module configured to provide an instruction to the refueling device, in response to its arriving at the engagement enabling position, causing the refueling device to move the boom member in a predetermined trajectory to automatically engage with the fuel receptacle.

(e2) a maneuvering instructions module configured to determine an engagement area specification condition, to repeatedly calculate maneuvering instructions for the receiver aircraft based on the spatial dispositions and an engagement area specification, and to invoke the steering control module to automatically steer the refueling device to the engagement enabling position in response to meeting the engagement area specification condition.

(e3) wherein the refueling device is connected to a tanker aircraft by a fuel hose, and wherein the maneuvering instructions module is further configured to provide the maneuvering instructions to at least one of a pilot of the receiver aircraft pilot or a pilot of the tanker aircraft.

(e4) wherein the maneuvering instructions module is configured to activate a signaling system in order to provide the maneuvering instructions, the signaling system is optionally mounted on the refueling device or the tanker aircraft.

(e5) wherein the engagement/disengagement module is further configured to activate a force generating arrangement in the refueling device for generating force in the direction of the fuel receptacle of the receiver aircraft in response to receiving an engagement command for enabling refueling.

(e6) wherein the steering control module is configured to perform the following steps in order to determine a spatial disposition: acquire an image of the receiver aircraft; compare the image with a reference image depicting a desired spatial disposition of the refueling device with respect to a receiver aircraft; determine, based on the comparing, the spatial disposition of the refueling device with respect to the receiver aircraft.

(e7) wherein the steering control module is further configured to obtain data of an initial trail position of the refueling device and wherein the calculate steering commands is based also on the obtained data of an initial trail position.

(e8) wherein at least the steering control module and the engagement/disengagement module are fitted within the refueling device for enabling autonomously controlling in-flight refueling of the receiver aircraft by the refueling device.

(e9) wherein at least the steering control module and the engagement/disengagement module are fitted within the receiver aircraft.

(e10) wherein at least the steering control module and the engagement/disengagement module are fitted within the tanker aircraft.

In accordance with an aspect of the presently disclosed subject matter, there is yet further provided a system for controlling in-flight refueling of a receiver aircraft having a fuel receptacle, comprising a steering control module configured to automatically steer a refueling device to an engagement enabling position, including:

(i) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;

(ii) repeatedly calculate steering commands based at least on the repeatedly determined spatial dispositions and characteristics of a spatial control system of the refueling device;

(iii) send the steering commands to the spatial control system for automatically steering the refueling device to the engagement enabling position;

the system further comprises an engagement/disengagement module configured to provide an instruction to the refueling device, when it arrives at the engagement enabling position, for causing the refueling device to move the boom member along a predetermined trajectory to automatically engage with the fuel receptacle.

The system can optionally further comprise one or more of the features (c2) and/or (c7) to (c11) and/or (c13) and/or (c15) and/or (e3) to (e5) and/or (e7) to (e10) detailed hereinabove and/or one or more of the features (f1) to (f2), in any desired combination or permutation:

(f1) a maneuvering instructions module configured to invoke the steering control module to automatically steer the refueling device to the engagement enabling position in response to meeting an engagement area specification condition.

(f2) wherein the maneuvering instructions module is further configured to repeatedly calculate maneuvering instructions for the receiver aircraft based on spatial dispositions and an engagement area specification, for establishing the spatial disposition between the refueling device and the receiver aircraft that meets the engagement area specification condition.

In accordance with an aspect of the presently disclosed subject matter, there is yet further provided a system for controlling in-flight refueling of a receiver aircraft having a fuel receptacle, comprising a maneuvering instructions module configured to repeatedly calculate maneuvering instructions for the receiver aircraft based on spatial dispositions of the receiver aircraft and an engagement area specification until an engagement area specification condition is met, and in response to meeting the engagement area specification condition, activate a steering control module; the steering control module is configured to automatically steer a refueling device to an engagement enabling position, including:

(i) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;

(ii) repeatedly calculate steering commands based at least on the repeatedly determined spatial dispositions and characteristics of a spatial control system of the refueling device;

(iii) send the steering commands to the spatial control system for automatically steering the refueling device to the engagement enabling position;

the system further comprises an engagement/disengagement module configured to provide an instruction to the refueling device, in response to its arriving at the engagement enabling position, causing the refueling device to move the boom member in a predetermined trajectory to automatically engage with the fuel receptacle.

The system can optionally further comprise one or more of the features (c2) and/or (c7) to (c11) and/or (c13) and/or (c15) and/or (e3) to (e5) and/or (e7) to (e10) detailed hereinabove, in any desired combination or permutation.

In accordance with an aspect of the presently disclosed subject matter, there is yet further provided a method for controlling in-flight refueling of a receiver aircraft having a fuel receptacle, comprising:

automatically maneuvering a refueling device to an engagement enabling position, including:

(i) repeatedly determining a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;

(ii) repeatedly calculating maneuvering commands based at least on the repeatedly determined spatial dispositions and characteristics of a spatial control system of the refueling device;

(iii) sending the maneuvering commands to the spatial control system;

whereby at the engagement enabling position, the boom member of the refueling device is capable of engaging with the fuel receptacle to enable refueling of the receiver aircraft.

The method can optionally further comprise one or more of the features (c1) and/or (c2) and/or (c5) and/or (c7) and/or (c9) and/or (e11) detailed hereinabove and/or one or more of the features (g1) to (g12), in any desired combination or permutation:

(g1) wherein the refueling device is non-aircraft-fixed and wherein the maneuvering commands are steering commands for steering the refueling device in six degrees of freedom.

(g2) wherein the refueling device is aircraft fixed and wherein the maneuvering commands are alignment commands for aligning the refueling device in three degrees of freedom.

(g3) determining an engagement area specification condition; repeatedly calculating maneuvering instructions for the receiver aircraft based on the spatial dispositions and an engagement area specification; and invoking the automatically maneuvering in response to meeting the engagement area specification condition.

(g4) providing the maneuvering instructions to at least one of a pilot of the receiver aircraft or a pilot of a tanker aircraft.

(g5) wherein the refueling device is non-aircraft-fixed and wherein the method further comprising activating a force generating arrangement in the refueling device for generating force in the direction of the fuel receptacle of the receiver aircraft in response to receiving an engagement command for enabling refueling.

(g6) wherein the determining a spatial disposition comprises: acquiring an image of the receiver aircraft, the image comprising depth data and electromagnetic data; comparing the depth data and the electromagnetic data with look-up tables comprising reference depth data and reference electromagnetic data relating to reference spatial dispositions with respect to the receiver aircraft; determining, based on the comparing, the spatial disposition of the refueling device with respect to the receiver aircraft.

(g7) wherein the image is acquired by a Light Detection And Ranging (LIDAR) unit.

(g8) wherein the refueling device is non-aircraft-fixed and wherein the spatial control system characteristics are related to operation parameters of aero-dynamic control surfaces of the refueling device.

(g9) wherein the refueling device is non-aircraft-fixed and wherein the spatial control system characteristics are related to operation parameters of reaction control thrusters associated with the refueling device and capable of maneuvering the refueling device.

(g10) wherein the calculating maneuvering commands comprises obtaining data of an initial trail position of the refueling device and wherein the maneuvering commands are based also on the data of the initial trail position.

(g11) wherein the refueling device is non-aircraft-fixed and wherein the data of the initial trail position includes at least one of a pitch angle of the refueling device, a yaw angle of the refueling device, and a deployment length of a fuel hose.

(g12) wherein the automatically maneuvering and the automatically engaging are performed autonomously by the refueling device.

In accordance with an aspect of the presently disclosed subject matter, there is yet further provided a method for controlling in-flight refueling of a receiver aircraft having a fuel receptacle, comprising:

(a) automatically maneuvering a refueling device to an engagement enabling position, including:

(i) repeatedly determining a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;
(ii) repeatedly calculating maneuvering commands based at least on the repeatedly determined spatial dispositions and characteristics of a spatial control system of the refueling device;
(iii) sending the maneuvering commands to the spatial control system;
(b) providing an instruction to the refueling device, when it arrives at the engagement enabling position, for causing the refueling device to move the boom member along a predetermined trajectory for automatically engaging with the fuel receptacle.

The method can optionally further comprise one or more of the features (c2) and/or (c5) and/or (c7) and/or (c9) and/or (e11) and/or (g1) to (g12) detailed hereinabove, in any desired combination or permutation.

In accordance with an aspect of the presently disclosed subject matter, there is yet further provided a method for controlling in-flight refueling of a receiver aircraft having a fuel receptacle, comprising:
(a) repeatedly calculating maneuvering instructions for the receiver aircraft based on spatial dispositions of the receiver aircraft and an engagement area specification until an engagement area specification condition is met;
(b) in response to meeting the engagement area specification condition, automatically maneuvering a refueling device to an engagement enabling position, including:
(i) repeatedly determining a spatial disposition of the refueling device with respect to the receiver aircraft, the refueling device being capable of engaging and refueling the receiver aircraft via a boom member, when the refueling device arrives to the engagement enabling position at which the boom member is in a predetermined spaced and spatial relationship with respect to the fuel receptacle of the receiver aircraft;
(ii) repeatedly calculating maneuvering commands based at least on the repeatedly determined spatial dispositions and characteristics of a spatial control system of the refueling device;
(iii) sending the maneuvering commands to the spatial control system;
(c) providing an instruction to the refueling device, in response to its arriving at the engagement enabling position, causing the refueling device to move the boom member in a predetermined trajectory for automatically engaging with the fuel receptacle.

The method can optionally further comprise one or more of the features (c2) and/or (c5) and/or (c7) and/or (c9) and/or (e11) and/or (g1) and/or (g2) and/or (g4) to (g12) detailed hereinabove, in any desired combination or permutation.

In accordance with an aspect of the presently disclosed subject matter, there is yet further provided a system for controlling in-flight refueling of a receiver aircraft having a fuel receptacle, comprising:
a steering control module configured to automatically maneuver a refueling device to an engagement enabling position, including:
(i) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;
(ii) repeatedly calculate maneuvering commands based at least on the repeatedly determined spatial dispositions and characteristics of a spatial control system of the refueling device;
(iii) send the maneuvering commands to the spatial control system for automatically maneuvering the refueling device to the engagement enabling position;
whereby at the engagement enabling position, the boom member of the refueling device is capable of engaging with the fuel receptacle to enable refueling of the receiver aircraft.

The system can optionally further comprise one or more of the features (c2) and/or (c9) and/or (c11) and/or (e4) and/or (e6) and/or (e8) to (e10) and/or (g1) to (g2) and/or (g7) and/or (g9) and/or (g11) detailed hereinabove and/or one or more of the features (h1) to (h7), in any desired combination or permutation:
(h1) an engagement/disengagement module configured to provide an instruction to the refueling device, in response to its arriving at the engagement enabling position, causing the refueling device to move the boom member in a predetermined trajectory to automatically engage with the fuel receptacle.
(h2) wherein the boom member has a boom axis and wherein at least a final part of the predetermined trajectory is parallel to the boom axis.
(h3) a maneuvering instructions module configured to determine an engagement area specification condition, to repeatedly calculate maneuvering instructions for the receiver aircraft based on the spatial dispositions and an engagement area specification, and to invoke the steering control module to automatically maneuver the refueling device to the engagement enabling position in response to meeting the engagement area specification condition.
(h4) wherein the maneuvering instructions module is further configured to provide the maneuvering instructions to at least one of a pilot of the receiver aircraft or a pilot of a tanker aircraft.
(h5) wherein the refueling device is non-aircraft-fixed and wherein the engagement/disengagement module is further configured to activate a force generating arrangement in the refueling device for generating force in the direction of the fuel receptacle of the receiver aircraft in response to receiving an engagement command for enabling refueling.
(h6) wherein the steering control module is configured to perform the following steps in order to determine a spatial disposition: acquiring an image of the receiver aircraft, the image comprising depth data and electromagnetic data; comparing the depth data and the electromagnetic data with look-up tables comprising reference depth data and reference electromagnetic data relating to reference spatial dispositions with respect to the receiver aircraft; determining, based on the comparing, the spatial disposition of the refueling device with respect to the receiver aircraft.
(h7) wherein the steering control module is further configured to obtain data of an initial trail position of the refueling device and wherein the calculate maneuvering commands is based also on the obtained data of the initial trail position.

In accordance with an aspect of the presently disclosed subject matter, there is yet further provided a system for controlling in-flight refueling of a receiver aircraft having a fuel receptacle, comprising:
a steering control module configured to automatically maneuver a refueling device to an engagement enabling position, including:

(i) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;

(ii) repeatedly calculate maneuvering commands based at least on the repeatedly determined spatial dispositions and characteristics of a spatial control system of the refueling device;

(iii) send the maneuvering commands to the spatial control system for automatically maneuvering the refueling device to the engagement enabling position;

the system further comprises an engagement/disengagement module configured to provide an instruction to the refueling device, when it arrives at the engagement enabling position, for causing the refueling device to move the boom member along a predetermined trajectory to automatically engage with the fuel receptacle.

The system can optionally further comprise one or more of the features (c2) and/or (c9) and/or (e11) and/or (e4) and/or (e6) and/or (e8) to (e10) and/or (g1) to (g2) and/or (g7) and/or (g9) and/or (g11) and/or (h2) to (h7) detailed hereinabove, in any desired combination or permutation.

In accordance with an aspect of the presently disclosed subject matter, there is yet further provided a system for controlling in-flight refueling of a receiver aircraft having a fuel receptacle, comprising:

a maneuvering instructions module configured to repeatedly calculate maneuvering instructions for the receiver aircraft based on spatial dispositions of the receiver aircraft and an engagement area specification until an engagement area specification condition is met, and in response to meeting the engagement area specification condition, activate a steering control module;

the steering control module is configured to automatically maneuver a refueling device to an engagement enabling position, including:

(i) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;

(ii) repeatedly calculate maneuvering commands based at least on the repeatedly determined spatial dispositions and characteristics of a spatial control system of the refueling device;

(iii) send the maneuvering commands to the spatial control system for automatically maneuvering the refueling device to the engagement enabling position;

the system further comprises an engagement/disengagement module configured to provide an instruction to the refueling device, in response to its arriving at the engagement enabling position, causing the refueling device to move the boom member in a predetermined trajectory to automatically engage with the fuel receptacle.

The system can optionally further comprise one or more of the features (c2) and/or (c9) and/or (e11) and/or (e4) and/or (e6) and/or (e8) to (e10) and/or (g1) to (g2) and/or (g7) and/or (g9) and/or (g11) and/or (h2) and/or (h4) to (h7) detailed hereinabove, in any desired combination or permutation.

In accordance with an aspect of the presently disclosed subject matter, there is yet further provided a non-aircraft-fixed refueling device for use in in-flight refueling operation between a tanker aircraft and a receiver aircraft, comprising:

a selectively steerable body configured for being towed by the tanker aircraft via a fuel hose at least during in-flight refueling, and comprising a boom member having a boom axis and configured to enable fuel to be transferred from the fuel hose to the receiver aircraft along the boom axis during the in-flight refueling operation;

a controller configured for selectively maneuvering the body to an engagement enabling position spaced with respect to the receiver aircraft and for aligning the boom axis in an engagement enabling orientation at the spaced position, and for subsequently moving the boom member along the boom axis towards the receiver aircraft for enabling fuel communication therebetween.

In accordance with an aspect of the presently disclosed subject matter, there is provided a method for controlling in-flight refueling of a receiver aircraft having a fuel receptacle, comprising automatically aligning a refueling device at an engagement enabling position, including:

(i) repeatedly determining a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;

(ii) repeatedly calculating alignment commands based at least on the repeatedly determined spatial dispositions and characteristics of a spatial control system of the refueling device;

(iii) sending the alignment commands to the spatial control system;

whereby at the engagement enabling position, the boom member of the refueling device is capable of engaging with the fuel receptacle to enable refueling of the receiver aircraft.

The method can optionally further comprise one or more of the features (c1) to (c3) and/or (c5) and/or (c7) and/or (c11) detailed hereinabove and/or one or more of the features (i1) to (i6), in any desired combination or permutation:

(i1) wherein the maneuvering commands are alignment commands for aligning said refueling device in three degrees of freedom.

(i2) providing the maneuvering instructions to at least one of a pilot of the receiver aircraft pilot or a pilot of the tanker aircraft.

(i3) determining an engagement area specification condition; repeatedly calculating maneuvering instructions for said receiver aircraft based on said spatial dispositions and an engagement area specification; and invoking said automatically aligning in response to meeting said engagement area specification condition.

(i4) wherein the calculating alignment commands comprises obtaining data of an initial trail position of the refueling device and wherein the alignment commands are based also on the data of an initial trail position.

(i5) wherein the automatic aligning and the automatic engaging are performed autonomously by the refueling device.

(i6) wherein said refueling device is aircraft fixed.

In accordance with an aspect of the presently disclosed subject matter, there is yet further provided a method for controlling in-flight refueling of a receiver aircraft having a fuel receptacle, comprising:
- (a) automatically aligning a refueling device at an engagement enabling position, including:
  - (i) repeatedly determining a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;
  - (ii) repeatedly calculating alignment commands based at least on the repeatedly determined spatial dispositions and characteristics of a spatial control system of the refueling device;
  - (iii) sending the alignment commands to the spatial control system;
- (b) providing an instruction to the refueling device, when it arrives at the engagement enabling position, for causing the refueling device to move the boom member along a predetermined trajectory for automatically engaging with the fuel receptacle.

The method can optionally further comprise one or more of the features (c2) and/or (c5) and/or (c7) and/or (c11) and/or (i1) to (i6) detailed hereinabove and/or feature (l1), in any desired combination or permutation:

(l1) invoking the automatic aligning in response to a spatial disposition between the refueling device and the receiver aircraft meeting an engagement area specification condition.

In accordance with an aspect of the presently disclosed subject matter, there is yet further provided a method for controlling in-flight refueling of a receiver aircraft having a fuel receptacle, comprising:
- (a) repeatedly calculating maneuvering instructions for the receiver aircraft based on spatial dispositions of the receiver aircraft and an engagement area specification until an engagement area specification condition is met;
- (b) in response to meeting the engagement area specification condition, automatically aligning a refueling device at an engagement enabling position, including:
  - (i) repeatedly determining a spatial disposition of the refueling device with respect to the receiver aircraft, the refueling device being capable of engaging and refueling the receiver aircraft via a boom member, when the refueling device arrives to the engagement enabling position at which the boom member is in a predetermined spaced and spatial relationship with respect to the fuel receptacle of the receiver aircraft;
  - (ii) repeatedly calculating alignment commands based at least on the repeatedly determined spatial dispositions and characteristics of a spatial control system of the refueling device;
  - (iii) sending the alignment commands to the spatial control system;
- (c) providing an instruction to the refueling device, in response to its arriving at the engagement enabling position, causing the refueling device to move the boom member in a predetermined trajectory for automatically engaging with the fuel receptacle.

The method can optionally further comprise one or more of the features (c2) and/or (c5) and/or (c7) and/or (c11) and/or (i1) to (i2) and/or (i4) to (i6) detailed hereinabove, in any desired combination or permutation.

In accordance with an aspect of the presently disclosed subject matter, there is yet further provided a system for controlling in-flight refueling of a receiver aircraft having a fuel receptacle, comprising a steering control module configured to automatically align a refueling device at an engagement enabling position, including:
- (iv) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;
- (v) repeatedly calculate alignment commands based at least on the repeatedly determined spatial dispositions and characteristics of a spatial control system of the refueling device;
- (vi) send the alignment commands to the spatial control system for automatically steering the refueling device to the engagement enabling position;
- whereby at the engagement enabling position, the boom member of the refueling device is capable of engaging with the fuel receptacle to enable refueling of the receiver aircraft.

The system can optionally further comprise one or more of the features (c2) and/or (c11) and/or (i1) to (i2) and/or (i4) to (i6) detailed hereinabove and/or feature (o1), in any desired combination or permutation:

(o1) a maneuvering instructions module configured to determine an engagement area specification condition, to repeatedly calculate maneuvering instructions for the receiver aircraft based on the spatial dispositions and an engagement area specification, and to invoke the steering control module to automatically align the refueling device at the engagement enabling position in response to meeting the engagement area specification condition.

In accordance with an aspect of the presently disclosed subject matter, there is yet further provided a system for controlling in-flight refueling of a receiver aircraft having a fuel receptacle, comprising a steering control module configured to automatically align a refueling device at an engagement enabling position, including:
- (iv) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;
- (v) repeatedly calculate alignment commands based at least on the repeatedly determined spatial dispositions and characteristics of a spatial control system of the refueling device;
- (vi) send the alignment commands to the spatial control system for automatically steering the refueling device to the engagement enabling position;
- the system further comprises an engagement/disengagement module configured to provide an instruction to the refueling device, when it arrives at the engagement enabling position, for causing the refueling device to move the boom member along a predetermined trajectory to automatically engage with the fuel receptacle.

The system can optionally further comprise one or more of the features (c2) and/or (c7) and/or (e11) and/or (e4) to (e5) and/or (e8) to (e10) and/or (f2) and/or (i1) to (i2) and/or (i4) to (i6) detailed hereinabove and/or one or more of the features (p1) to (p2), in any desired combination or permutation:

(p1) wherein the steering control module is further configured to obtain data of an initial trail position of the refueling device and wherein the calculate alignment commands is based also on the obtained data of an initial trail position.

(p2) a maneuvering instructions module configured to invoke the steering control module to automatically align the refueling device to the engagement enabling position in response to meeting an engagement area specification condition.

In accordance with an aspect of the presently disclosed subject matter, there is yet further provided a system for controlling in-flight refueling of a receiver aircraft having a fuel receptacle, comprising a maneuvering instructions module configured to repeatedly calculate maneuvering instructions for the receiver aircraft based on spatial dispositions of the receiver aircraft and an engagement area specification until an engagement area specification condition is met, and in response to meeting the engagement area specification condition, activate a steering control module; the steering control module is configured to automatically align a refueling device at an engagement enabling position, including:

(iv) repeatedly determine a spatial disposition of the refueling device with respect to the receiver aircraft, the refueling device being capable of engaging and refueling the receiver aircraft via a boom member, when the device arrives to the engagement enabling position at which the boom member is in a predetermined spaced and spatial relationship with respect to the fuel receptacle of the receiver aircraft;

(v) repeatedly calculate alignment commands based at least on the repeatedly determined spatial dispositions and characteristics of a spatial control system of the refueling device;

(vi) send the alignment commands to the spatial control system for automatically steering the refueling device to the engagement enabling position;

the system further comprises an engagement/disengagement module configured to provide an instruction to the refueling device, in response to its arriving at the engagement enabling position, causing the refueling device to move the boom member in a predetermined trajectory to automatically engage with the fuel receptacle.

The system can optionally further comprise one or more of the features (c2) and/or (c7) and/or (c11) and/or (e4) to (e5) and/or (e8) to (e10) and/or (i1) to (i2) and/or (i4) to (i6) and/or (p1) detailed hereinabove, in any desired combination or permutation.

In accordance with an aspect of the presently disclosed subject matter, there is yet further provided a refueling device for use in in-flight refueling operation between a tanker aircraft and a receiver aircraft, comprising a selectively steerable body configured for being towed by a tanker aircraft via a fuel hose at least during in-flight refueling, and comprising a boom member having a boom axis and configured to enable fuel to be transferred from the fuel hose to a receiver aircraft along the boom axis during the in-flight refueling operation; a controller configured for selectively steering the body to a engagement enabling position spaced with respect to the receiver aircraft and for aligning the boom axis in an engagement enabling orientation at the spaced position, and for subsequently moving the boom member along the boom axis towards the receiver aircraft for enabling fuel communication therebetween.

According to at least one aspect of the presently disclosed subject matter, there is provided a refueling device for use in in-flight refueling operation between a tanker aircraft and a receiver aircraft, comprising:

a selectively steerable body configured for being towed by a tanker aircraft via a fuel hose at least during in-flight refueling, and comprising a boom member having a boom axis and configured to enable fuel to be transferred from said fuel hose to a receiver aircraft along said boom axis during said in-flight refueling operation;

a controller configured for selectively steering the body to an engagement enabling position spaced with respect to the receiver aircraft and for aligning said boom axis in an engagement enabling orientation at said spaced position, and for subsequently moving the boom member along said boom axis towards the receiver aircraft for enabling fuel communication therebetween.

For example, moving the boom member along said boom axis towards the receiver aircraft for enabling fuel communication therebetween can be achieved by any one of the following, for example:

by moving the body towards the fuel receptacle of the receiver aircraft along the direction of the boom axis, by telescopically extending the boom member towards the towards the fuel receptacle of the receiver aircraft along said boom axis while the body is maintained at the engagement enabling position, partially by moving the body towards the fuel receptacle of the receiver aircraft along the direction of the boom axis, and partially by telescopically extending the boom member towards the towards the fuel receptacle of the receiver aircraft along said boom axis while the body is maintained at the engagement enabling position.

The refueling device according to this aspect of the presently disclosed subject matter can optionally comprise a spatial control system configured for selectively ensuring maintaining a desired non-zero angular disposition between said boom axis and said forward direction at least when said refueling device is towed by the tanker aircraft in said forward direction via said fuel hose.

Additionally or alternatively to the above features, the refueling device according to this aspect of the presently disclosed subject matter can optionally comprise one or more of features (A) to (S) below, additionally or alternatively including one or more of features (j1) to (j6) below, additionally or alternatively including one or more of features (k1) to (k15) below, additionally or alternatively including one or more of features M1 and or M2 and/or (m1) to (m4) below, additionally or alternatively including one or more of features (n1) to (n4) below, additionally or alternatively including one or more of features (q1) to (q6) below, mutatis mutandis, in any desired combination or permutation.

Additionally or alternatively to the above features, the refueling device according to this aspect of the presently disclosed subject matter can optionally comprise a force generating arrangement configured for selectively generating a force along said boom axis in a direction generally away from said fuel hose, i.e., towards the fuel delivery end of the boom member. Additionally or alternatively to the above features, the refueling device according to this aspect of the presently disclosed subject matter can optionally comprise one or more of features (AA) to (LL) below, mutatis mutandis, in any desired combination or permutation.

Additionally or alternatively to the above features, the body according to this aspect of the presently disclosed subject matter can optionally comprise a fuel delivery lumen configured for fluid communication with said fuel hose at least during the in-flight refueling operation, said lumen being configured to enable fuel to be transferred from the fuel hose to a receiver aircraft during said in-flight refueling operation, and the fuel delivery device comprises a coupling having a hose interface configured for connecting said lumen to the fuel hose, said coupling configured for allowing relative rotation between the hose and said body in at least one degree of freedom while maintaining said fuel communication. Additionally or alternatively to the above features, the refueling device according to this aspect of the presently disclosed subject matter can optionally comprise one or more of features (AAA) to (LLL) below, mutatis mutandis, in any desired combination or permutation.

According to at least one aspect of the presently disclosed subject matter, there is provided a refueling device for use in in-flight refueling operation, comprising:

a body having a longitudinal axis and configured for being towed by a tanker aircraft via a fuel hose at least during in-flight refueling operation, and comprising a boom member having a boom axis and configured to enable fuel to be transferred from said fuel hose to a receiver aircraft along said axis during said in-flight refueling operation;

said boom member being pivotable with respect to said body, between a retracted position and a deployed position, wherein in said retracted position said boom axis is at a smaller angular disposition with respect to said longitudinal axis than in said deployed position spatial control system including two sets of longitudinally spaced control surfaces configured for enabling selectively steering said refueling device while concurrently selectively maintaining a desired non-zero angular disposition between said boom axis and said longitudinal axis at least when said refueling device is towed by the tanker aircraft in said forward direction via said fuel hose.

The refueling device according to this aspect of the presently disclosed subject matter can optionally comprise a spatial control system configured for selectively ensuring maintaining a desired non-zero angular disposition between said boom axis and said forward direction at least when said refueling device is towed by the tanker aircraft in said forward direction via said fuel hose.

Additionally or alternatively to the above features, the refueling device according to this aspect of the presently disclosed subject matter can optionally comprise one or more of features (A) to (S) below, additionally or alternatively including one or more of features (j1) to (j6) below, additionally or alternatively including one or more of features (k1) to (k15) below, additionally or alternatively including one or more of features M1 and or M2 and/or (m1) to (m4) below, additionally or alternatively including one or more of features (n1) to (n4) below, additionally or alternatively including one or more of features (q1) to (q6) below, mutatis mutandis, in any desired combination or permutation.

Additionally or alternatively to the above features, the refueling device according to this aspect of the presently disclosed subject matter can optionally comprise a force generating arrangement configured for selectively generating a force along said boom axis in a direction generally away from said fuel hose, i.e., towards the fuel delivery end of the boom member. Additionally or alternatively to the above features, the refueling device according to this aspect of the presently disclosed subject matter can optionally comprise one or more of features (AA) to (LL) below, mutatis mutandis, in any desired combination or permutation.

Additionally or alternatively to the above features, the body according to this aspect of the presently disclosed subject matter can optionally comprise a fuel delivery lumen configured for fluid communication with said fuel hose at least during the in-flight refueling operation, said lumen being configured to enable fuel to be transferred from the fuel hose to a receiver aircraft during said in-flight refueling operation, and the fuel delivery device comprises a coupling having a hose interface configured for connecting said lumen to the fuel hose, said coupling configured for allowing relative rotation between the hose and said body in at least one degree of freedom while maintaining said fuel communication. Additionally or alternatively to the above features, the refueling device according to this aspect of the presently disclosed subject matter can optionally comprise one or more of features (AAA) to (LLL) below, mutatis mutandis, in any desired combination or permutation.

According to at least one aspect of the presently disclosed subject matter, the refueling device comprises:

a) a body configured for being towed by a tanker aircraft via a fuel hose at least during in-flight refueling operation, and comprising a boom member having a boom axis and configured to enable fuel to be transferred from said fuel hose to a receiver aircraft along said axis during said in-flight refueling operation;

(b) spatial control system configured for selectively ensuring maintaining a desired non-zero angular disposition between said boom axis and a forward direction at least when said refueling device is towed by the tanker aircraft in said forward direction via said fuel hose.

The above refueling device can optionally comprise one or more of the following features, in any desired combination or permutation:

A. A controller configured for selectively steering the body to an engagement enabling position spaced with respect to the receiver aircraft and for aligning said boom axis in an engagement enabling orientation at said spaced position, and for subsequently moving the boom member along said boom axis towards the receiver aircraft for enabling fuel communication therebetween.

B. The boom member comprises a nozzle at a terminus thereof in fluid communication with a fuel delivery lumen comprised in said body, said nozzle being configured for reversible engagement with a fuel receptacle of a receiver aircraft.

C. The fuel hose is substantially non-rigid and/or said body is selectively steerable.

D. The desired non-zero angular disposition is selectively controllable and/or said angular disposition is defined on a vertical plane.

E. The spatial control system configured for at least maintaining a selectively controllable non-zero angular disposition between said boom axis and a datum direction (different from said boom axis); the datum direction can be a forward direction of the body, i.e., direction of motion of the body when towed via the hose; the said angular disposition can be or comprise an angle of attack of said boom axis with respect to said forward direction.
F. The said angular disposition is such as to ensure that the boom axis is at a predetermined design angle with respect to the receiver aircraft, in particular with respect to a longitudinal axis of the receiver aircraft; the design angle is such as to ensure proper alignment and engagement between the nozzle and the fuel receptacle; for example, the design angle may be between about 25° and about 35°, for example about 30°.
G. The said angular disposition is defined about a pitch axis of said refueling device. Additionally or alternatively, said angular disposition is defined about at least one of a yaw axis and a roll axis of said refueling device. Additionally or alternatively, the said angular disposition is in a range between about 5° and about 85°; preferably between about 10° and about 80°; more preferably between about 15° and about 70°; more preferably between about 20° and about 60°; more preferably between about 25° and about 50°; more preferably between about 20° and about 40°; more preferably between about 25° and about 40°; more preferably between about 28° and about 32°; or said angular disposition is about 30°.
H. Wherein said refueling device is configured for maintaining said desired non-zero angular disposition between said boom axis and said forward direction at least prior to engagement of said nozzle with a fuel receptacle of a receiver aircraft that flying in formation aft of the tanker aircraft.
I. Wherein said spatial control system is further configured for selectively providing control moments in at least one of pitch, yaw and roll wherein to enable the refueling device to be flown while towed by the tanker aircraft in said forward direction via said fuel hose.
J. Wherein said device can optionally comprise one or more of the following features, in any desired combination or permutation:
(j1) wherein said body is elongate having a longitudinal axis generally aligned with said boom axis.
(j2) wherein said body comprises a longitudinal axis, and said boom member is pivotably mounted with respect to said body, and pivotable between a retracted position and a deployed position, wherein in said retracted position said boom axis is at a smaller angular disposition with respect to said longitudinal axis than in said deployed position.
(j3) wherein in said retracted position said boom axis is at an angular disposition with respect to said longitudinal axis of between 0° and 15°, and wherein in said deployed position, said angular disposition is greater than 15°.
(j4) wherein in said deployed position said boom axis is at an angular disposition with respect to said longitudinal axis between 20° to 40°.
(j5) wherein said boom member is in said deployed position during said in-flight refueling operation.
(j6) wherein said body comprises a longitudinal axis, and said boom member is mounted with respect to said body (for example fixedly mounted, or non-pivotably mounted, or mounted for relative translation therebetween), such as to maintain a generally parallel spatial disposition between said boom axis and said longitudinal axis at least during said in-flight refueling operation.

K. Wherein said spatial control system comprises selectively controllable aerodynamic control system. The selectively controllable aerodynamic control system can optionally comprise one or more of the following features, in any desired combination or permutation:
(k1) wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces.
(k2) a center of gravity of said body is disposed in longitudinally intermediate said forward set of aerodynamic control surfaces and said aft set of aerodynamic control surfaces.
(k3) wherein said aft set of aerodynamic control surfaces comprises at least two said control surfaces mounted to said body in Vee configuration; or wherein said aft set of aerodynamic control surfaces comprises a high H-tail configuration, comprising two vertical stabilizers, one each on either side of a horizontal stabilizer—the H-tail configuration can be mounted to the upper side of the body, and optionally: each vertical stabilizer comprises a controllably pivotable rudder, and/or the horizontal stabilizer comprises one, two or more pivotable elevators, which optionally are controllably actuated by an actuator system for example controlled by a controller.
(k4) wherein said aft set of aerodynamic control surfaces further comprises at least one said control surfaces mounted to said body in vertical configuration.
(k5) wherein said forward set of aerodynamic control surfaces comprises at least two said control surfaces mounted to said body in Vee configuration.
(k6) wherein said forward set of aerodynamic control surfaces comprises at least four said control surfaces mounted to said body in cruciform configuration, for example cruciform "X" configuration or cruciform "+" configuration.
(k7) wherein at least one said control surface is pivotably mounted to said body via a respective boss laterally projecting from an outer surface of said body.
(k8) wherein each said boss houses an actuator configured for actuating the respective control surface.
(k9) wherein each said boss comprises an aerofoil shaped cross-sectional shape having a respective chord.
(k10) wherein each said chord is angularly displaced from said boom axis such as to become generally aligned with said forward direction when said boom axis is at said non-zero angular disposition with respect to said forward direction.
(k11) wherein said forward set of aerodynamic control surfaces comprises a canard configuration, and said aft set of aerodynamic control surfaces comprises one or more wing elements.
(k12) wherein said aft set of aerodynamic control surfaces comprises an H-tail configuration, comprising two vertical stabilizers, one each on either side of a horizontal stabilizer; and/or wherein said forward set of aerodynamic control surfaces comprises at least four said control surfaces mounted to said body in cruciform configuration.

(k13) wherein said spatial control system is configured for enabling the refueling device to be steered in one, or two, or three degrees of freedom in translation, and in one, or two, or three degrees of freedom in rotation, independently of the tanker aircraft or of the refueling aircraft.

(k14) wherein said spatial control system is configured for providing at least one of:
- one or more of: sideslip, up/down translation, forward-aft translation, relative to the tanker aircraft and/or to the refueling aircraft, independently of rotational moments in roll pitch and/or yaw;
- rotational moments in one or more of roll pitch and/or yaw, relative to the tanker aircraft and/or to the refueling aircraft, independently of sideslip, up/down translation, forward-aft translation.

(k15) wherein said spatial control system is configured for providing an angle of attack for the body with respect to the forward direction, between −10° and +10°.

L. Wherein said spatial control system comprises a thrust vector system.

M. A force generating arrangement including one or more of:

M1—a force generating arrangement configured for selectively generating a force along said boom axis in an aft direction, i.e., a direction towards said nozzle. The force generating arrangement can optionally comprise one or more of the following features, in any desired combination or permutation:
- (m1) wherein said force generating arrangement comprises a selectively deployable and/or actuable drag inducing arrangement.
- (m2) wherein said force generating arrangement comprises a selectively deployable and/or actuable air brake arrangement.
- (m3) wherein said air brake arrangement comprises a plurality of airbrakes laterally mounted to at least one of said body and said boom member.
- (m4) wherein said force generating arrangement is configured for selectively generating said force along said boom axis in a direction towards said nozzle responsive to said nozzle being in predetermined proximity to the fuel receptacle of the receiver aircraft whereby to force said nozzle into engagement with the fuel receptacle.

M2—an aerodynamic stabilizer arrangement, different from the spatial control system, for example wherein said aerodynamic stabilizer arrangement is in the form of a drogue structure having a stowed configuration, in which drogue structure generates a minimum drag, and a deployed configuration in drogue structure generates greater drag than in the inactive configuration.

N. Said body comprises a fuel delivery lumen configured for fluid communication with said fuel hose and said boom member at least during the in-flight refueling operation, and said body comprises a coupling having a hose interface configured for connecting said lumen to the fuel hose, said coupling configured for allowing relative rotation between the hose and said body in at least one degree of freedom while maintaining said fuel communication. The coupling can optionally comprise one or more of the following features, in any desired combination or permutation:

(n1) wherein said coupling configured for allowing relative rotation between the hose and said body in at least two degrees of freedom.
(n2) wherein said coupling configured for allowing relative rotation between the hose and said body in three degrees of freedom.
(n3) wherein at least one said rotational degree of freedom has the respective axis of rotation generally orthogonal to a plane defining said non-zero angular disposition between said boom axis and said forward direction.
(n4) wherein said coupling comprises a universal coupling.

O. Wherein said boom member is selectively reversibly telescopically deployable along said boom axis with respect to said body or wherein said boom member is not reversibly telescopically deployable along said boom axis with respect to said body.

P. Wherein said boom member is pivotably mounted to said body.

Q. A data acquisition system configured for providing spatial data relating to a relative spatial disposition between a fuel delivery nozzle of the refueling device and a fuel receptacle of the receiver aircraft, to enable selectively controlling the refueling device to provide automatic and/or autonomous and/or manual engagement of the fuel delivery nozzle to the fuel receptacle of the receiver aircraft. In at least one example, the system comprises an imaging system for providing said data including at least image data corresponding to a field of regard with respect to the refueling device. The data acquisition system can be in the form of an imaging system, and can optionally comprise one or more of the following features, in any desired combination or permutation:

(q1) wherein said imaging system is configured for providing at least one of 2D images, stereoscopic images, and 3D images of a volume defined by said field of regard.
(q2) wherein said imaging system is configured for providing said image data in real time.
(q3) wherein said imaging system comprises or is operatively connected to a computing system configured for identifying a fuel receptacle of a receiver aircraft within said field of regard from said image data, and for determining a spatial disposition of said nozzle with respect to the fuel receptacle.
(q4) wherein said imaging system comprises a first set of electromagnetic energy modules configured for illuminating said field of regard with electromagnetic energy (for example laser energy), and a second set of electromagnetic energy modules configured for receiving electromagnetic energy from said illuminated field of regard.
(q5) wherein said imaging system comprises a first set of electromagnetic energy modules configured for transmitting electromagnetic energy in a direction generally along said boom axis and generally opposed to said forward direction, and a second set of electromagnetic energy modules configured for receiving electromagnetic energy from a direction generally along said boom axis and generally along said forward direction.
(q6) wherein said imaging system comprises at least one flash ladar unit and/or at least one LIDAR unit.

R. The controller can comprise, for example, a computer system, operatively connected to said spatial data acquisition system and/or to said spatial control system, and/or optionally configured as an automatic or autonomous system for enabling refueling device to be steered to an engagement enabling position to provide engagement of the nozzle with the fuel receptacle of the receiver aircraft, and thereafter enable refueling of the receiver aircraft.

S. A suitable communication system to transmit image data and to receive control commands/signals. For example, the communications system can be operatively connected to the controller for controlling operation of the refueling device.

According to at least one aspect of the presently disclosed subject matter, the refueling device comprises:

a body configured for connection to a tanker aircraft via a fuel hose at least during in-flight refueling operation thereof while said body is in towed configuration with respect to the tanker aircraft via said fuel hose, and further comprising a substantially rigid boom member having a boom axis and configured to enable fuel to be transferred from the tanker aircraft to a receiver aircraft during said in-flight refueling operation;

spatial control system configured for selectively maintaining a desired non-zero angular disposition between said boom axis and a datum direction.

The refueling device according to this aspect of the presently disclosed subject matter can optionally comprise one or more of the following features, in any desired combination or permutation:

Wherein said datum direction is parallel to a longitudinal axis of the receiver aircraft.

The desired non-zero angular disposition is selectively controllable.

The datum direction is different, i.e. non-parallel, from said boom axis.

The datum direction can be parallel to a forward direction of the body, i.e., direction of motion of the body when towed via the hose.

The spatial control system is also configured for selectively ensuring maintaining a desired non-zero angular disposition between said boom axis and said forward direction at least when said refueling device is towed by the tanker aircraft in said forward direction via said fuel hose.

The boom member comprises a nozzle at a terminus thereof in fluid communication with a fuel delivery lumen comprised in said body, said nozzle being configured for reversible engagement with a fuel receptacle of a receiver aircraft.

Additionally or alternatively to the above features, the refueling device according to this aspect of the presently disclosed subject matter can optionally comprise one or more of features (A) to (S), additionally or alternatively including one or more of features (j1) to (j6), additionally or alternatively including one or more of features (k1) to (k15), additionally or alternatively including one or more of features M1 and/or m2 and/or (m1) to (m4), additionally or alternatively including one or more of features (n1) to (n4), additionally or alternatively including one or more of features (q1) to (q6), mutatis mutandis, in any desired combination or permutation.

According to at least one other aspect of the presently disclosed subject matter, the refueling device comprises:

(aa) a body configured for being towed by a tanker aircraft via a fuel hose at least during in-flight refueling operation, and comprising a boom member having a boom axis and configured to enable fuel to be transferred from said fuel hose to a receiver aircraft along said axis during said in-flight refueling operation;

(bb) a force generating arrangement configured for selectively generating a force along said boom axis in a direction generally away from said fuel hose.

A fuel delivery nozzle is comprised at a terminus of the boom member and is in fluid communication with a fuel delivery lumen comprised in said body, the lumen configured for fluid communication with said fuel hose and said fuel member at least during in flight refueling operation, said nozzle being configured for reversible engagement with a fuel receptacle of a receiver aircraft.

The refueling device according to this aspect of the presently disclosed subject matter can optionally comprise one or more of the following features, in any desired combination or permutation:

(AA) Wherein said force generating arrangement comprises a selectively deployable drag inducing arrangement.

(BB) Wherein said force generating arrangement comprises a selectively deployable air brake arrangement.

(CC) Wherein said air brake arrangement comprises a plurality of airbrakes laterally mounted to at least one of said body and said boom member.

(DD) Wherein said force generating arrangement is configured for selectively generating a force along said boom axis in a direction towards said nozzle responsive to said nozzle being in predetermined proximity to the fuel receptacle of the receiver aircraft wherein to force said nozzle into engagement with the fuel receptacle.

(EE) Wherein the fuel hose is substantially non-rigid and/or wherein said body is selectively steerable.

(FF) Wherein said boom member is selectively reversibly telescopically deployable along said boom axis with respect to said body.

(GG) Wherein said boom member is pivotably mounted to said body.

(HH) a controller configured for selectively steering the body to an engagement enabling position spaced with respect to the receiver aircraft and for aligning said boom axis in an engagement enabling orientation at said spaced position, and for subsequently moving the boom member along said boom axis towards the receiver aircraft for enabling fuel communication therebetween.

(II). A suitable communication system to transmit image data and to receive control commands/signals. For example, the communications system can be operatively connected to the controller for controlling operation of the refueling device.

(JJ) A spatial control system configured for selectively ensuring maintaining a desired non-zero angular disposition between said boom axis and said forward direction at least when said refueling device is towed by the tanker aircraft in said forward direction via said fuel hose, and/or configured for at least providing directional stability at least during deployment of drag generating system, the spatial control system being different from said force generating arrangement. The spatial control system according to at least this aspect of the presently disclosed subject matter can optionally comprise one or more of features (B) to (L), optionally including one or more of features (k1) to k(15), mutatis mutandis, in any desired combination or permutation.

(KK) A coupling having a hose interface configured for connecting said lumen to the fuel hose, said coupling configured for allowing relative rotation between the hose and said body in at least one degree of freedom while maintaining said fuel communication. The coupling according to at least this aspect of the presently disclosed subject matter can optionally comprise one or more of features (n1) to (n4), mutatis mutandis, in any desired combination or permutation.

(LL) A data acquisition system configured for providing spatial data relating to a relative spatial disposition between said fuel delivery nozzle and a fuel receptacle of the receiver aircraft, to enable selectively controlling the refueling device to provide automatic or autonomous or manual engagement of the fuel delivery end to the fuel receptacle, said system optionally comprising an imaging system configured for providing said data including image data corresponding to a field of regard aft of the refueling device, and wherein optionally said imaging system comprises or is operatively connected to a computing system configured for identifying a fuel receptacle of a receiver aircraft within said field of regard from said image data, and for determining a spatial disposition of said fuel delivery nozzle with respect to the fuel receptacle. The data acquisition system can be in the form of an imaging system, and can optionally comprise one or more of features (q1) to (q6), mutatis mutandis, in any desired combination or permutation.

According to at least one other aspect of the presently disclosed subject matter, the refueling device comprises:

(aaa) a body configured for being towed by a tanker aircraft via a fuel hose at least during in-flight refueling operation, and comprising a fuel delivery lumen configured for fluid communication with said fuel hose at least during the in-flight refueling operation, said lumen being configured to enable fuel to be transferred from the fuel hose to a receiver aircraft during said in-flight refueling operation;

(bbb) a coupling having a hose interface configured for connecting said lumen to the fuel hose, said coupling configured for allowing relative rotation between the hose and said body in at least one degree of freedom while maintaining said fuel communication.

The refueling device according to this aspect of the presently disclosed subject matter can optionally comprise one or more of the following features, in any desired combination or permutation:

(AAA) Wherein said coupling is configured for allowing relative rotation between the hose and said body in at least two degrees of freedom.

(BBB) Wherein said coupling is configured for allowing relative rotation between the hose and said body in three degrees of freedom.

(CCC) Wherein said body comprises a boom member having a boom axis, and wherein said lumen is configured to enable fuel to be transferred from the fuel hose to a receiver aircraft via said boom member during said in-flight refueling operation, and/or at least one said degree of freedom has the respective axis of rotation generally orthogonal to a plane defining said non-zero angular disposition between said boom axis and said forward direction.

(DDD) Wherein said coupling comprises a universal coupling.

(EEE) Wherein the fuel hose is substantially non-rigid.

(FFF) Wherein said boom member is selectively reversibly telescopically deployable along said boom axis with respect to said body.

(GGG) Wherein said boom member is pivotably mounted to said body.

(HHH) A data acquisition system configured for providing spatial data relating to a relative spatial disposition between a fuel delivery end of said boom member and a fuel receptacle of the receiver aircraft, to enable selectively controlling the refueling device to provide automatic or autonomous or manual engagement of the fuel delivery end to the fuel receptacle, said system optionally comprising an imaging system configured for providing said data including image data corresponding to a field of regard aft of the refueling device, and wherein optionally said imaging system comprises or is operatively connected to a computing system configured for identifying a fuel receptacle of a receiver aircraft within said field of regard from said image data, and for determining a spatial disposition of said fuel delivery end with respect to the fuel receptacle.

(III) A suitable communication system to transmit image data and to receive control commands/signals. For example, the communications system can be operatively connected to the controller for controlling operation of the refueling device.

(JJJ) A spatial control system configured for selectively ensuring maintaining a desired non-zero angular disposition between said boom axis and said forward direction at least when said refueling device is towed by the tanker aircraft in said forward direction via said fuel hose, and/or, configured for at least providing directional stability. The spatial control system according to at least this aspect of the presently disclosed subject matter can optionally comprise one or more of features (B) to (L), optionally including one or more of features (k1) to k(15), mutatis mutandis, in any desired combination or permutation.

(KKK) A force generating arrangement configured for selectively generating a force along said boom axis in a direction towards said nozzle. The force generating arrangement according to at least this aspect of the presently disclosed subject matter can optionally comprise one or more of features M1 and/or M2 and/or (m1) to (m4), mutatis mutandis, in any desired combination or permutation.

(LLL) A data acquisition system configured for providing spatial data relating to a relative spatial disposition between a fuel delivery nozzle of the refueling device and a fuel receptacle of the receiver aircraft, to enable selectively controlling the refueling device to provide automatic and/or autonomous and/or manual engagement of the fuel delivery nozzle to the fuel receptacle of the receiver aircraft. In at least one example, the system comprises an imaging system for providing said data including at least image data corresponding to a field of regard with respect to the refueling device. The data acquisition system can be in the form of an imaging system, and can optionally comprise one or more of features (q1) to (q6), mutatis mutandis, in any desired combination or permutation.

According to at least one other aspect of the presently disclosed subject matter, there is provided a refueling system comprising a refueling fuel reservoir connected to a refueling device via a hose, the refueling device being as defined in the examples herein, in particular as defined above and optionally including one or more of the features listed above in A to S, AA to LL, and AAA to LLL, in any desired combination or permutation. Optionally, the refueling system can be housed in a suitable pod configured to be fixedly attached to a tanker aircraft.

According to at least one other aspect of the presently disclosed subject matter, there is provided a tanker aircraft comprising at least one refueling system as defined herein, for example comprising one refueling system as defined herein, or comprising two refueling systems as defined herein, or comprising three refueling systems as defined herein, or comprising more four or more refueling systems as defined herein.

According to the tanker aircraft may be a manned tanker aircraft or a UAV, and/or at least one receiver aircraft may be a manned aircraft or a UAV.

Optionally, a tanker aircraft according to the presently disclosed subject matter can comprise one or two such refueling systems mounted to the wings (e.g. via pods) and additionally comprise one conventional "flying boom" system in the aft fuselage. Thus, it is readily apparent that existing tanker aircraft already fitted with conventional "flying boom" systems can be retrofitted with refueling systems according to the first aspect of the presently disclosed subject matter, for example one such refueling system fitted onto each wing, thereby effectively tripling the refueling efficiency/capability of such a tanker aircraft, enabling up to three receiver aircraft having fuel receptacles to be refueled concurrently.

Optionally, a tanker aircraft according to the presently disclosed subject matter can comprise one or more such refueling systems, as well as at least one conventional "hose and drogue" system, enabling receiver aircraft of both types to be refueled concurrently.

BRIEF DESCRIPTION OF THE DRAWINGS

In order to understand the presently disclosed subject matter and to see how it may be carried out in practice, examples will now be described, by way of non-limiting example only, with reference to the accompanying drawings, in which:

FIG. 7 is a cross-sectional side view of the refueling device of FIG. 5 taken along B'-B'.

FIG. 8 is a cross-sectional side view of the refueling device of FIG. 4 taken along A'-A'.

FIGS. 12(a) to 12(d) are respective isometric, side, top and front views of an alternative variation of the example of refueling device of FIG. 3.

FIGS. 15(a) to 15(d) illustrate another alternative variation of the example of refueling device of FIG. 3, in isometric view, top view, side view and aft view, respectively.

DETAILED DESCRIPTION OF THE DRAWINGS

Figure 1:
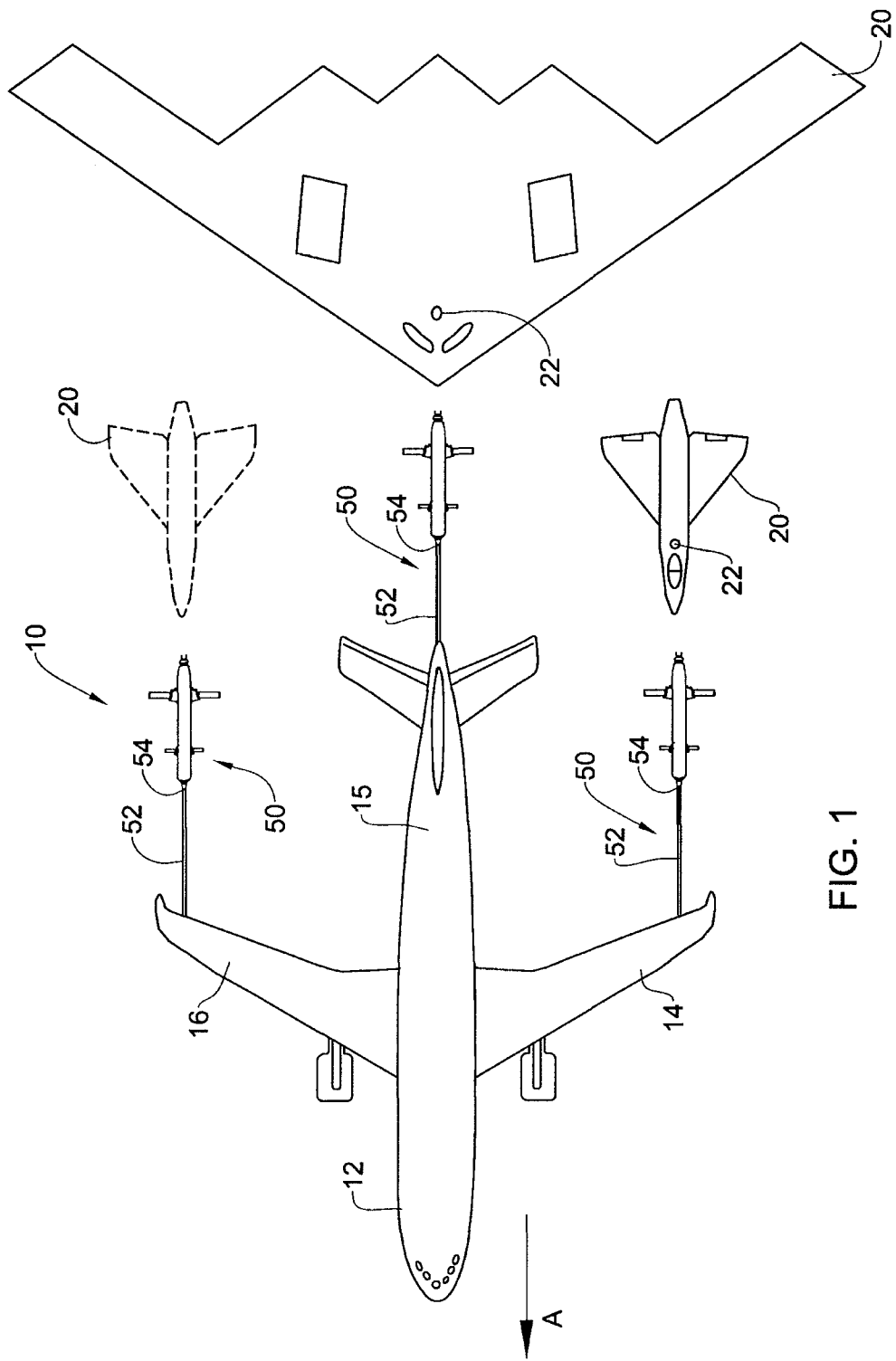
FIG. 1 is a top view of an example of a tanker system according to the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "steering", "determining", "calculating", "providing", "causing", "activating", "receiving", "acquiring", "comparing", "obtaining", or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor/processing unit (e.g. digital signal processor (DSP), a microcontroller, a microprocessor, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases", "one example", "some examples" or variants thereof means that a particular feature, structure or characteristic described in connection with the embodiment(s) is included in at least one embodiment of the presently disclosed subject matter. Thus the appearance of the phrase "one case", "some cases", "other cases", "one example", "some examples" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 18:
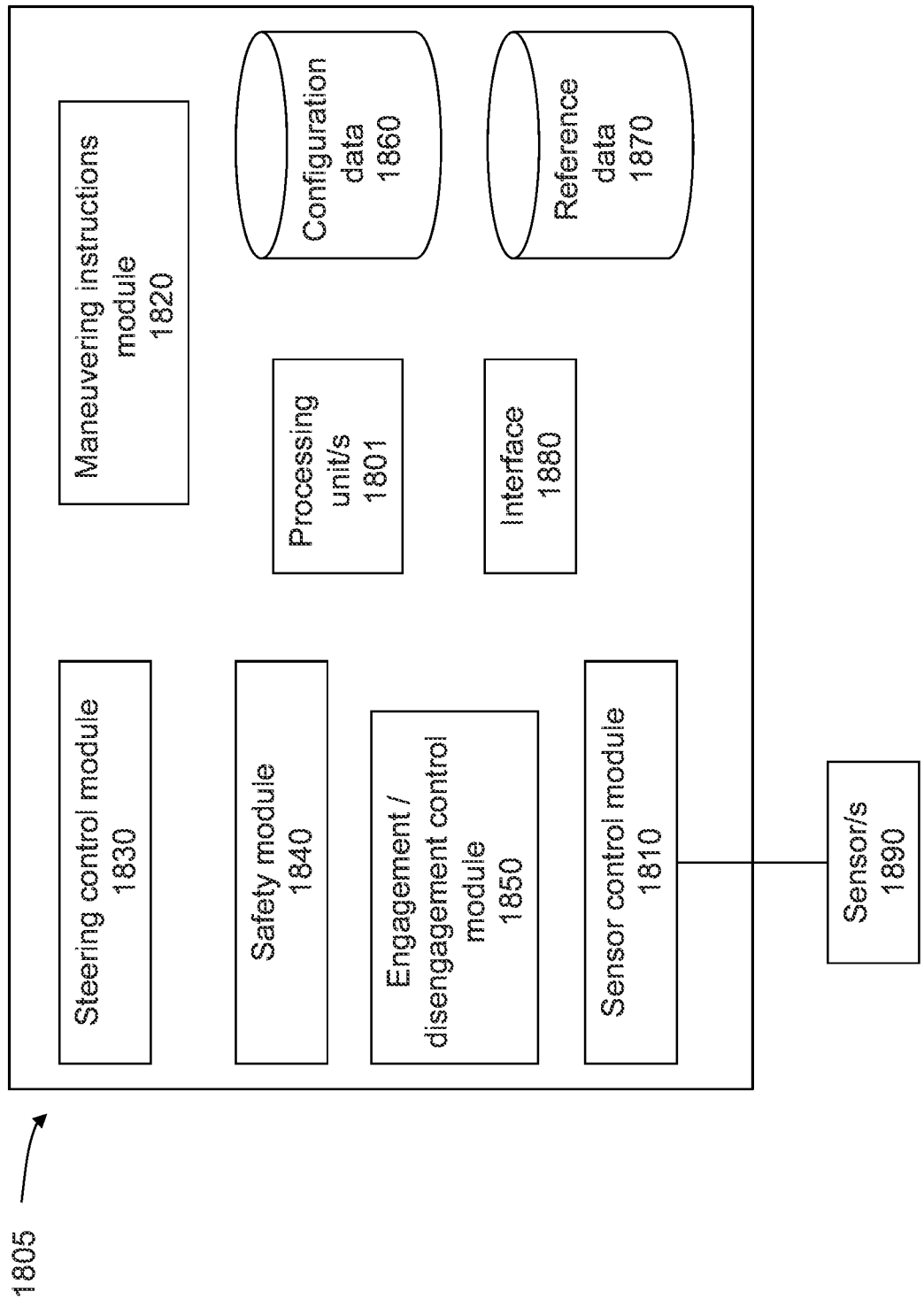
FIG. 18 is a block diagram schematically illustrating a system for controlling in-flight refueling, according to certain examples of the presently disclosed subject matter.

In embodiments of the presently disclosed subject matter, fewer, more and/or different stages than those shown in FIGS. 19 to 23 can be executed. In embodiments of the presently disclosed subject matter one or more stages illustrated in FIGS. 19 to 23 can be executed in a different order and/or one or more groups of stages may be executed simultaneously. FIGS. 7 and 18 illustrate a general schematic of the system architecture in accordance with an embodiment of the presently disclosed subject matter. Each module in FIGS. 7 and 18 can be made up of any combination of software, hardware and/or firmware that performs the functions as defined and explained herein. The modules in FIGS. 7 and 18 can be centralized in one location or dispersed over more than one location. In other embodiments of the presently disclosed subject matter, the system may comprise fewer, more, and/or different modules than those shown in FIGS. 7 and 18.

According to a first aspect of the presently disclosed subject matter, there are provided systems and devices for in-flight refueling of aircraft.

Figure 2:
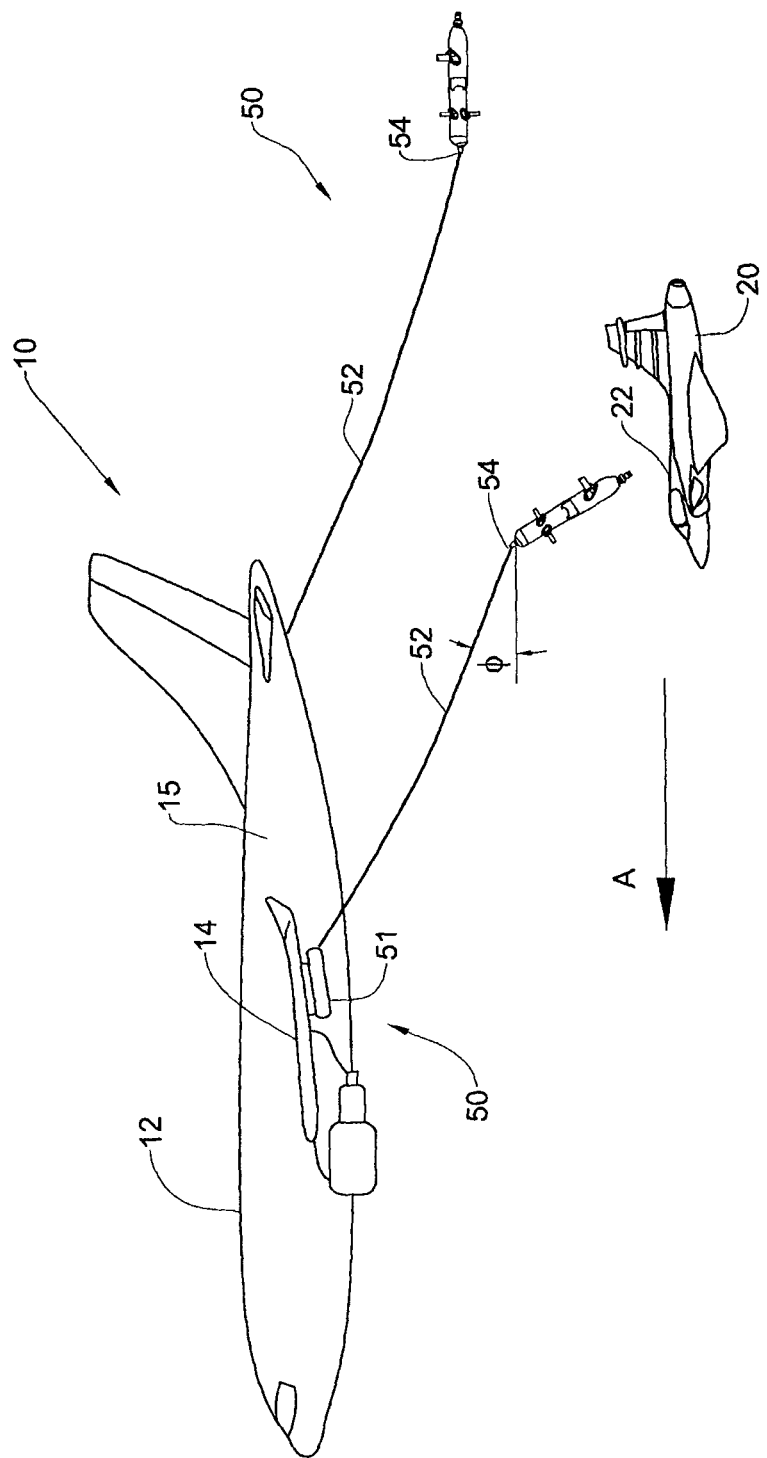
FIG. 2 is a side view of the tanker system of FIG. 1.

Referring to FIGS. 1 and 2, a tanker system according to one example of the presently disclosed subject matter, generally designated 10, comprises a tanker aircraft 12 comprising one or more in-flight refueling systems 50. In this example, the tanker aircraft 12 has three such in-flight refueling systems 50, one comprised on each one of the port wing 14 and starboard wing 16, and a third one comprised on the rear portion of the fuselage 15, and the tanker aircraft 12 is configured for in-flight concurrent refueling of up to three receiver aircraft 20. In alternative variations of this example the tanker aircraft 12 can have at least one, or two, or more than three in-flight refueling systems 50, arranged in any suitable configuration with respect to the tanker aircraft 12.

By way of non-limiting example, such a tanker aircraft 12 can be a suitably equipped Boeing 767 and each receiver aircraft 20 can include any one of suitably equipped F-15, or F-16, or B2 stealth bomber, or other suitably equipped fighter, bomber or other aircraft. Alternatively, and also by way of non-limiting example, the tanker aircraft may be a UAV, and/or at least one of the receiver aircraft may be a UAV.

Also by way of non-limiting example, a refueling flight envelope for use with such a tanker system can include a forward speed of between about 220 knots and about 320 knots (typically about 280 knots), and an altitude of between 500 ft and between about 30,000 ft and about 40,000 ft, and in general not below about 10,000 ft, in which refueling can take place between the tanker aircraft 12 and each receiver aircraft 20, flying in formation, depending on the operating limits of the tanker aircraft and of the receiver aircraft, as well as other factors.

Each in-flight refueling system 50 comprises an elongate, non-rigid, fuel delivery hose 52, reversibly extendible from the tanker aircraft 12. A first end (not shown) of the hose 52 is connected to a refueling fuel tank (not shown) carried by the tanker aircraft 12. For example, such a refueling fuel tank can be an internal fuel tank of the tanker aircraft 12, for example the tanker aircraft's own fuel tanks, or a special fuel reservoir mounted internally in the tanker aircraft 12, for example in the fuselage, or externally and carried in fuel pods, for example.

The hose 52 is flexible and can be retracted into a roll up drum (not shown), suitably provided in the tanker aircraft 12, and selectively deployed therefrom when required.

The second (aft) end 54 of hose 52 is operatively connected to a respective refueling device that is towed in a forward direction A by the tanker aircraft 12 via hose 52 when the hose 52 is extended and the tanker aircraft 12 is in flight.

In this example, one in-flight refueling system 50 is centrally-located and mounted with respect to the rear fuselage of the tanker aircraft 12, and each of the other two in-flight refueling systems 50 is comprised in a respective pod 51 that is attached to the underside of the respective wing.

FIGS. 3 to 11 illustrate a refueling device according to a first example of the presently disclosed subject matter, generally designated 100, for use with an in-flight refueling system, for example at least one of the in-flight refueling systems 50 illustrated FIGS. 1 and 2.

Figure 3:
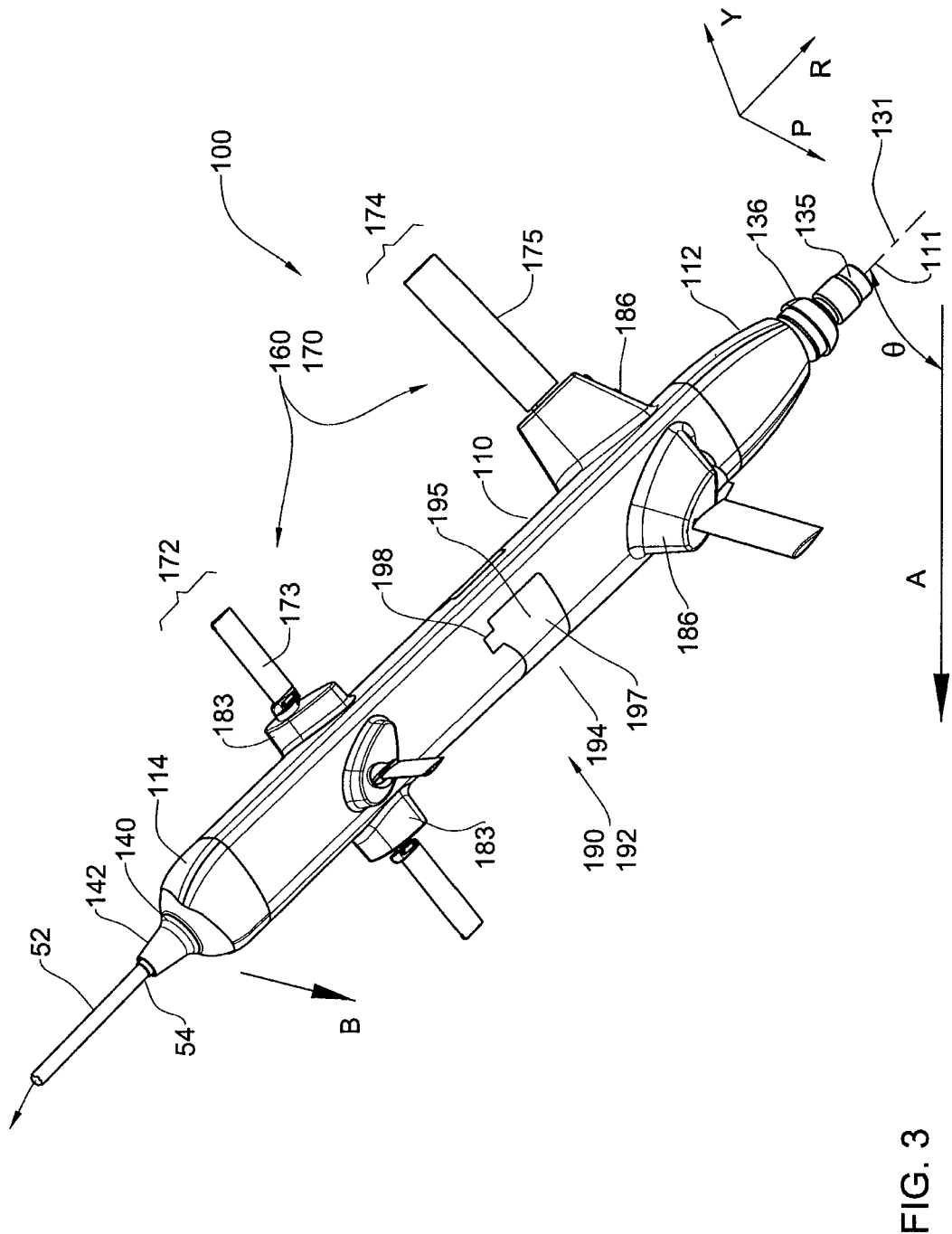
FIG. 3 is an isometric view of an example of a refueling device according to the presently disclosed subject matter.

For convenience, and referring to FIG. 3 for example, a roll axis R, a pitch axis P and a yaw axis Y can be conventionally defined with respect to the refueling device 100. The roll axis R is parallel to or co-axial with the longitudinal axis 111 of the device 100; the pitch axis P is generally in lateral and orthogonal relationship to the roll axis R (i.e., parallel to the horizontal when the body is at a zero roll angle); and yaw axis Y is in orthogonal relationship to the roll axis R the pitch axis P (i.e., parallel to the vertical when the body is at a zero pitch angle).

Figure 6A:
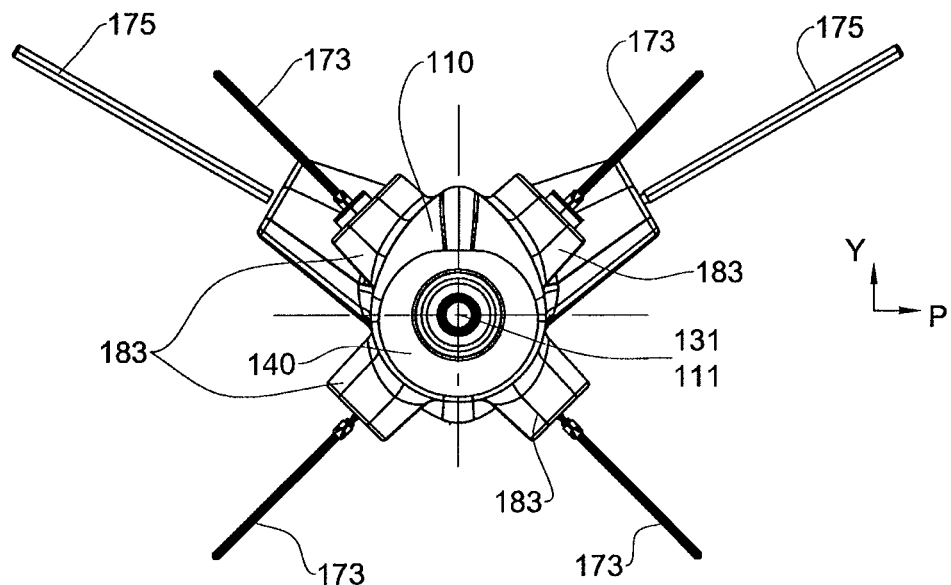
FIG. 6(a) is a front view of the refueling device of FIG. 3.
Figure 6B:
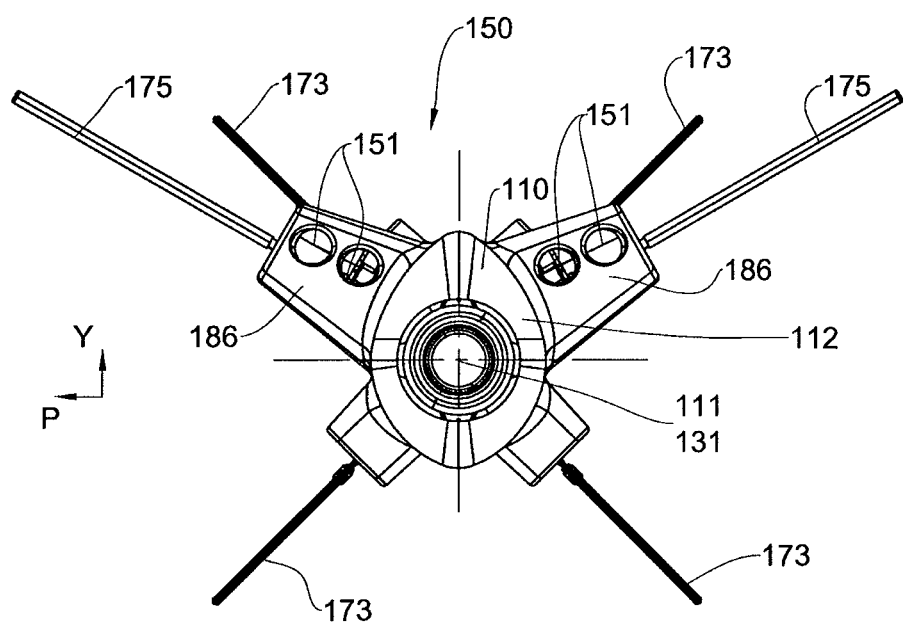
FIG. 6(b) is an aft view of the refueling device of FIG. 3.

Refueling device 100 is affixed to the end 54 of hose 52 and comprises an elongate body 110 comprising a longitudinal axis 111 and a general oval cross section (as best seen in FIGS. 6(a) and 6(b)), although in alternative variations of this example the body 110 can have any suitable cross-sectional shape, for example circular cross-section, polygonal cross-section, and so on. Referring in particular to FIGS. 7 and 8, the body 110 comprises a fuel delivery lumen 120 and a boom member 130 (which at least in the disclosed examples is a substantially rigid boom member) in fluid communication therewith. The boom member 130 defines a boom axis 131 and comprises a fuel delivery nozzle 135 at a terminus 136 of the boom member 130. The nozzle 135 is configured for reversibly engaging with the fuel receptacle 22 of a receiver aircraft 20 (see also FIGS. 1, 2 and 11), and thus can comprise any conventional design of such nozzles, which are well known, or indeed can comprise any other current or future design of such an in-flight refueling nozzle.

Figure 9A:
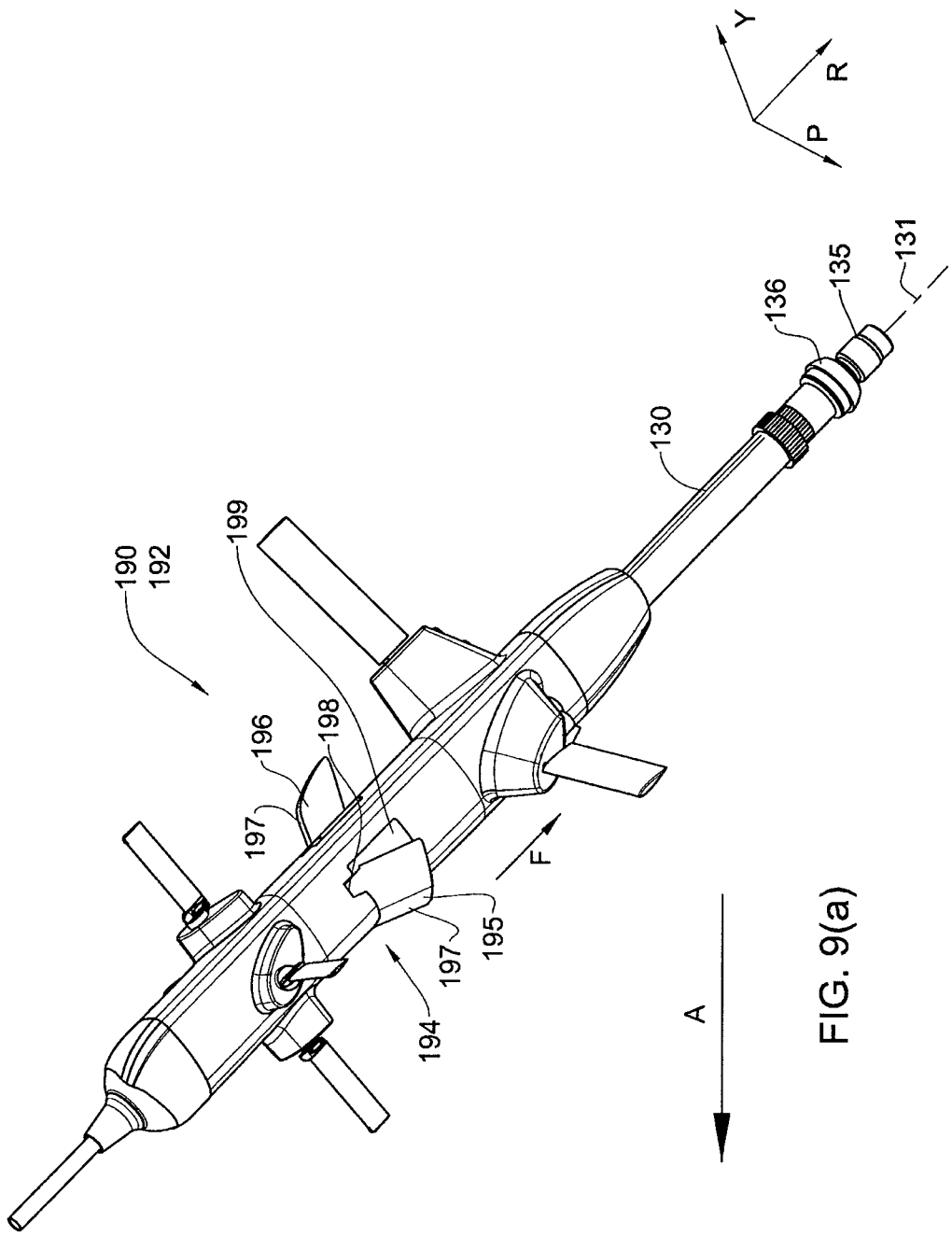
FIG. 9(a) is an isometric view of the refueling device of FIG. 3, with the airbrakes and boom member in the deployed positions.
Figure 9B:
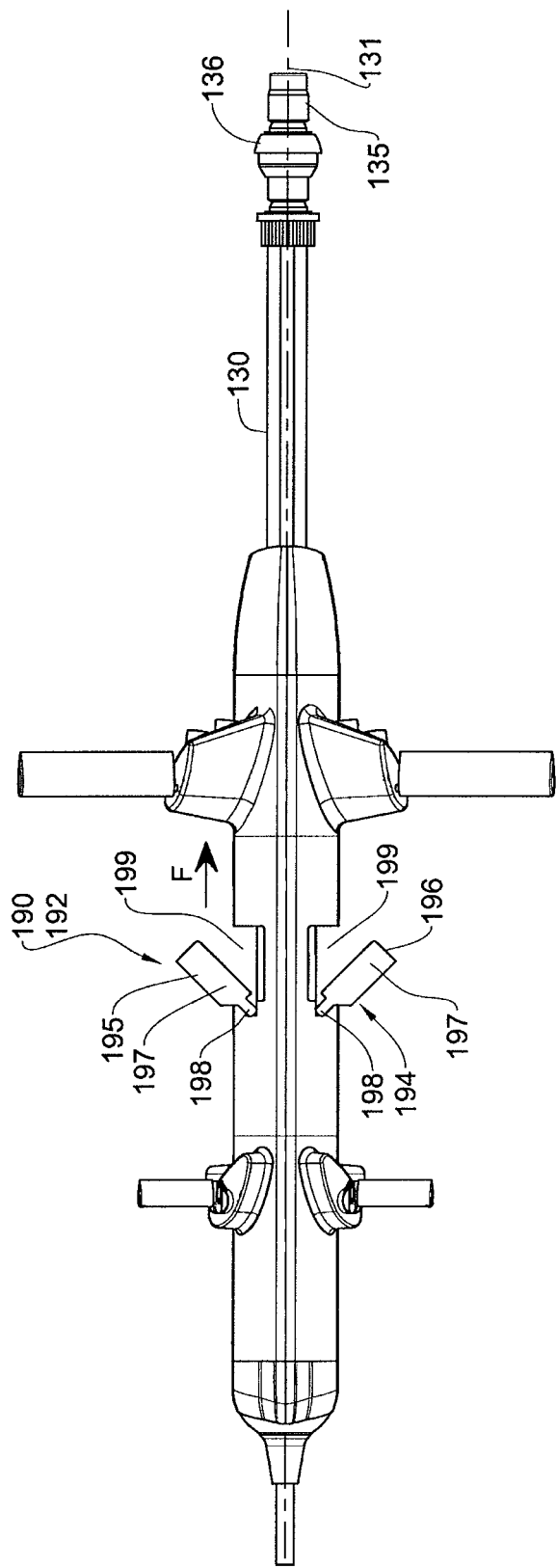
FIG. 9(b) is a top view of the refueling device of FIG. 9(a).

The boom member 130 is telescopically mounted to body 110, and is reversibly extendable from a stowed position illustrated in FIGS. 3 to 8 in which most of the boom member 130 is accommodated in a sleeve within the body 110, to the fully extended position illustrated in FIGS. 9(a) and 9(b), by means of a controllable actuation mechanism (not shown). Optimally, the boom member 130 is telescopically extendable to a controllably variable extended position in a general aft direction from the aft end 112 of body 110, up to the aforesaid the fully extended position. While in this example the boom axis 131 is parallel and co-axial with longitudinal axis 111, in at least some alternative variations of this example the boom axis can be parallel but not co-axial with the body longitudinal axis, or the boom axis can be non-parallel with respect to the body longitudinal axis.

Thus, the boom member 130 is mounted with respect to the body 110 such as to maintain a generally parallel spatial disposition between the boom axis 131 and the longitudinal axis 111, at least during in-flight refueling operation of device 100.

In an alternative variation of this embodiment, the boom member 130 is permanently extended with respect to the body 110, and is not telescopically or reversibly extendible therefrom. In another alternative variation of this example, the boom member 130 is permanently retracted with respect to the body 110, and is not telescopically or reversibly extendible therefrom, and thus may only comprise a relatively short section extending aft from the body 110 to connect to the nozzle 135.

In alternative variations of this example, or in other examples, the boom member may have any other suitable structure configured for coupling with the receiver aircraft, in particular the fuel receptacle thereof.

The body 110 comprises a coupling 140 at forward end 114 thereof. The coupling 140 comprises a hose interface 142 configured for connecting the lumen 120 to the hose 52, and thereby to the tanker aircraft 12. The coupling 140 is configured for allowing relative rotation between the body 110 and the hose 52 while maintaining fluid communication between the lumen 120 and the hose 52 and thus the refueling tank. In this example, the coupling 140 is in the form of a universal joint or the like (also referred to as a universal coupling, a Cardan joint, a Hardy-Spicer joint or a Hooke's joint, and so on), and is thus configured for allowing relative rotation between the body 110 and the hose 52 in three degrees of freedom. In alternative variations of this example and in other examples, the coupling can instead be configured for allowing relative rotation between the body 110 and the hose 52 in one degree of freedom, or in two degrees of freedom. In particular, the coupling allows the body 110, and in particular the boom member 130 and the boom axis 131 to freely pivot with respect to the hose 52, in particular the second end 54, about at least one axis B (see FIGS. 3 and 5, for example), so that the spatial orientation of the refueling device 100 can be controllably changed without significant mechanical resistance thereto being generated by the hose 52 about axis B, which is typically parallel the pitch axis P of the refueling device 100, but may be alternatively inclined to the pitch axis P and/or to the roll axis R and/or to the yaw axis Y.

The body 110 can optionally be formed as an integral and/or unitary structure incorporating the boom member 130 and the coupling 140.

In alternative variations of this example the coupling 140 can be omitted and replaced with a fixed coupling that is configured to maintain a fixed relative spatial disposition between the body 110 and the hose 52 while maintaining fluid communication between the lumen 120 and the hose 52. For example such a spatial disposition may be an angle φ (see FIG. 1) of about 0°; or about 30°; or in a range between about 5° and about 85°; or in a range between about 10° and about 80°; or in a range between about 15° and about 70°; or in a range between about 20° and about 60°; or in a range between about 25° and about 50°; or in a range between about 20° and about 40°; or in a range between about 25° and about 40°; or in a range between about 28° and about 32°.

The refueling device 100 further comprises a spatial control system 160, configured for controlling a spatial disposition of the refueling device 100 when towed aft of the tanker aircraft 12 via the hose 52, and enables the refueling device 100 to be steered and/or to adopt any desired stable spatial disposition while being towed at the end 54 of hose 52.

In particular, spatial control system 160 is configured for selectively and controllably providing a non-zero angular disposition, angle θ, between the boom axis 131 and the forward direction A, and enables this angle θ to be selectively maintained between the boom axis 131 and the forward direction A at least for a part of the time when the refueling device 100 is being towed by the tanker aircraft 12 via hose 52, in particular during the engagement operation of the fuel device 100 to the receiver aircraft 20 and during refueling thereof. In particular, angle θ is in pitch, i.e., about a pitch axis P of the refueling device 100 and is defined on a plane including the roll axis R and the yaw axis Y of the refueling device 100. Angle θ is thus representative of an angle of attack of the refueling device 100 in the airflow, or at least of the boom axis 131 with respect to forward direction A (which is typically, but not exclusively, parallel to the horizontal direction). Nevertheless, and depending on specific conditions during any particular refueling operation, angle θ can include an angular displacement component between the boom axis 131 and the forward direction A in yaw (i.e., about yaw axis Y), for example due to sideslip angle, and/or in roll (i.e. about roll axis R), instead of or in addition to an angular displacement component in pitch (i.e., about pitch axis P).

The refueling device 100, in particular the boom member 130, nozzle 135 and lumen 120 can be sized to allow suitable fuel flow rates for refueling a wide range of receiver aircraft. By way of non-limiting example, relative high fuel flow rates (for example up to 1,000 US gallons/6,500 lb per minute) can be provided for refueling operations of large aircraft (for example transport aircraft, bombers, etc.), while for fighter aircraft that cannot accept fuel at the maximum flow rate of the refueling device 100, the refueling pressure can be correspondingly reduced. Alternatively the refueling device 100, in particular the boom member 130, nozzle 135 and lumen 120 can be sized to allow suitable fuel flow rates for refueling a narrow range of receiver aircraft, for example only fighter aircraft or only larger aircraft (for example about 400 US gallons/2,600 lb per minute).

Thus, the spatial control system 160 is configured for providing stability to the refueling device 100, while tethered to and towed by the tanker aircraft 12 via the hose 52, and while the boom axis 131 is at any desired pitch and/or yaw and/or roll corresponding to the aforesaid angle θ.

Figure 10A:
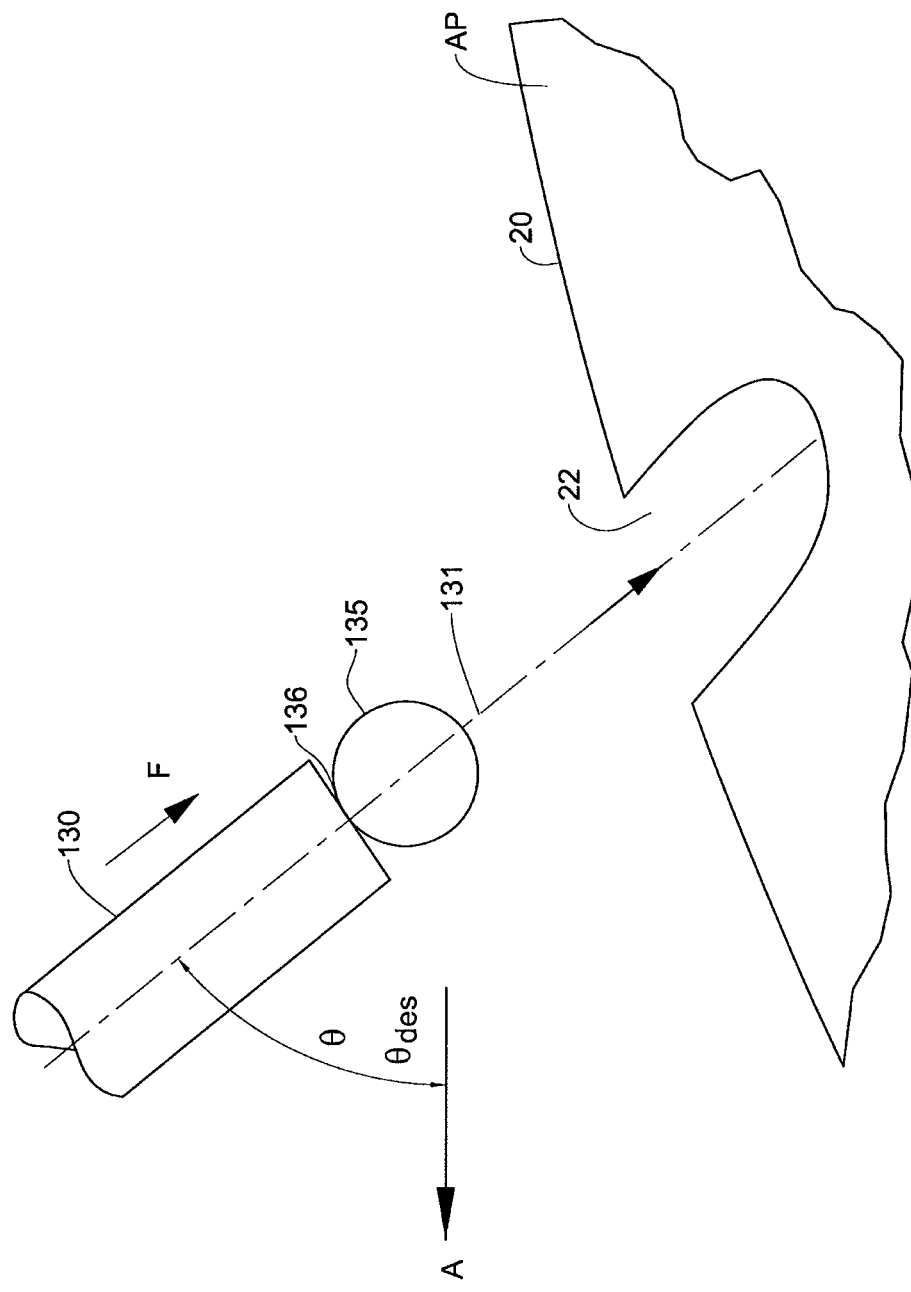
FIG. 10(a) is a partial side view of the example of the boom member of the refueling device of FIG. 3 in proximity to a fuel receptacle of a receiver aircraft.
Figure 10B:
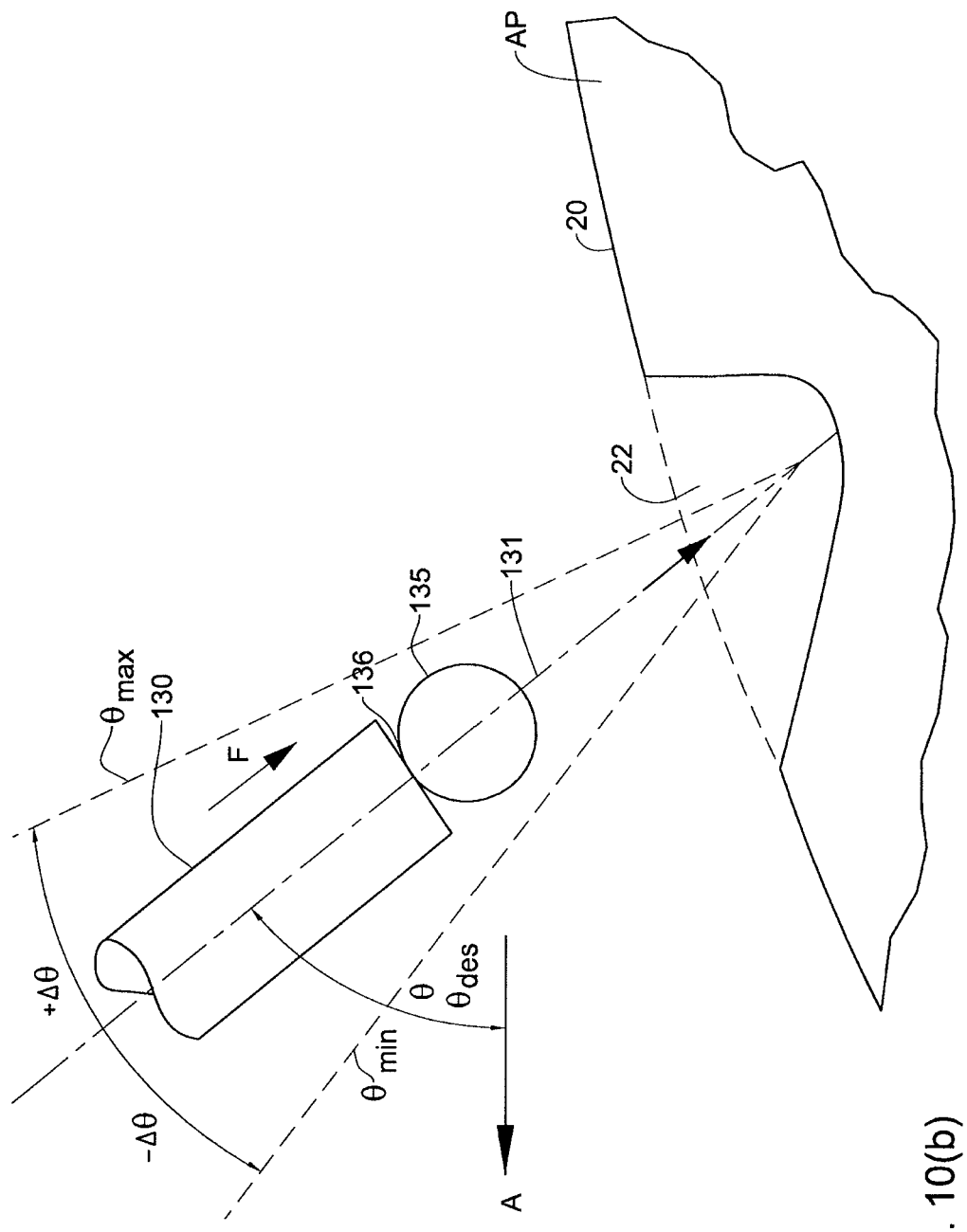
FIG. 10(b) is an alternative variation of the example of FIG. 10(a).
Figure 11:
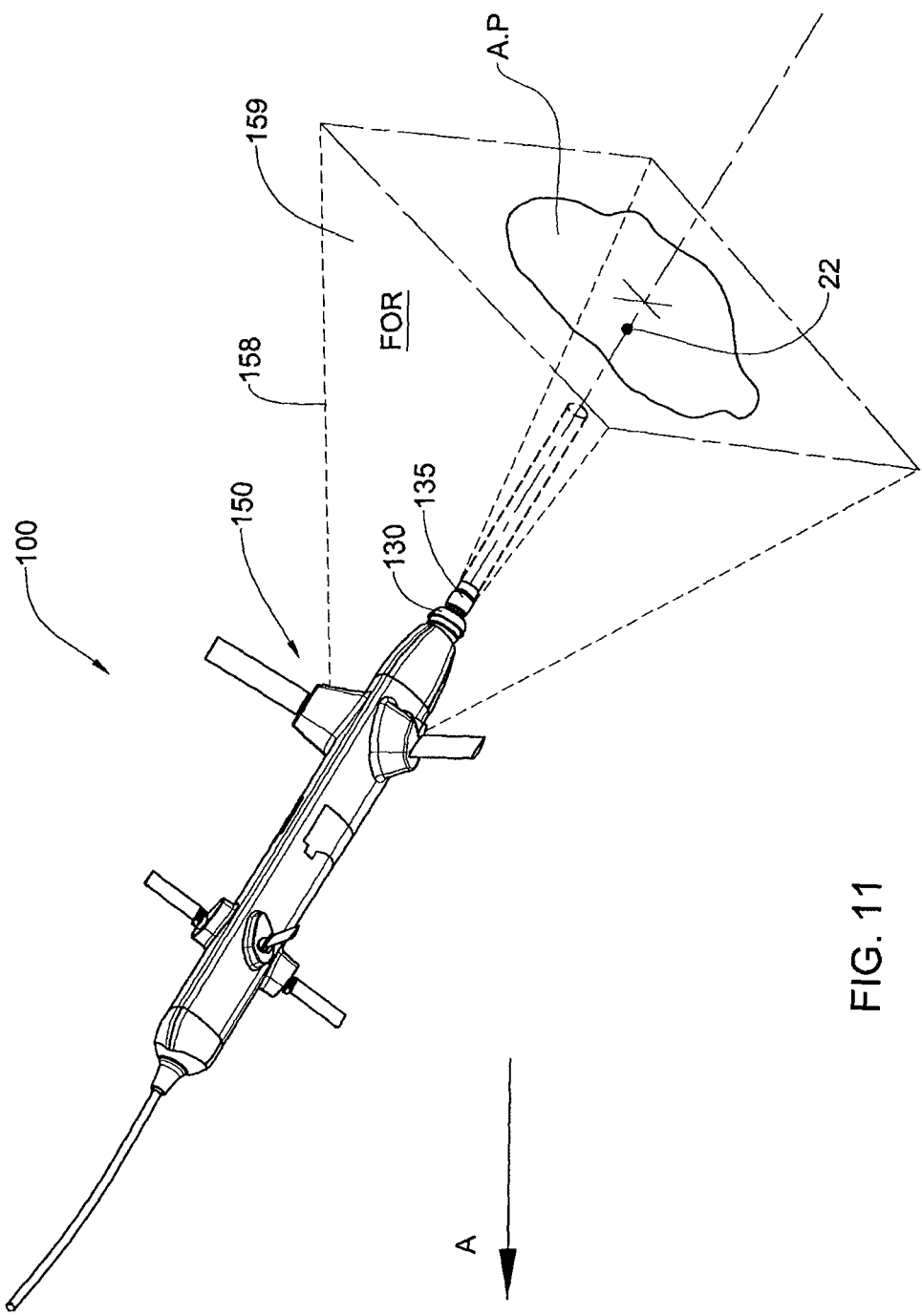
FIG. 11 is an isometric view of the refueling device of FIG. 3, further schematically illustrating a volume aft thereof.

In particular, and referring to FIG. 10(a) and FIG. 10(b), angle θ is such as to provide a design angle (angle $\theta_{des}$) that is within a particular angular range which corresponds to the design relative angular position of the boom member 130 (and boom axis 131) with respect to the receiver aircraft 20.

In particular, design angle $\theta_{des}$ is the design relative angular position of the boom axis 131 with respect to the longitudinal axis of the receiver aircraft 20 (the receiver aircraft 20 being at a predetermined spatial orientation relative to the forward direction, typically in horizontal forward flight), to enable the boom member 130 to align and engage the nozzle 135 with respect to the fuel receptacle 22. Thus, angle θ (which can have an angular component in yaw and/or in pitch and/or in roll) compensates for any off-nominal pitch of the receiver aircraft 20 (for example if the receiver aircraft 20 is traveling along direction A at a non-zero angle of attack) and/or for any off-nominal roll of the receiver aircraft 20 (for example if the receiver aircraft 20 is traveling along direction A at a non-zero roll angle) and/or for any off-nominal yaw of the receiver aircraft 20 (for example if the receiver aircraft 20 is traveling along direction A at a non-zero sideslip angle) to ensure that the actual angular disposition between the boom axis 131 and the receiver aircraft longitudinal axis is maintained at design angle $\theta_{des}$ even as the relative spatial orientation between the receiver aircraft 20 and the forward direction changes.

Thus, design angle $\theta_{des}$ the boom axis 131 is in an engagement enabling orientation with respect to the receiver aircraft 20, and in particular with respect to the fuel receptacle 22.

In non-limiting examples, angle θ (and in particular angle $\theta_{des}$) can be in a range between about 5° and about 85°; or in a range between about 10° and about 80°; or in a range between about 15° and about 70°; or in a range between about 20° and about 60°; or in a range between about 25° and about 50°; or in a range between about 20° and about 40°; or in a range between about 25° and about 40°; or in a range between about 28° and about 32°.

In one non-limiting example, angle $\theta_{des}$ can be about 30°, and operation of the refueling device 100 to adopt this angle automatically renders it compatible for use with existing receiver aircraft 20, in which the fuel receptacles 22 are configured for receiving and engaging with a nozzle at the end of a boom where the boom is at about 30° to the longitudinal axis of the receiver aircraft, without the need for modifying the configuration of the fuel receptacle thereof.

Thus, when angle θ is equal to design angle $\theta_{des}$, the receiver aircraft travelling along direction A with zero angle of attack and zero sideslip and zero roll, and boom axis 131 is at the required spatial orientation to the forward direction A of the tanker aircraft and the receiver aircraft such as to ensure engagement between the nozzle 135 in the fuel receptacle 22, without the need for modifying the configuration of the fuel receptacle thereof.

Figure 4:
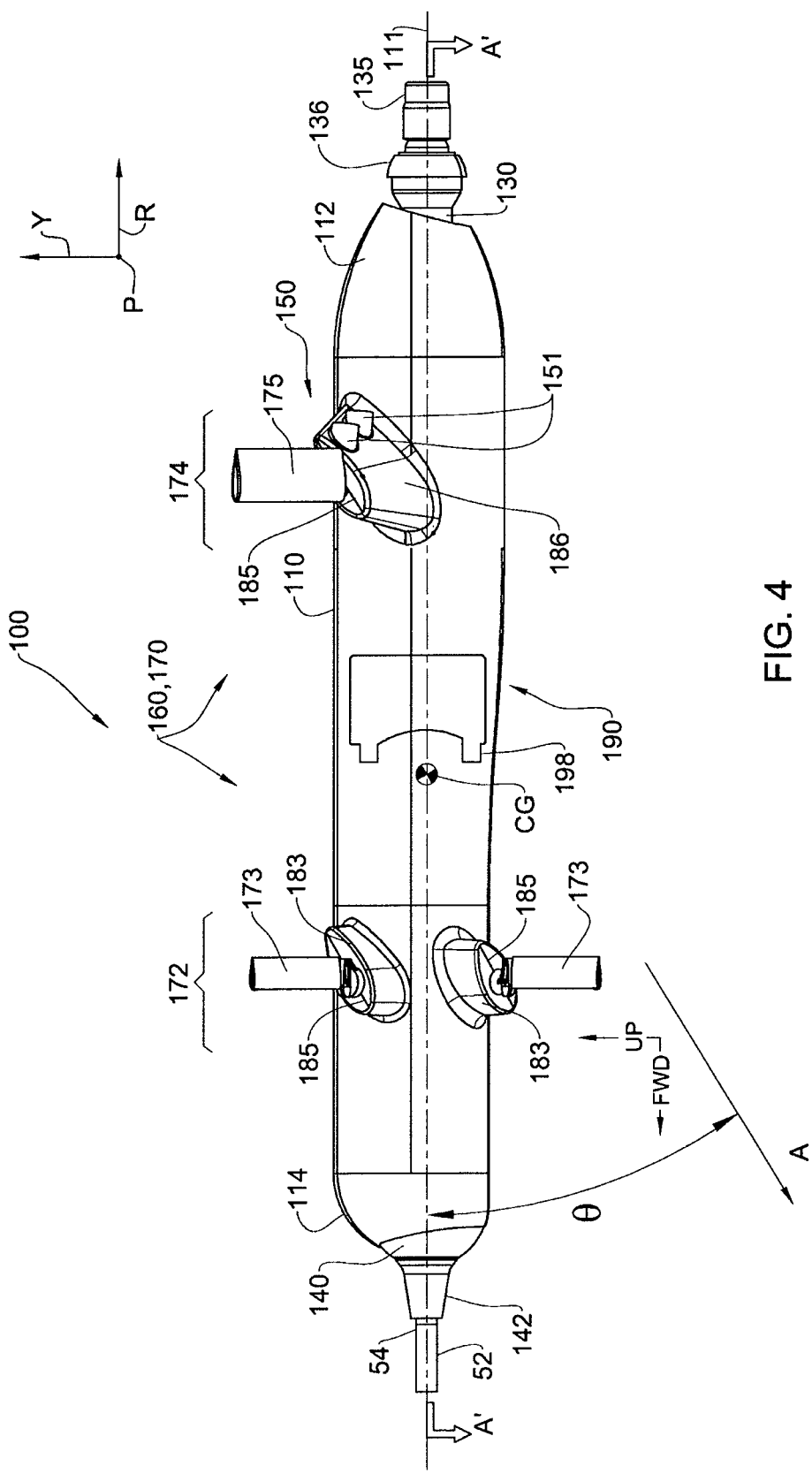
FIG. 4 is a side view of the refueling device of FIG. 3.
Figure 5:
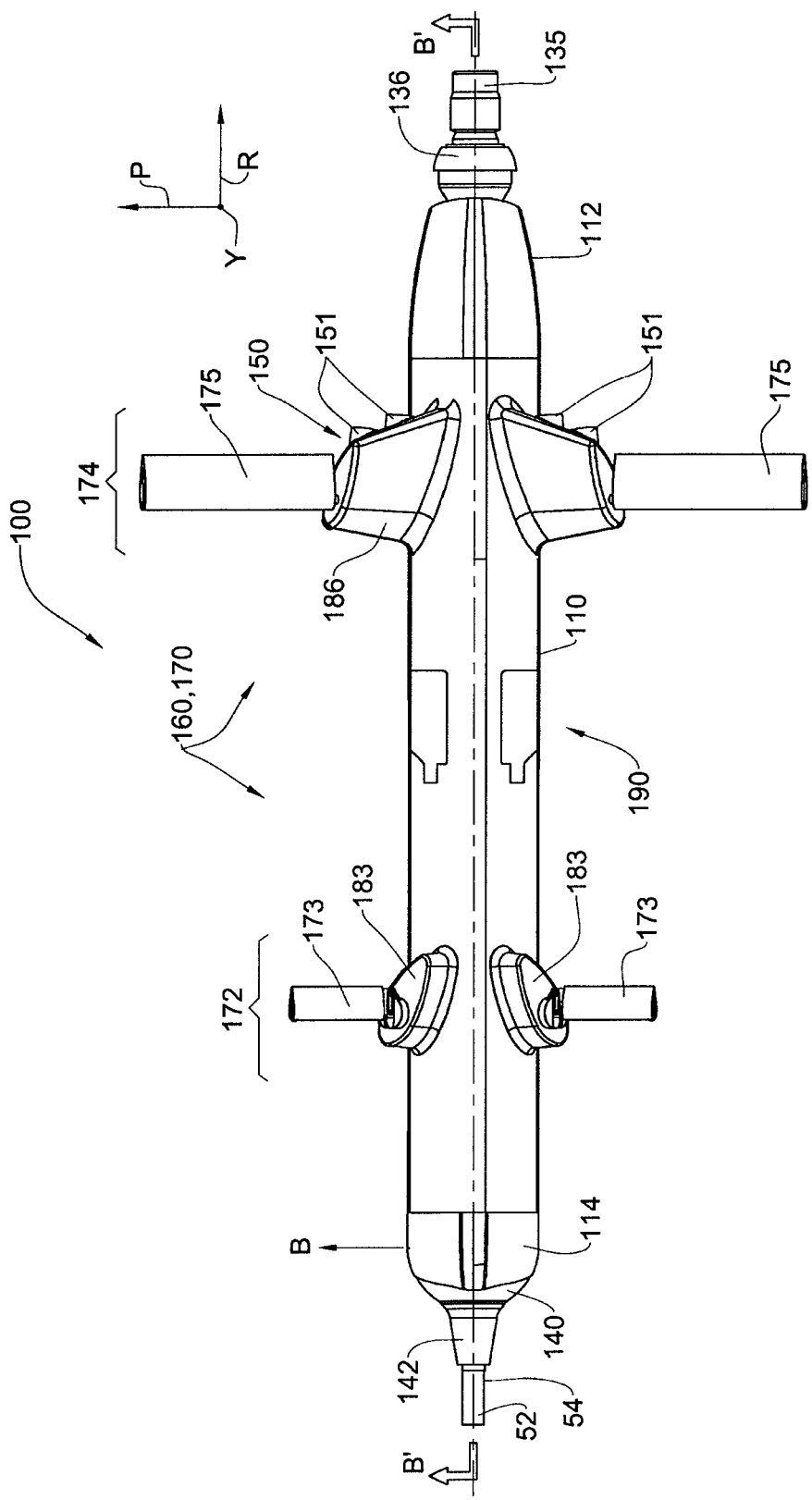
FIG. 5 is a top view of the refueling device of FIG. 3.

In this example, the spatial control system 160 comprises a selectively controllable aerodynamic control system 170, comprising a forward set 172 of aerodynamic control surfaces 173 mounted to body 110 at a forward portion thereof, and an aft set 174 of aerodynamic control surfaces 175 mounted to the body 110 at an aft portion thereof. Referring in particular to FIG. 4, the aft set 174 is thus in aft spaced relationship with respect to the forward set 172, and the center of gravity CG of the body 110 is disposed longitudinally intermediate the aft set 174 and the forward set 172, noting that the actual longitudinal position of the center of gravity CG can shift between two extreme longitudinal positions according to, inter alia, whether the boom member 135 is extended or retracted, and whether fuel is present in the refueling device 100 or absent therefrom. In alternative variations of this example and in other examples, the center of gravity can be forward of both the forward set and the aft set of aerodynamic surfaces, which are configured to provide the required stability to the refueling device 100 with the boom axis 131 at any desired pitch and/or yaw and/or roll angle.

In this example, the forward set 172 comprises four aerodynamic control surfaces 173 in cruciform "X" configuration (see in particular FIGS. 6(a) and 6(b)). Each aerodynamic control surface 173 is in the form of a vane, pivotably mounted to the body 110 via a respective boss 183 laterally projecting from the surface of body 110. Each boss 183 houses an actuator (not shown) for controlling the angular position of the respective vane about a respective pivot axis, and is controlled by controller 180. The pivot axes of the vanes are, in at least this example, orthogonal to at least one of longitudinal axis 111 and boom axis 135, and can also intersect the respective at least one of longitudinal axis 111 and boom axis 135.

In this example, controller 180 comprises any suitable computer control system, and is housed in the refueling device 100 (see FIG. 7). In alternative variations of this example and in other examples, the controller 180 or portions thereof can instead comprise any suitable electronic control unit, or any other suitable control unit. Additionally or alternatively, the controller or portions thereof can be comprised elsewhere in the in-flight refueling system 50 or in the tanker aircraft 12.

In this example, the aft set 174 comprises two aerodynamic control surfaces 175 in "Vee" configuration (see in particular FIGS. 6(*a*) and 6(*b*)). Each aerodynamic control surface 175 is in the form of a vane, pivotably mounted to the body 110 via a respective boss 186 laterally projecting from the surface of body 110. Each boss 186 houses an actuator (not shown) for controlling the angular position of the respective vane, and is also controlled by controller 180.

In this example, and referring in particular to FIG. 4, each boss 183 has an aerofoil-shaped cross section defining a chord 185, and each boss 186 has an aerofoil-shaped cross section defining a chord 185. Furthermore the chord 185 is oriented with respect to at least one of the longitudinal axis 111 and the boom axis 131 such as to align the chord 185 with the forward direction A, which is nominally the airflow direction with respect to the refueling device 100, when the refueling device 100 is at spatial orientation in which the boom axis 131 is at angle $\theta_{des}$ with respect to the forward direction A. Similarly, each chord 185 is oriented with respect to at least one of the longitudinal axis 111 and the boom axis 131 such as to align the chord 185 with the forward direction A when the refueling device 100 is at spatial orientation in which the boom axis 131 is at angle $\theta_{des}$ with respect to the forward direction A.

In alternative variations of this example or in other examples, the forward set aerodynamic control surfaces can comprise two or three or four or more than four vanes (or any other type of aerodynamic control surfaces), in any suitable configuration, including for example four vanes in cruciform "+" configuration, and/or, each vane (or other type of aerodynamic control surfaces) can be pivotable about a respective axis having any suitable spatial relationship with respect to the longitudinal axis of the refueling device and/or the axis of the boom member. Additionally or alternatively, the aft set aerodynamic control surfaces can comprise two more than two vanes (or any other type of aerodynamic control surfaces), in any suitable configuration. Additionally or alternatively, the respective aerodynamic control surfaces of the spatial control system, in the form of pivotable vanes or any other suitable configuration, are mounted to respective bosses, which can be aerodynamically shaped but at a different orientation with respect to the longitudinal axis 111 and/or the boom axis 131, or wherein the respective bosses can have a different shape, for example in the form of cylinders or any other prismatic shape or other shape, or wherein the respective aerodynamic control surfaces are directly mounted to the body 110 without bosses (in which case the respective actuators can be provided in the body 110).

Figure 12A:
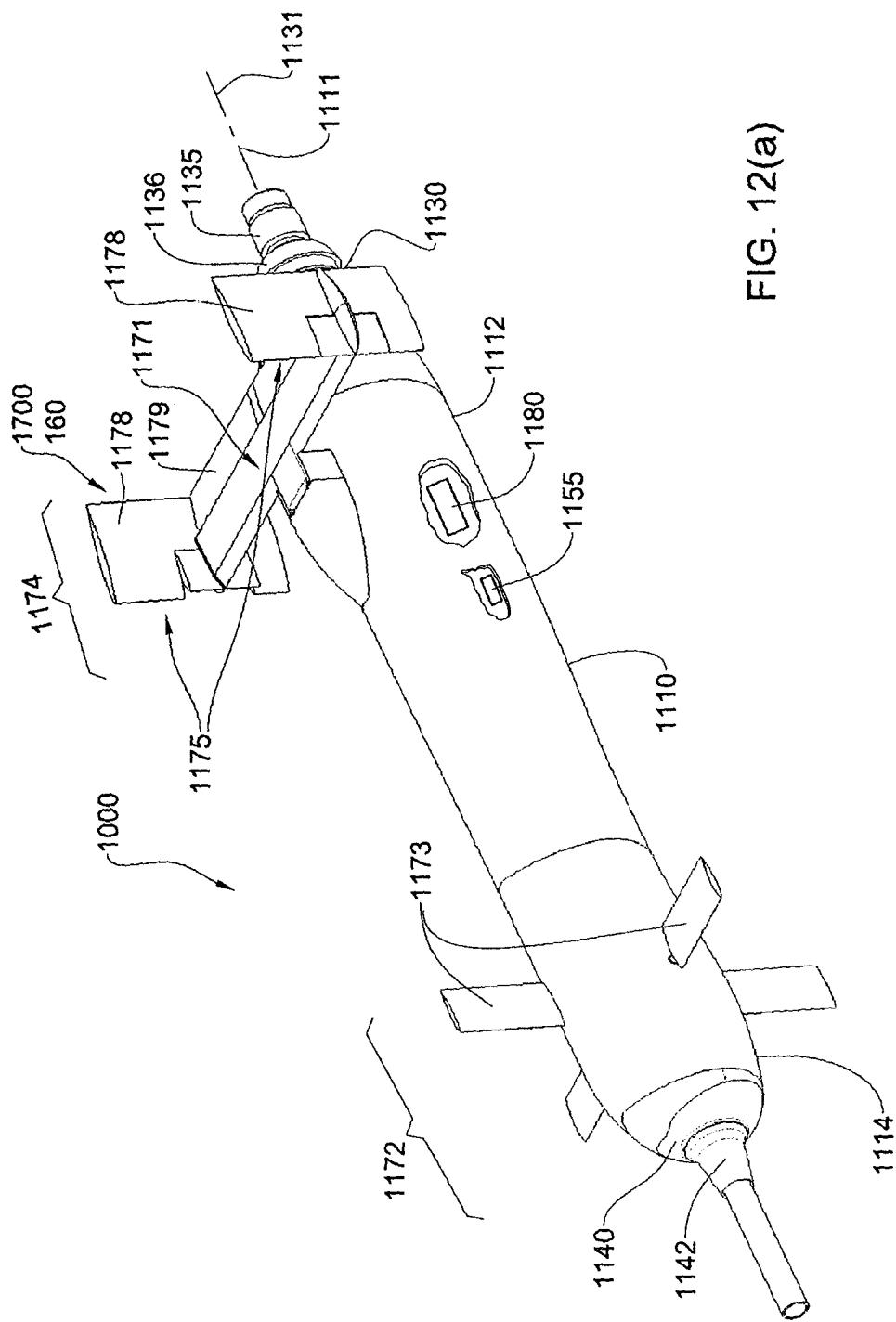
Figure 13A:
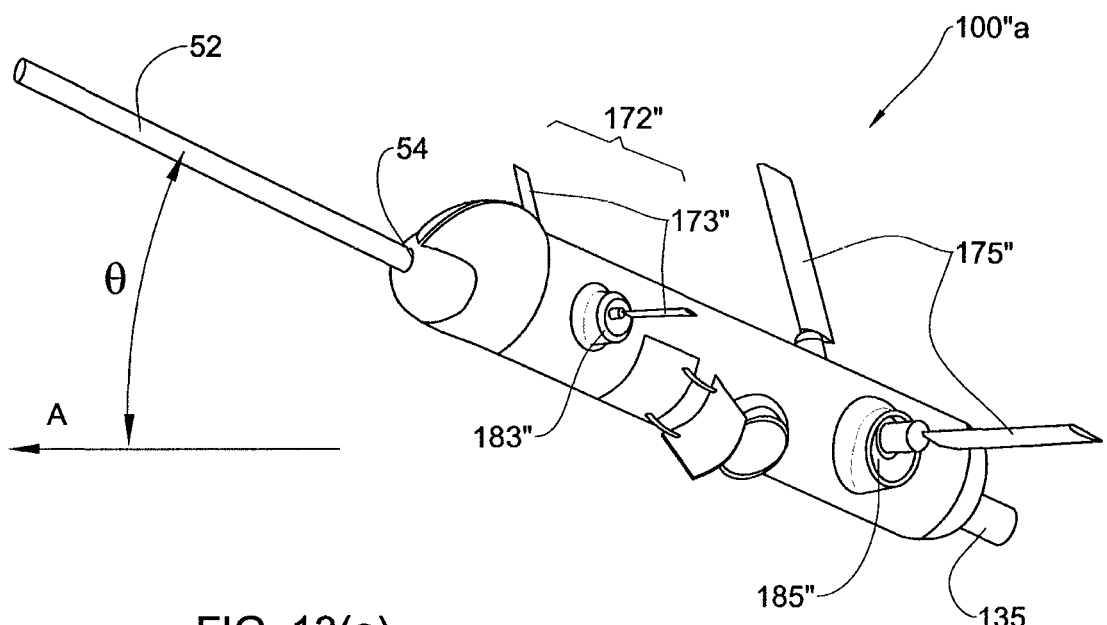
FIGS. 13(a) to 13(e) are respective isometric views of other alternative variations of the example of refueling device of FIG. 3.
Figure 13B:
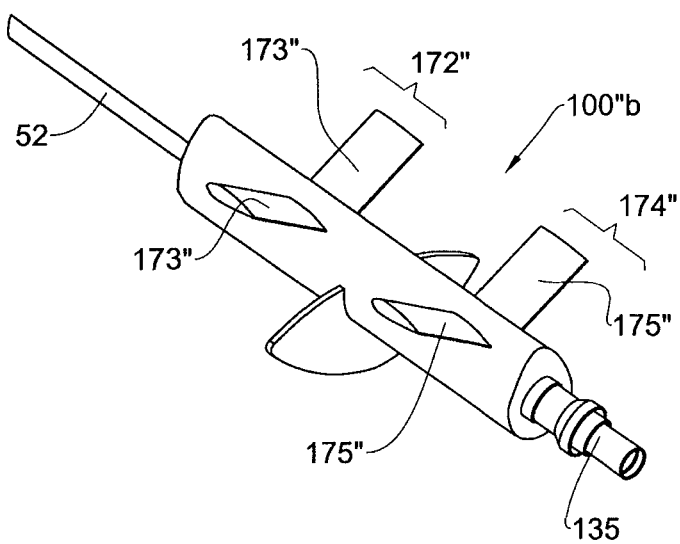
Figure 13C:
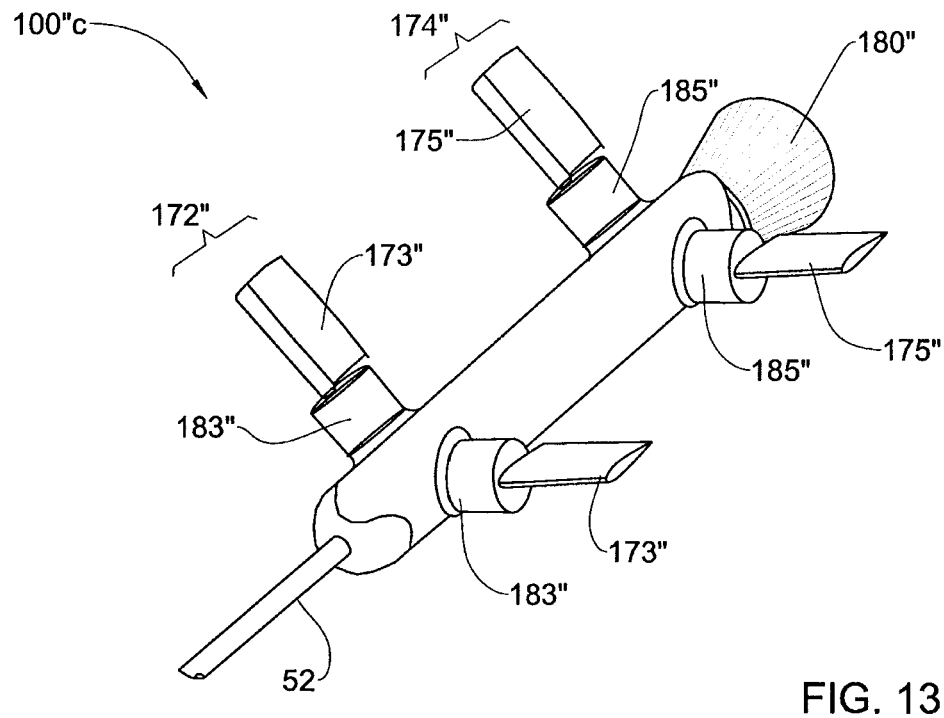
Figure 13D:
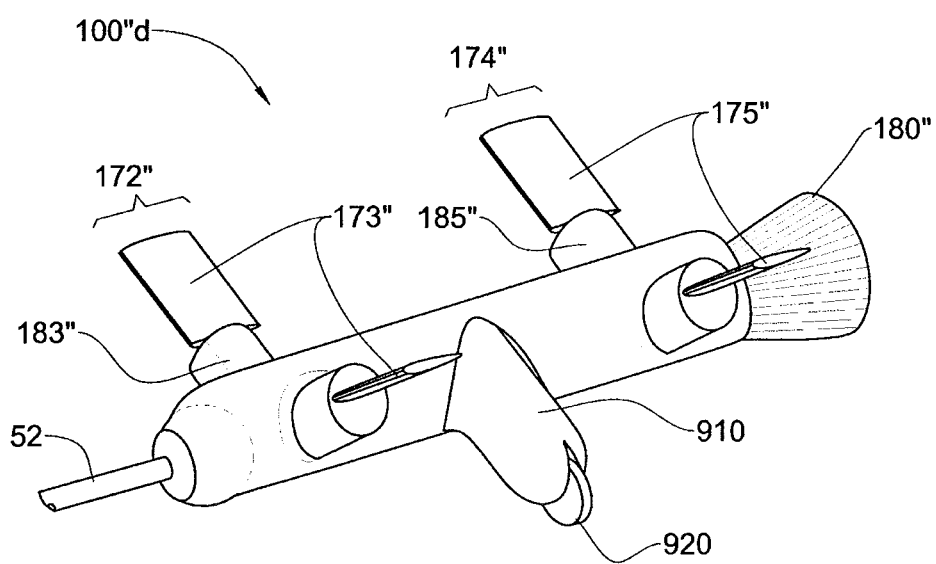
Figure 13E:
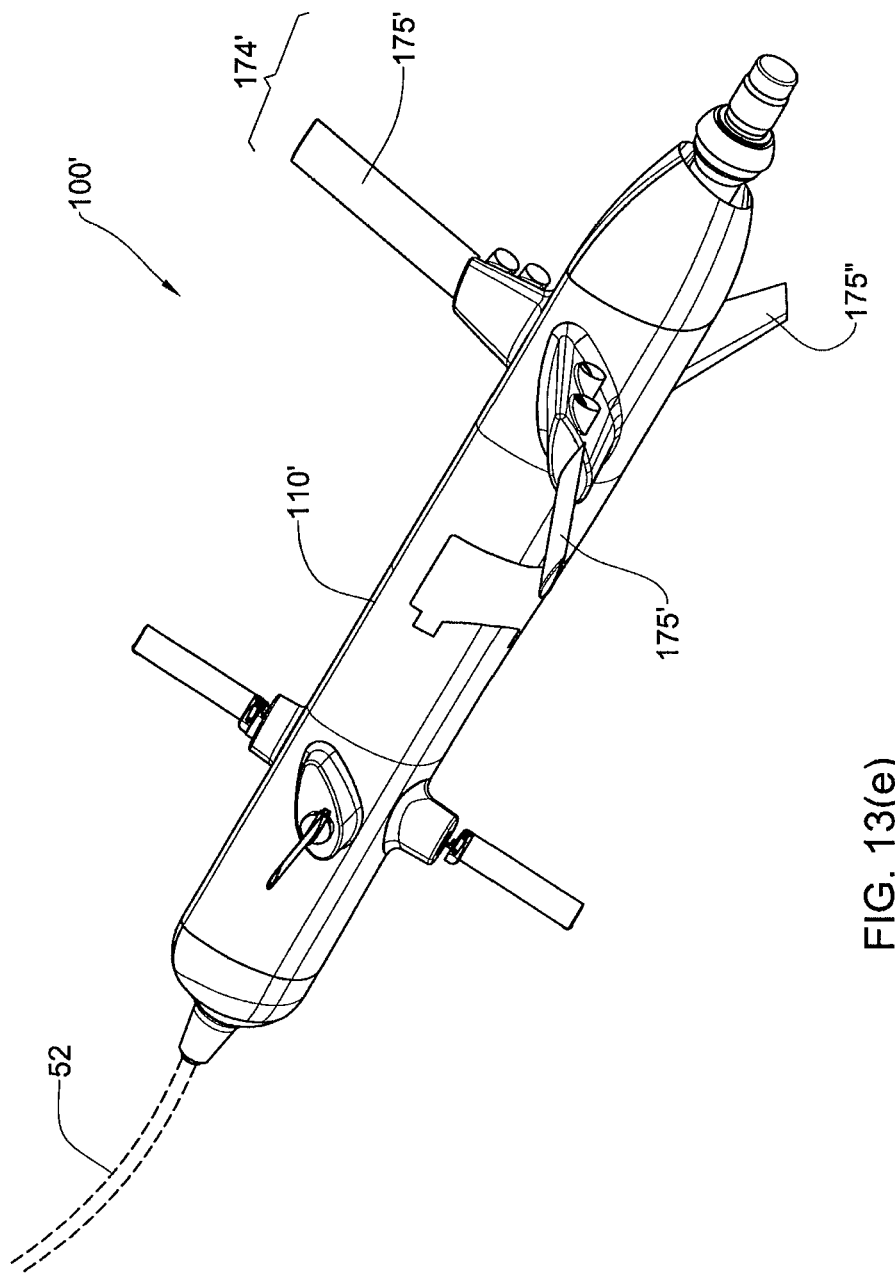

For example, one such alternative variation of the refueling device example of FIGS. 3 to 11 is illustrated in FIGS. 12(*a*) to 12(*d*), in which the respective example of the refueling device, designated 1,000, comprises all the elements and features of the refueling device 100, mutatis mutandis, with the main difference that the aerodynamic control system 170 of the example of the refueling device 100 is replaced with an alternative configuration for the spatial control system 160, comprising aerodynamic system 1170. Thus, the refueling device 1,000 comprises a body 1110, forward end 1114, aft end 1112, longitudinal axis 1111, fuel delivery lumen (not shown), boom member 1130, boom axis 1131, fuel delivery nozzle 1135, terminus 1136, coupling 1140, hose interface 1142, substantially similar to the corresponding components as described herein for the example of the refueling device 100 or alternative variations thereof, mutatis mutandis, i.e., respectively: body 110, forward end 114, aft end 112, longitudinal axis 111, fuel delivery lumen 120, boom member 130, boom axis 131, fuel delivery nozzle 135, terminus 136, coupling 140, hose interface 142. In addition, the refueling device 1,000 optionally comprises a force generating arrangement (not shown) for example substantially similar to force generating arrangement 190 as described hereinbelow, mutatis mutandis, and/or a suitable data acquisition system (not shown) for example substantially similar to imaging system 150, as described hereinbelow, mutatis mutandis, and/or a controller 1180, for example similar to controller 180 as described herein, mutatis mutandis, and/or a control computer system (not shown), for example similar to control computer system 155 as described herein, mutatis mutandis.

The aerodynamic system 1170 comprises a forward set 1172 of aerodynamic control surfaces 1173 mounted to body 110 at a forward end 1114 thereof, and an aft set 1174 of aerodynamic control surfaces 1175 mounted to the body 1110 at an aft portion 1112 thereof. The aft set 1174 is thus in aft spaced relationship with respect to the forward set 1172, and the center of gravity of the body 1110 is disposed longitudinally therebetween, though in alternative variations of this example and in other examples, the center of gravity can be forward or aft of both the forward set and the aft set of aerodynamic surfaces, which are configured to provide the required stability to the refueling device 1,000 with the boom axis 1131 at any desired pitch and/or yaw and/or roll angle.

In this example, the forward set 1172 comprises four aerodynamic control surfaces 1173 in cruciform "+" configuration, and each aerodynamic control surface 1173 is in the form of a vane, pivotably mounted to the body 1110 and operatively connected to an actuator system (not shown) for controlling the angular position of the respective vane about a respective pivot axis, and is controlled by controller 1180. The pivot axes of the vanes are, in at least this example, orthogonal to at least one of longitudinal axis 1111 and boom axis 1135, and can also intersect the respective at least one of longitudinal axis 1111 and boom axis 1135. In alternative variations of this example, the forward set 1172 may comprise any suitable configuration or vanes, wings, RCS, etc.

In this example, the aft set 1174 comprises a high H-tail configuration, comprising two vertical stabilizers 1175, one on either side of a horizontal stabilizer 1171, which in turn is mounted to the upper side of the aft end 1112. Each vertical stabilizer 1175 comprises a controllably pivotable rudder 1178, and the horizontal stabilizer 1171 comprises a pair of pivotable elevators 1179, which are controllably actuated by an actuator system (not shown) also controlled by controller 1180.

For example, four other such alternative example variations are illustrated in FIG. 13(*a*) to FIG. 13(*d*), respectively, in which for the respective refueling devices 100"*a*, 100"*b*, 100"*c* and 100"*d*, respectively, the respective forward set 172" comprises two aerodynamic control surfaces 173" in "Vee" configuration, and the respective aft set 174" comprises two aerodynamic control surfaces 175" in "Vee" configuration as in the first example, mutatis mutandis. In the example of FIG. 13(*a*) the aerodynamic control surfaces 173" are smaller than the aerodynamic control surfaces 175", while in the examples of FIG. 13(*b*) to FIG. 13(*d*) the aerodynamic control surfaces 173" are the same size nominally as the aerodynamic control surfaces 175". In yet other alternative variations of the example of FIGS. 13(*a*) to 13(*d*), the aerodynamic control surfaces 173" are larger than the aerodynamic control surfaces 175".

For example, another such alternative example variation is illustrated in FIG. 13(*e*), in which the respective aft set 174' for the refueling device 100' comprises three aerodynamic control surfaces, two aerodynamic control surfaces 175' in "Vee" configuration as in the first example, mutatis mutandis, and a third vane 175" in vertical and downwardly depending relationship with respect to the respective body 110'.

Figure 14A:
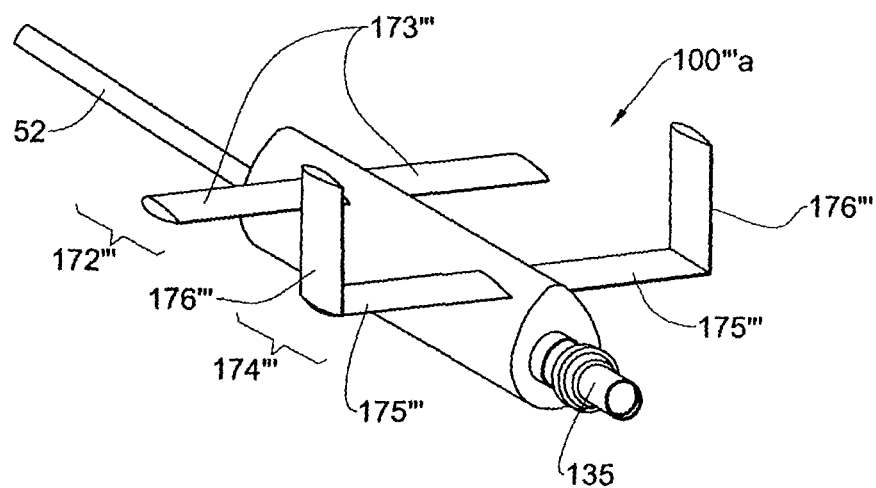
FIGS. 14(a) and 14(b) are respective isometric views of other alternative variations of the example of refueling device of FIG. 3.
Figure 14B:
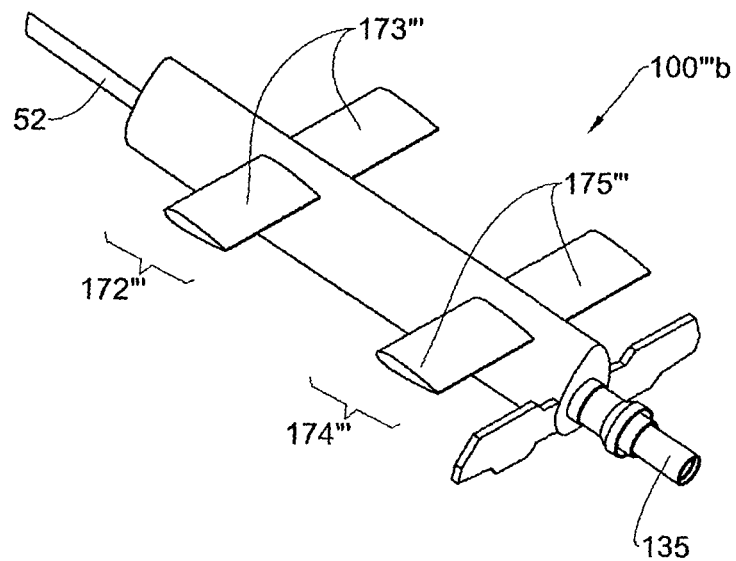

For example, two such alternative example variations are illustrated in FIGS. 14(*a*) and 14(*b*) in which the respective forward set 172''' for each respective refueling device 100'''*a*, 100'''*b* comprises two aerodynamic control surfaces 173" with zero dihedral, and the respective aft set 174''' also comprises two aerodynamic control surfaces 175''' with zero dihedral. In the example of FIG. 14(*b*), each aerodynamic control surfaces 175''' further comprises a vertical vane 176''' in upwardly depending relationship with respect to the aerodynamic control surfaces 175''' at the respective wing tips.

For example, in the alternative example variations illustrated in FIGS. 13(*a*), 13(*c*) and 13(*d*), the respective forward aerodynamic control surfaces 173" are pivotably mounted to cylindrically shaped bosses 183", and the respective aft aerodynamic control surfaces 175" are pivotably mounted to cylindrically shaped bosses 185". On the other hand, in the examples illustrated in FIGS. 13(*b*), 14(*a*) and 14(*b*), the respective forward and aft aerodynamic control surfaces are pivotably mounted directly to the body of the respective refueling device.

Referring again to the example of FIGS. 3 to 10, the aerodynamic control system 170 is configured for allowing the refueling device 100 to adopt any desired angle θ while maintaining a zero pitching moment (and/or zero yawing moment and/or zero rolling moment), as the forward set 172 of aerodynamic control surfaces 173 is configured for trimming any pitching moment (and/or yawing moment and/or rolling moment, respectively) generated by aft set 174 of aerodynamic control surfaces 175 at a given pitch angle (and/or yaw angle and/or roll angle, respectively) of the body 110, or vice versa. In this example, where the center of gravity CG is longitudinally intermediate the forward set 172 and the aft set 174, the trimming pitching moment generated by the forward set 172, for example is in a counter-rotational direction with respect to the pitching moment generated by aft set 174 to maintain a particular pitch angle for angle θ, while the pitch forces generated by forward set 172 and the aft set 174 are in the same direction. In alternative variations of this example or in other examples in which the center of gravity of the refueling device is forward of both the forward set and the aft set of aerodynamic control surfaces, the trimming pitching moment generated by the forward set of aerodynamic control surfaces, for example, is also in a counter-rotational direction with respect to the pitching moment generated by aft set of aerodynamic control surfaces to maintain a particular pitch angle for angle θ, but the pitch forces generated by forward set of aerodynamic control surfaces and the aft set of aerodynamic control surfaces are in opposite directions. In yet other examples, the refueling device comprises the spatial control system in the form of a single set of aerodynamic control surfaces which are configured for generating zero pitch moment for a desired range of pitch angles corresponding to angle θ, and the spatial control system is self-trimming to provide stable pitch angle corresponding to angle θ.

In the first example, the aft aerodynamic control surfaces 175 are larger than the forward aerodynamic control surfaces 173, though in alternative variations of this example and in other examples, the aft aerodynamic control surfaces 175 can be the same size or smaller than the forward aerodynamic control surfaces 173.

In other variations of this example and in other examples, the spatial control system 160 comprises a non-adjustable aerodynamic control system that is configured for allowing the refueling device 100 to adopt a particular, pre-set, desired angle θ while maintaining a zero pitching moment (and/or zero yawing moment and/or zero rolling moment), this being the design angle $\theta_{des}$, at least at one set of conditions associated with the refueling—for example at a particular forward speed and altitude. Thus, once the refueling device is towed behind the tanker aircraft 12 via the hose 52, the boom axis automatically adopts the particular design angle $\theta_{des}$, and stably maintains this relative spatial disposition at the aforesaid set of conditions until the refueling device is retracted back into the tanker aircraft 12.

In other variations of this example and in other examples, the spatial control system 160 comprises a selectively controllable control system that is not based on aerodynamic control surfaces. For example, a plurality of suitable thrust nozzles or other suitable reaction control thruster system (RCS) can be mounted to the body to provide thrust vector control and maintain the boom axis 131 at any desired angle θ. Such thrusters or RCS can be operatively connected to a suitable compressed air supply or compressed gas supply, for example carried by the refueling device itself, or carried by the tanker aircraft and supplied to the refueling device via pneumatic or gas lines, or generated by the tanker aircraft and/or the refueling device using a suitable compressor taking air from the atmosphere.

Referring in particular to FIGS. 3, 4, 5, 9(*a*), 9(*b*) and 10, the refueling device 100 further comprises a force generating arrangement 190. The force generating arrangement 190 is configured for selectively generating a force F (FIGS. 9(*a*) to 11) along the boom axis 131 in a direction towards nozzle 135. In this example, the force generating arrangement 190 selectively generates force F as a drag, and is in the form of a selectively and reversibly deployable drag inducing arrangement 192, comprising a selectively and reversibly deployable air brake system 194. The air brake system 194 comprises a port air brake 195 and a starboard air brake 196, each comprising a curved plate 197 pivotably hinged laterally to the body 110 via hinges 198 between a closed position, in which the plate is received in a recess 199 (best seen in FIGS. 9(*a*) and 9(*b*)) and the outer surface of the plate 197 is flush with the outer surface of body 110, and an open position in which the plate offers a maximum frontal surface area to the airflow and thereby generates drag. The hinges 199 are forwardly disposed so that the convex outer surface of each one of the port air brake 195 and of the starboard air brake 196 faces the airflow. Suitable actuators (not shown) are operatively connected to and operate the air brakes 195, 196, controlled by controller 180. Alternatively, and as illustrated for the example of FIG. 13(*a*), the hinges 199 can be disposed aft of the respective plates 197 so that the convex outer surface of each one of the port air brake 195 and the starboard air brake 196 faces away from the airflow. In the example of FIG. 13(*d*) the force inducing arrangement 190 is an airbrake in the form of plate 920 that is selectively laterally deployable and retractable with respect to airbrake housing 910.

The force generating arrangement 190 is in particular configured for selectively generating a force F having a magnitude sufficient for forcing the nozzle 135 into engagement with the fuel receptacle 22 of the receiver aircraft (FIG. 11) when the nozzle 135 (and the boom member 130) and the fuel receptacle 22 are in a predetermined relative spatial disposition, i.e., when the refueling device 100 reaches an engagement enabling position and the boom axis is in the engagement enabling orientation with respect to the receiver aircraft 20, and in particular with respect to the fuel receptacle 22.

The force generating arrangement 190 is further configured for selectively operating in this manner responsive to the nozzle 135 being in a predetermined proximity to the fuel receptacle 22, i.e. responsive to the nozzle 135 being in a predetermined spacing with respect to the fuel receptacle 22, typically the engagement enabling spatial position, and can be operated manually or automatically to provide such a force F, as will become clearer herein.

Thus, at the engagement enabling position, when the boom member 130, or the boom axis 131, is in a predetermined spatial disposition with respect to the fuel receptacle 22 and the nozzle 135 being in a predetermined spacing with respect to the fuel receptacle 22 (i.e., at the engagement enabling position the boom axis is at the engagement enabling orientation—corresponding to the design angle $\theta_{des}$), the force generating arrangement 190 can be selectively actuated to compel the boom member 130 to follow a predetermined trajectory, for example aligned with the boom axis 131 in the direction of the receiver aircraft 20, to ensure alignment and engagement between the nozzle 135 and the fuel receptacle 22. In this example, the boom 130 is telescopically extended to the extended position in a direction along the boom axis 131, which is maintained at the engagement enabling orientation—corresponding to the design angle $\theta_{des}$, while the body 110 remains at the same spatial disposition with respect to the receiver aircraft 20. In alternative variations of this example, the boom 130 is partially or fully telescopically extended towards the receiver aircraft 20 while the device 100 can be moved towards or away from the receiver aircraft 20 to effect engagement between the nozzle 135 and the fuel receptacle 22. In other alternative variations of this example, the boom member 130 remains retracted, and the body 110 itself is moved towards the receiver aircraft 20 along a the direction of the boom axis, maintaining the boom axis 131 at the engagement enabling orientation—corresponding to the design angle $\theta_{des}$, to effect engagement between the nozzle 135 and the fuel receptacle 22.

Once the nozzle 135 is forced into engagement with the fuel receptacle 22 of the receiver aircraft 20, the tanker aircraft 12 can begin refueling the receiver aircraft 20.

In alternative variations of this example and in other examples, the force generating arrangement 190 can comprise any other suitable drag inducing arrangement, for example spoilers on the vanes 175.

In yet other variations of this example and in other examples, the force generating arrangement 190 can be configured for generating a thrust force in the required direction. For example, one or a plurality of suitable thrust nozzles can be mounted to the body to provide the required thrust vector parallel to the boom axis 131 towards nozzle 135. Such thrust nozzle(s) can be operatively connected to a suitable compressed air or compressed gas supply, for example carried by the refueling device itself, or carried by the tanker aircraft and supplied to the refueling device via pneumatic or gas lines, or generated by the tanker aircraft and/or the refueling device.

In yet other alternative variations of this example and in other examples, the force generating arrangement can be omitted, and for example the receiver aircraft and/or the boom member can comprise suitable means for mechanically engaging the nozzle to the fuel receptacle that does not require such a force F to be generated by the device 100. For example, the fuel receptacle can comprise a suitable mechanical clamp that engages the terminus 136 of the boom member 130, and pulls in the nozzle 135 into engagement with the fuel receptacle 22.

Referring in particular to FIGS. 4, 5, 10 and 11 the refueling device 100 further comprises a suitable data acquisition system for providing or enabling the calculation of spatial data relating to the relative spatial dispositions between the refueling device 100 and the receiver aircraft 20, in particular the relative spatial dispositions between the fuel delivery nozzle of the refueling device 100 and the fuel receptacle of the receiver aircraft, to enable selectively controlling the refueling device to provide automatic (optionally including autonomous) and/or manual steering of the refueling device 100 to the engagement enabling position and subsequent selective engagement of the fuel delivery nozzle to the fuel receptacle of the receiver aircraft. At least in the example of FIGS. 4, 5, 10 and 11, the data acquisition system is in the form of imaging system 150, in particular configured for providing imaging data of any object coming within a field of regard (FOR) aft of the refueling device 100. Such a field of regard has a predetermined depth aft of the imaging system and in this example comprises sensing volume 159 aft of the imaging system 150, which while in this example comprises a prismoidal volume in alternative variations of this example the FOR can have any suitable shape, for example conical, frustoconical, cylindrical, spherical, part-spherical (e.g. hemispherical), parallelepiped (for example cubic) or any other regular or irregular shape. The sensing volume 159, i.e., the predetermined depth of the FOR, extends aft further than is required corresponding to the engagement enabling position, i.e., further than the maximum extension of the boom member 130 when this is in its fully deployed position. The imaging system 150 is operatively connected to a control computer system 155, which can be integral with, connected to, or independent from controller 180 (see FIG. 8). In particular, and referring particularly to FIGS. 10 and 11, such an object is the receiver aircraft 20 and more particularly a part AP thereof including the fuel receptacle 22, and the sensing volume 159 defines an outer envelope limit 158 in which image data of part AP can be processed, inter alia, by control computer system 155 to provide control signals, for example steering commands, to the spatial control system 160 and/or the force generating arrangement 190, for example via controller 180 to control operation of the refueling device 100, in particular the relative spatial position and orientation of the refueling device 100 with respect to the receiver aircraft 20, in particular the position and orientation of the boom member 130 and nozzle 135 with respect to the fuel receptacle 22, so that the nozzle 135 can be controllably brought into selective engagement with the fuel receptacle 22 in a safe and effective manner. The manner of operation of the imaging system 150 and control computer system 155 will be described in greater detail further herein.

In this example, the imaging system 150 comprises two pairs of flash ladar units 151, also referred to interchangeably herein as FLADAR units, one pair on the trailing edge of each boss 186. Suitable FLADAR units can include, for example, a PMD [Vision]® CamCube 3.0, provided by PMD Technologies, Germany, and adapted for operating within the refueling unit and at the flight conditions thereof.

In operation the FLADAR units 151 illuminate the sensing volume 159 and any object therein, in particular part AP of the receiver aircraft 20 and thereafter acquire suitable image data corresponding thereto which is sent to control computer system 155 for processing to provide the aforesaid control signals for controlling the refueling device 100. In particular, by means of the FLADAR units 151, a 3D image of the areas AP is reconstructed, and manipulated via a computer system to determine the relative position and orientation of the nozzle 135 with respect to the fuel receptacle 22.

The sensing volume 159 thus includes the engagement enabling position.

In alternative variations of this example and in other examples, the imaging system 150 can comprise any other suitable imaging system (for example, but not limited to, systems providing 2D images and/or stereoscopic images and/or 3D images of (including reconstruction of 3D data corresponding to) the sensing volume 159, in particular but not limited to images that are updated in real time, for example in the form of a video stream) that operate to provide suitable data to the control computer system 155 to, in turn, enable selectively controlling the refueling device 100 to provide autonomous and/or manual engagement of the nozzle 135 to the fuel receptacle 22 of the receiver aircraft 20.

In alternative variations of this example, the imaging system 150 can be replaced with any other suitable data acquisition system for providing the aforesaid spatial data.

In yet other alternative variations of this example and in other examples, the refueling device 100 can omit the imaging system 150 and can be actively controlled by an operator, for example, to control the relative spatial position and orientation of the refueling device 100 with respect to the receiver aircraft 20, in particular the spatial position and orientation of the boom member 130 and/or nozzle 135 with respect to the fuel receptacle 22, so that the nozzle 135 can be controllably brought into selective engagement with the fuel receptacle 22 in a safe and effective manner, for example via direct visual tracking of the device by the operator. Alternatively, the refueling device can be operated as a free flying refueling device towed at the end of hose 52, and the relative spatial position and orientation of the refueling device 100 with respect to the receiver aircraft 20 (in particular the position and orientation of the boom member 130 and nozzle 135 with respect to the fuel receptacle 22, so that the nozzle can be controllably brought into selective engagement with the fuel receptacle 22 in a safe and effective manner) is achieved by maneuvering the receiver aircraft only. In such a case, the spatial control system 160 can optionally comprise a non-adjustable aerodynamic stability system that is configured for allowing the refueling device 100 to adopt a particular, pre-set, desired angle θ while maintaining a zero pitching moment (and/or zero yawing moment and/or zero rolling moment), this being the design angle $θ_{des}$ as discussed above for example.

Optionally, a suitable air-driven generator can be provided in the refueling device 100 to provide electrical power thereto. Additionally or alternatively, electrical power can be provided to the refueling device 100 by the tanker aircraft 12. Additionally or alternatively, electrical power can be provided to the refueling device 100 by one or more batteries in the refueling device 100. Additionally or alternatively, electrical power can be provided to the refueling device 100 by one or more ram air turbines (RAT), affixed internally or externally with respect to the refueling device 100.

In at least some alternative variations of the first example the refueling device can comprise an aerodynamic stabilizer arrangement, different from the spatial control system 160 or from the force generating arrangement 190. For example, each one of the alternative example variations illustrated in FIGS. 13(*c*) and 13(*d*) comprises such an aerodynamic stabilizer arrangement in the form of a respective drogue structure 180" fixed to the aft portion of the body. Such a drogue structure 180" can be utilized for generating a drag which in turn induces a tension to the hose 52, thereby aiding reduction or dampening of vibrations or oscillations in the hoe 52 that can otherwise occur. Such a drogue structure can also be provided for other examples, for example the first example illustrated in FIG. 3 or alternative variations thereof.

In the example of FIGS. 15(*a*) to 15(*d*), the respective refueling device 100E comprises an aerodynamic stabilizer arrangement in the form of a drogue structure 180E forwardly spaced from a forward end 114E of the frustoconical body 10E of refueling device 100E by a length pipe 52E, which is flexible but can be articulated instead, and the body 10E comprises a spatial control system 160E comprising a selectively controllable aerodynamic control system 170E, comprising a forward set 172E of two swept back aerodynamic control surfaces 173E mounted directly to body 10E at a forward portion thereof, and an aft set 174E of two aerodynamic control surfaces 175E directly mounted to the body 10E at an aft portion thereof in "Vee" configuration, a deployable airbrake system 190E provided on the aft end of multi-segmented telescopic boom 130E, which comprises a nozzle 135E at the terminus 136E thereof.

The in-flight refueling systems 50 including the first example of the refueling device 100 or at least some alternative variations thereof, can be operated in a number of different ways to provide selective engagement of the nozzle 135 with the fuel receptacle 22 of a receiver aircraft 20, and enable subsequent refueling of the receiver aircraft 20 from the tanker aircraft 12 in flight, for example as disclosed herein.

Referring to FIGS. 16(*a*) to 16(*d*), a second example of the refueling device, designated herein with reference numeral 200, comprises the elements and features of the first example and/or of at least some alternative variations thereof, mutatis mutandis, with some differences, as will become clearer herein, and the refueling device 200 is configured for use with an in-flight refueling system, for example at least one of the in-flight refueling systems 50 illustrated FIGS. 1 and 2.

For convenience, and referring to FIG. 16(*a*) for example, a roll axis R, a pitch axis P and a yaw axis Y can be conventionally defined with respect to the refueling device 200. The roll axis R is parallel to or co-axial with the longitudinal axis 211 of the device 200; the pitch axis P is generally in lateral and orthogonal relationship to the roll axis R (i.e., parallel to the horizontal when the body is at a zero roll angle); and yaw axis Y is in orthogonal relationship to the roll axis R the pitch axis P (i.e., parallel to the vertical when the body is at a zero pitch angle).

Refueling device 200 is affixed to the end 54 of hose 52 and comprises body 210 comprising a longitudinal axis 211, a fuel delivery lumen 220, and a substantially rigid boom member 230 in fluid communication therewith. The boom member 230 comprises a plurality of telescopic elements 232, defines a boom axis 231, and comprises a fuel delivery nozzle 235 at a terminus 236 of the boom member 230. The nozzle 235 is configured for reversibly engaging with the fuel receptacle 22 of a receiver aircraft 20, and thus can be similar to the nozzle 135 of the first example and as disclosed above, mutatis mutandis.

Figure 16B:
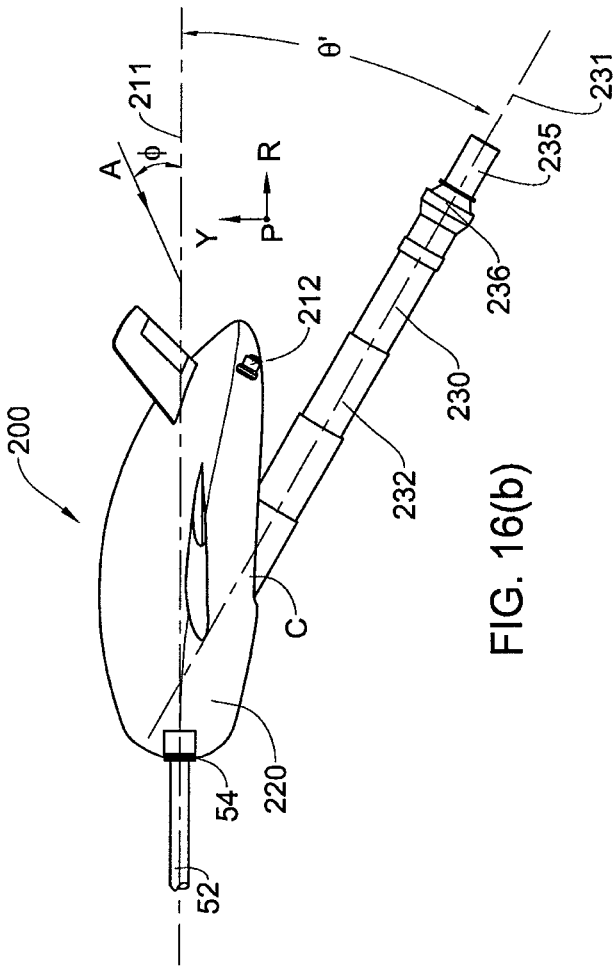
FIGS. 16(a) to 16(d) illustrate another example of a refueling device according to the presently disclosed subject matter, in isometric view, side view, top view and front view, respectively.
Figure 16A:
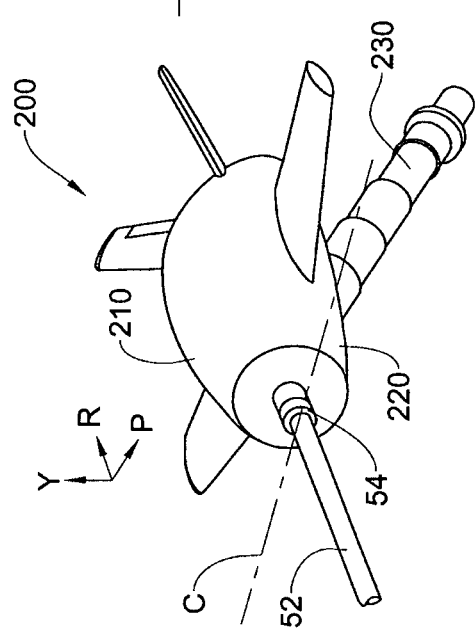
Figure 16D:
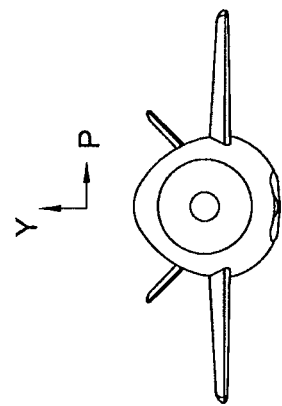
Figure 16C:
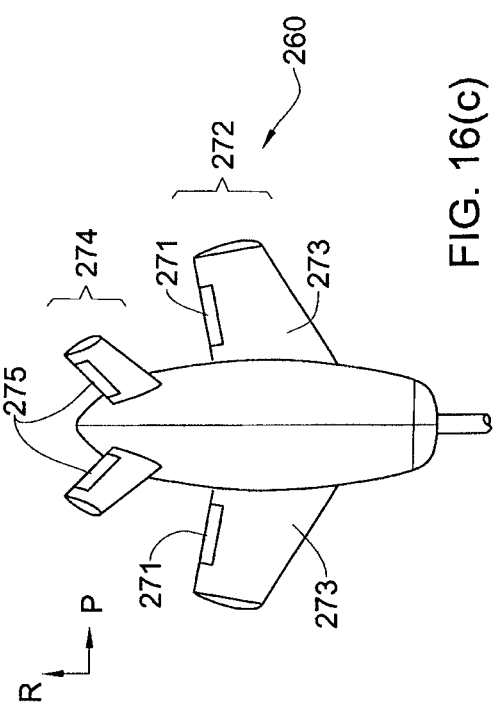

The boom member 230 is telescopically and pivotably mounted to body 210 about axis C (generally parallel to the pitch axis P of the body 210), and is reversibly movable from a stowed position in which the telescopic elements 232 are retracted and nested in one another and the boom member 230 is pivoted about axis C into a position accommodated in body 210 (wherein optionally the boom axis 231 can be generally parallel to longitudinal axis 211), to a deployed position illustrated in FIGS. 16(a) and 16(b). In the deployed position, the boom member 230 can be, by means of a controllable actuation mechanism (not shown), controllably variably extended in an aft direction from the aft end 212 of body 210, up to the fully extended position illustrated in FIGS. 16(a) and 16(b), and/or variably pivoted about pivot axis C in a downward direction to provide a non-zero angular displacement, angle θ', between boom axis 231 and longitudinal axis 211. In this example, angle θ' is in pitch, though in alternative variations of this example angle θ' may also include angular components in yaw and/or roll. Such angular components in yaw and/or roll may be additionally provided by suitably orienting the device 200 with respect to the yaw axis Y and/or roll axis R, respectively. In variations of this example where the boom axis 231 can only be pivoted with respect to the body 210 about an axis parallel to the pitch axis P, such angular components in yaw and/or roll may be alternatively and exclusively provided by suitably orienting the device 200 with respect to the yaw axis Y and/or roll axis R, respectively.

The body 210 optionally comprises a coupling 240 at forward end 214 thereof, similar to the coupling 140 of the first example or alternative variations thereof and as disclosed above, mutatis mutandis.

The refueling device 200 further comprises a spatial control system 260, configured for controlling a spatial disposition of the refueling device 200 when towed aft of the tanker aircraft 12 via the hose 52. In particular, spatial control system 260 is configured for selectively and controllably providing a non-zero angular disposition, angle θ, between the boom axis 231 and the forward direction A, and enables this angle θ to be selectively maintained between the boom axis 231 and the forward direction A when the refueling device 200 is being towed by the tanker aircraft 12 via hose 52, similar to the corresponding feature of the first example or alternative variations thereof and as disclosed above, mutatis mutandis. Thus, in particular, angle θ is in pitch, i.e., about a pitch axis P of the refueling device 200 and is defined on a plane including the roll axis R and the yaw axis Y of the refueling device 200. Nevertheless, and depending on specific conditions during any particular refueling operation, angle θ can instead include an angular displacement component between the boom axis 231 and the forward direction A in yaw (i.e., about yaw axis Y) for example due to sideslip angle, and/or in roll (i.e. about roll axis R), in addition to an angular displacement component in pitch (i.e., about pitch axis P).

Thus, the spatial control system 260 is configured for controllably flying the refueling device 200, and for providing stability to the refueling device 200, while tethered and towed via the hose 52, and while the boom axis 231 is at any desired pitch and/or yaw and/or roll angle corresponding to the aforesaid angle θ, and in particular, angle θ is a design angle (angle $\theta_{des}$) is within a particular angular range which corresponds to the design relative angular position of the boom member 230 (and boom axis 231) with respect to the receiver aircraft 20 similar to the corresponding feature of the first example or alternative variations thereof and as disclosed above, mutatis mutandis.

In the second example, though, at least a part of angle θ, in particular a part of the design angle $\theta_{des}$ is provided by angle θ', i.e., by pivoting the boom member 230 about axis C, depending on the magnitude of angle φ, which is the relative angular disposition between the longitudinal axis 211 and the forward direction A. The angle φ can be positive (as illustrated in FIG. 16(b)), representing a positive angle of attack of body 210 with respect to forward direction A. Alternatively, angle φ can be negative, or zero.

In this example, the spatial control system 260 is configured for providing a zero or near zero angle φ when the boom member 230 is in its deployed position pivoted at angle θ', and comprises a selectively controllable aerodynamic control system 270. The aerodynamic control system 270 comprises a forward set 272 of aerodynamic control surfaces 273 in the form of low aspect ratio wing members fixedly mounted to body 210 at a forward portion thereof and having controllably movable ailerons 271. The aerodynamic control system 270 further comprises an aft set 274 of aerodynamic control surfaces 275 mounted to the body 210 at an aft portion thereof in "Vee" configuration. The spatial control system 260 is also configured for providing the required pivoting angle θ' so that angle θ' together with angle φ provide the desired angle θ between the boom axis 231 and the forward direction A in order to maintain the required design angle $\theta_{des}$ between the boom axis 231 and the longitudinal axis of the receiver aircraft 20. Thus, angle θ (which can have an angular component in yaw and/or in pitch and/or in roll) compensates for any off-nominal pitch of the receiver aircraft 20 (for example if the receiver aircraft 20 is traveling along direction A at a non-zero angle of attack) and/or for any off-nominal roll of the receiver aircraft 20 (for example if the receiver aircraft 20 is traveling along direction A at a non-zero roll angle) and/or for any off-nominal yaw of the receiver aircraft 20 (for example if the receiver aircraft is traveling along direction A at a non-zero sideslip angle) to ensure that the actual angular disposition between the boom axis 231 and the receiver aircraft longitudinal axis is maintained at design angle $\theta_{des}$ even as the relative spatial orientation between the receiver aircraft 20 and the forward direction A changes.

In other variations of the example and in other examples, the spatial control system 260 can be similar to the corresponding feature of the first example or alternative variations thereof and as disclosed above, mutatis mutandis.

The refueling device 200 can optionally further comprise a force generating arrangement (not shown), similar to the corresponding feature of the first example or alternative variations thereof and as disclosed above, mutatis mutandis.

The refueling device 200 can optionally further comprise a suitable spatial data acquisition system including an imaging system (not shown), similar to the corresponding feature of the first example or alternative variations thereof and as disclosed above, mutatis mutandis, or can omit such an imaging system and can be actively controlled by an operator, for example, similar to the corresponding feature of the first example or alternative variations thereof and as disclosed above, mutatis mutandis.

The in-flight refueling systems 50 including the second example of the refueling device 200, and at least some alternative variations thereof, can also be operated in a number of different ways to provide selective engagement of the nozzle 235 with the fuel receptacle 22 of a receiver aircraft 20, and enable subsequent refueling of the receiver aircraft 20 from the tanker aircraft 12 in flight.

Referring to FIGS. 17(a) to 17(e), a variation of the second example of the refueling device, designated herein with reference numeral 200B, comprises the elements and features of the second example of the refueling device and/or of at least some alternative variations thereof, and/or of the first example of the refueling device and/or of at least some alternative variations thereof, mutatis mutandis, with some differences, as will become clearer herein. In a similar manner thereto, the refueling device 200B is also configured for use with an in-flight refueling system, for example at least one of the in-flight refueling systems 50 illustrated FIGS. 1 and 2.

Figure 17A:
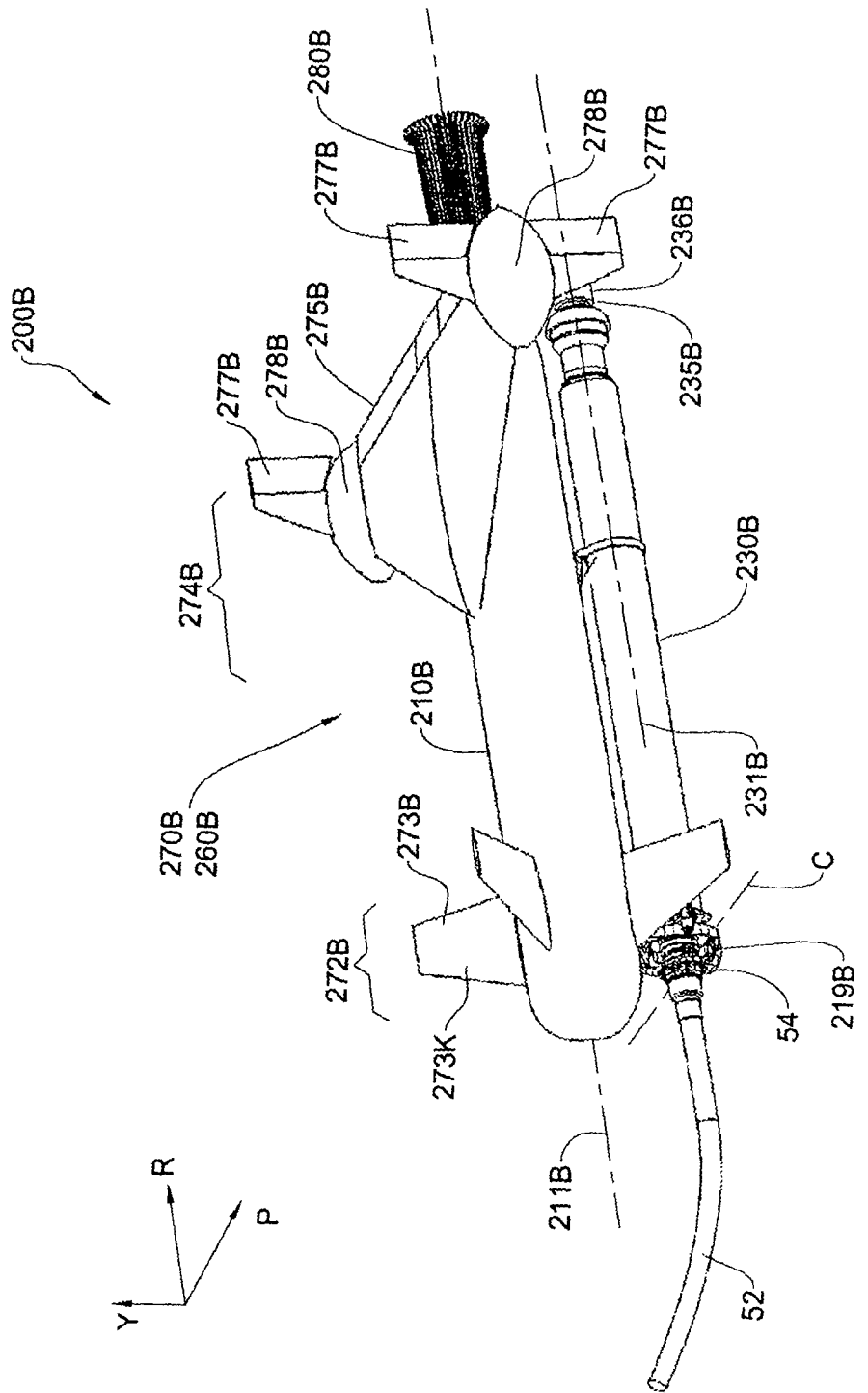
FIGS. 17(a) to 17(e) illustrate an alternative variation of the example of the refueling device FIGS. 16(a) to 16(d), in isometric view (stowed configuration), isometric view (deployed configuration), side view (deployed configuration), front view (deployed configuration), and top view (deployed configuration), respectively.

For convenience, and referring to FIG. 17(a) for example, a roll axis R, a pitch axis P and a yaw axis Y can be conventionally defined with respect to the refueling device 200B in a similar manner to that of the second example of FIGS. 16(a) to 16(d), mutatis mutandis. Thus, for example, the roll axis R is parallel to or co-axial with the longitudinal axis 211B of the device 200B, while the pitch axis P and the roll axis R each are in orthogonal relationship to the roll axis R.

Refueling device 200B is affixed to the end 54 of hose 52 and comprises body 210B in the form of an elongate fuselage and comprising a longitudinal axis 211B. The refueling device 200B also comprises a substantially rigid boom member 230B, which defines a boom axis 231B, and comprises a fuel delivery nozzle 235B at a terminus 236B of the boom member 230B. The nozzle 235B is configured for reversibly engaging with the fuel receptacle 22 of a receiver aircraft 20, and thus can be similar to the nozzle 235 of the second example of nozzle 135 of the first example, or of alternative variations thereof, and as disclosed above, mutatis mutandis.

In this variation of the second example, the boom member 230B has a fixed axial length and is thus not extensible, providing for a relatively simple construction. However, optionally, the boom member 230B can instead comprise a plurality of telescopic elements, for example similar to the plurality of telescopic elements 232 of the second example of refueling device 200 illustrated in FIGS. 16(a) to 16(d), mutatis mutandis.

The boom member 230B is pivotably mounted to body 210B about axis C (generally parallel to the pitch axis P of the body 210B) at pivot joint 219B, and is reversibly pivotable between a stowed or retracted position and a deployed position.

In the stowed or retracted position, illustrated in FIG. 17(a), boom member 230B is pivoted about axis C into a position where the terminus 236B is closest to the underside of body 210. In this position, the boom axis 231 is generally parallel to and displaced away from longitudinal axis 211B in a downward direction with respect to body 210B. In the deployed position illustrated in FIG. 17(b), boom member 230B is variably pivoted about pivot axis C in a downward direction to provide a non-zero angular displacement, angle θ', between boom axis 231B and longitudinal axis 211B (best seen in FIG. 17(c). In this example, angle θ' is in pitch with respect to the refueling device 200B.

In any case, in the retracted position, the boom axis 230B is at a smaller angular disposition with respect to said longitudinal axis 211B than in the deployed position. For example, in the retracted position the boom axis 230B is at an angular disposition with respect to said longitudinal axis 211B of 0°, or 15°, or between 0° and 15°, for example any one of 1°, 2°, 3°, 4°, 5°, 6°, 7°, 8°, 9°, 10°, 11°, 12°, 13°, 14°. For example, in the deployed position the boom axis 230B is at an angular disposition with respect to said longitudinal axis 211B of greater than 15°, for example 20°, or 45°, or between 20° and 40°, or between 20° and 45°, for example any one of 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°.

In general the boom member 230B is in the deployed position at least during in-flight refueling operation of the device 200B.

An actuation mechanism 290B is provided for controllably pivoting the boom member 230B between the stowed or retracted position and the deployed position. Actuation mechanism 290B includes an articulated strut 291B comprising upper strut 292B connected to lower strut 293B at pivoting joint 294B. The upper strut 292B is pivotably connected to an underside of body 210B, while the lower strut 293B is pivotably connected to an upper side of boom member 230B. An actuator (not shown) operates to selectively and effectively bring close or distance away the pivoting joint 294B with respect to the body 210B. At the maximum distancing away of the pivoting joint 294B, illustrated in FIGS. 17(b), 17(c) and 17(d), the upper strut 292B is aligned with (i.e., at about 180° with respect to) the lower strut 293B, and as the pivoting joint 294 is brought closer to the body 210B, the articulated strut 291B adopts a V-configuration, where the pivot angle between upper strut 292B is and the lower strut 293B at the pivoting joint 294B progressively reduces from about 180° (at the fully deployed position) to about 0° (at the stowed or retracted position). The actuator or actuation mechanism 290B can be configured to selectively lock the articulated strut 291B only at each one of the stowed/retracted position and the deployed position, to provide a fixed angle θ'; alternatively, the actuator or actuation mechanism 290B can be configured to selectively lock the articulated strut 291B at each one of the stowed/retracted position and the deployed position, and at any angular disposition therebetween, to provide a variable angle θ'.

Other alternative configurations for actuation mechanism 290B are of course possible.

Angular components in yaw and/or roll can be provided to the boom axis 231B with respect to the forward direction A by suitably orienting the device 200B with respect to the yaw axis Y and/or roll axis R, respectively.

The boom member 230B comprises a coupling 240B at forward end 214B thereof, fixed to the underside of body 210B. The coupling 240B is similar to the coupling 240 of the second example or alternative variations thereof, or of coupling 140 of the first example or alternative variations thereof, and as disclosed above, mutatis mutandis. Furthermore, the pivot joint 219B can be part of coupling 240B, or integrated therewith, or can be affixed thereto and/or to the body 210. The coupling 240B is connected to the body 210B for example at the underside of the body 210B.

Figure 17B:
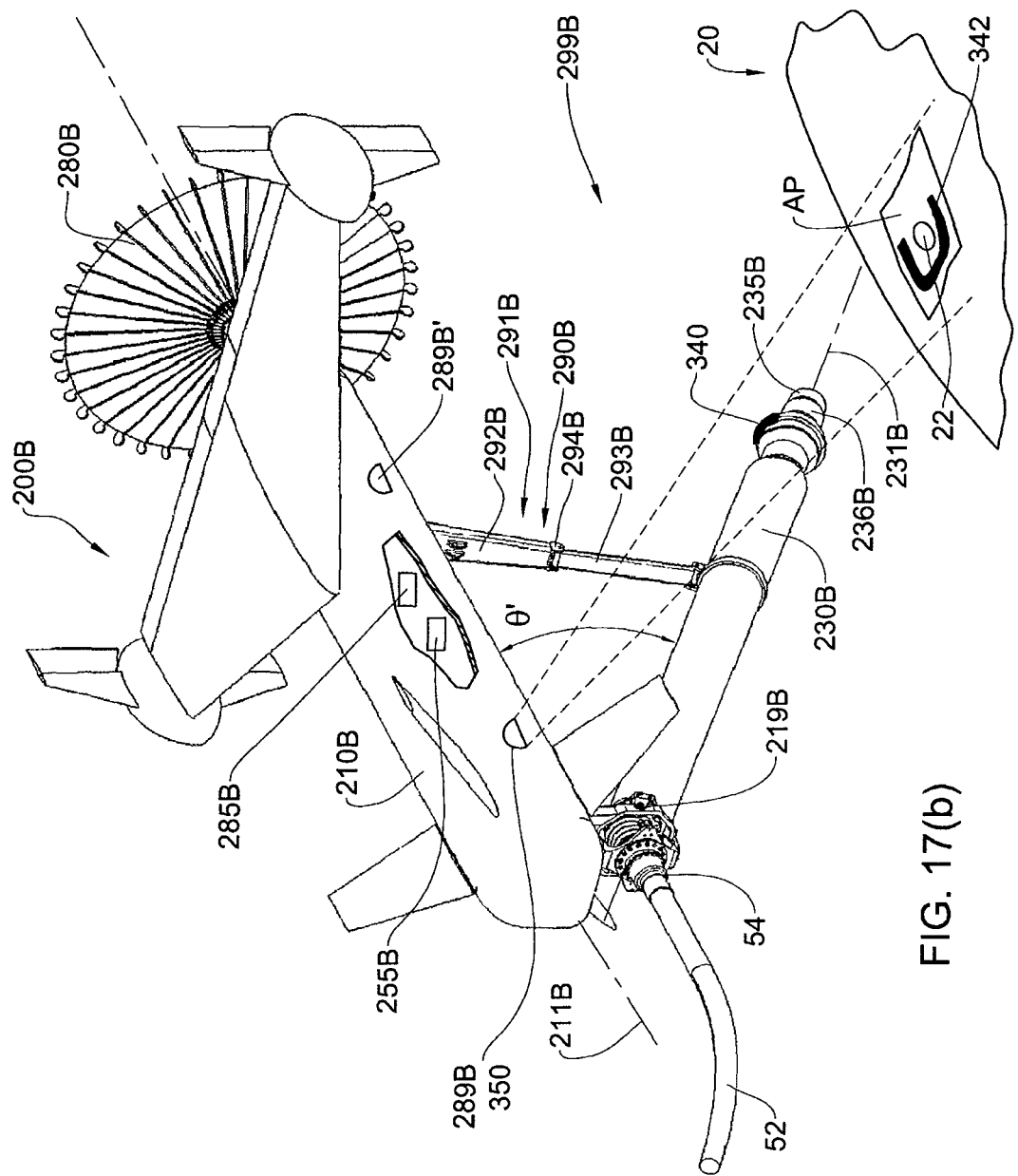

The refueling device 200B further comprises a spatial control system 260B and an aerodynamic stabilizer arrangement, different from the spatial control system 260B. For example, the aerodynamic stabilizer arrangement is in the form of a respective drogue structure 280B fixed to the aft portion of the body 210. Referring to FIGS. 17(a) and 17(b) respectively, the drogue structure 280B has an inactive (or stowed) configuration, in which drogue structure 280B generates minimum drag, and an active (or deployed) configuration in drogue structure 280B generates more drag than in the inactive configuration, up to a maximum drag. Such a drogue structure 280B can be utilized for generating a drag (when in the active configuration of FIG. 17(b)) which in turn induces a tension to the hose 52, thereby aiding reduction or dampening of vibrations or oscillations in the hose 52 that can otherwise occur.

The spatial control system 260B is configured for controlling a spatial disposition of the refueling device 200B when towed aft of the tanker aircraft 12 via the hose 52. In particular, and in a similar manner to the second example illustrated in FIGS. 16(a) to 16(d), mutatis mutandis, spatial control system 260B is also configured for selectively and controllably providing a non-zero angular disposition, angle θ, between the boom axis 231B and the forward direction A, and enables this angle θ to be selectively maintained between the boom axis 231B and the forward direction A when the refueling device 200B is being towed by the tanker aircraft 12 via hose 52, also similar to the corresponding feature of the first example or alternative variations thereof and as disclosed above, mutatis mutandis.

Thus, in particular, angle θ is in pitch, i.e., about a pitch axis P of the refueling device 200B and is defined on a plane including the roll axis R and the yaw axis Y of the refueling device 200B. Nevertheless, and depending on specific conditions during any particular refueling operation, angle θ can instead include an angular displacement component between the boom axis 231B and the forward direction A in yaw (i.e., about yaw axis Y) for example due to sideslip angle, and/or in roll (i.e. about roll axis R), in addition to an angular displacement component in pitch (i.e., about pitch axis P).

Thus, the spatial control system 260B is configured for controllably flying the refueling device 200B, and for providing stability to the refueling device 200B, while tethered and towed via the hose 52, and while the boom axis 231B is at any desired pitch and/or yaw and/or roll angle corresponding to the aforesaid angle θ, and in particular, angle θ is a design angle (angle $\theta_{des}$) is within a particular angular range which corresponds to the design relative angular position of the boom member 230B (and boom axis 231B) with respect to the receiver aircraft 20 similar to the corresponding feature of the first example or alternative variations thereof and as disclosed above, mutatis mutandis.

As with the first example of the refueling device or alternative variations thereof, or of the second example of the refueling device or other alternative variations thereof, the spatial control system 260B of refueling device 200B, in particular the selectively controllable aerodynamic control system 270B, is configured for enabling the device 200B to be steered in one, two, or three degrees of freedom in translation and in one, two, or three degrees of freedom in rotation, independently of the tanker aircraft 12 or of the refueling aircraft 20. Thus, the spatial control system 260B, in particular the selectively controllable aerodynamic control system 270B, is configured providing:

one or more of: sideslip, up/down translation, forward-aft translation, relative to the tanker aircraft 12 and/or to the refueling aircraft 20, independently of rotational moments in roll pitch and/or yaw;

and/or rotational moments in one or more of roll pitch and/or yaw, relative to the tanker aircraft 12 and/or to the refueling aircraft 20, independently of sideslip, up/down translation, forward-aft translation.

The spatial control system 260B is also configured for providing an angle of attack for the body 210B with respect to the forward direction, for example up ±10°.

Figure 17C:
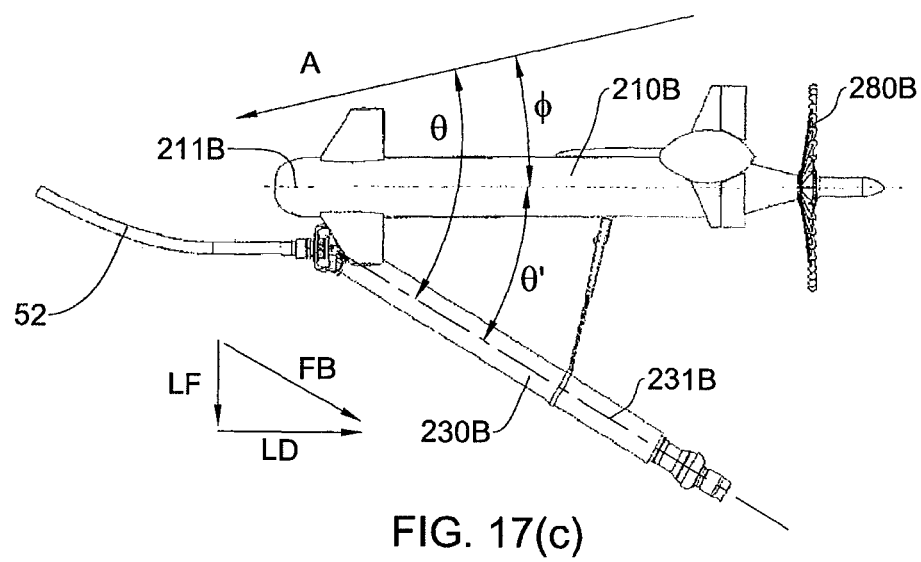
Figure 17D:
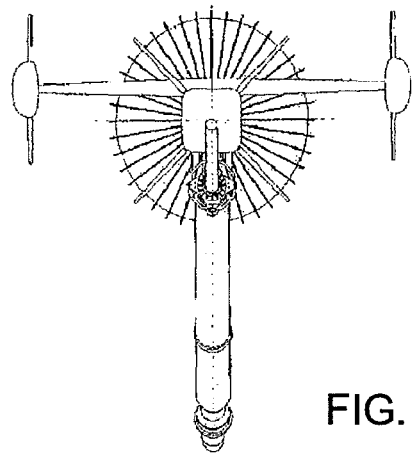
Figure 17E:
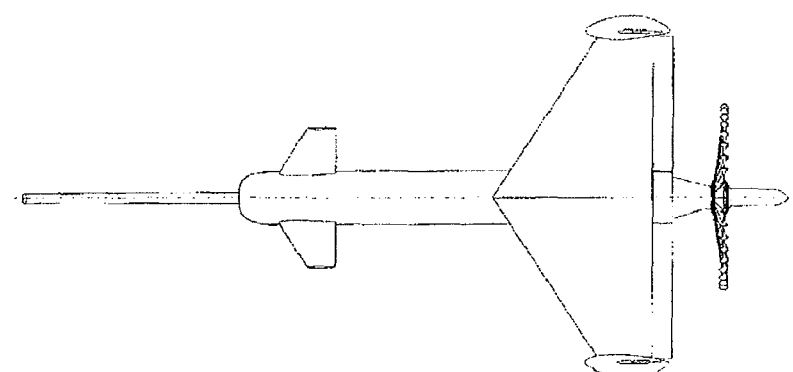

In this variation of the second example of refueling device 200B, though, at least a part of angle θ, in particular a part of the design angle $\theta_{des}$ is provided by angle θ', i.e., by pivoting the boom member 230B about axis C, depending on the magnitude of the relative angular disposition φ between the longitudinal axis 211B and the forward direction A, referring to FIG. 17(c). This angular disposition can be positive, representing a positive angle of attack of body 210B with respect to forward direction A, or can be negative, or can be zero. In this variation of the second example, the spatial control system 260B is configured for providing a zero or near zero said angular disposition when the boom member 230B is in its deployed position pivoted at angle θ'.

The spatial control system 260B comprises a selectively controllable aerodynamic control system 270B. In this variation of the second example of the refueling device 200B, the aerodynamic control system 270B comprises a forward set 272B of aerodynamic control surfaces 273B and an aft set 274B of aerodynamic control surfaces 275B.

Furthermore, in the example of FIGS. 17(a) to 17(e), the a forward set 272B of aerodynamic control surfaces 273B is in the form of four canards 273K in cruciform "X" arrangement around a forward part of the body 210, while the aft set 274B of control surfaces 275B is in the form of a H-tail, in particular a high, cropped delta wing 276B, mounted to the upper aft part of body 210, and comprising vertical fins 277B above and below port and starboard wing tip elements 278B of the cropped delta wing 276B. The forward canards 273K can be fixed, or instead can be pivotable, or instead can comprise pivotable surfaces to provide control moments to the device 200B. The delta wing 276B, and/or vertical fins 277B, are each pivotable or can instead comprise pivotable surfaces to provide control moments to the refueling device 200B.

However, other arrangements are possible for selectively controllable aerodynamic control system 270B and/or for the body 210B.

For example the forward set 272B of aerodynamic control surfaces 273B and/or the aft set 274B of aerodynamic control surfaces 275B can each be configured to have any one or more of the following features, in any combination:

monoplane configuration, including any one of: high wing configuration (or shoulder wing configuration), low wing configuration or mid wing configuration mounted on or near an upper part, a lower (bottom) part of inbetween the upper and lower part, respectively, of the body 210; parasol wing configuration—mounted to the body 210B via cabane struts of the like; shoulder wing configuration;

biplane, triplane, quadruplane, multiplane configurations, having two, three four, or more than four wing plane elements, respectively, of similar size or dissimilar size with respect to one another, stacked one above the other in unstaggered, or forward staggered, or backwards staggered arrangement;

combined or closed wing configurations, in which two or more wing elements are joined structurally at or near the respective wing tips in some way; for example a box wing configuration, in which at least one set of overlying (staggered or unstaggered) wing elements is joined together between their tips by vertical fins; tandem box wings; rhomboidal wings in which at least one set of overlying wing elements has a forward swept wing plane and a swept back wing plane, joined between the tips directly or via a vertical fins; annular or ring wing, which can be flat (in the form of the rim of a flat disc) or cylindrical (the wing is shaped as a cylinder), for example;

at least one wing element is cantilevered (self-supported) and/or externally supported to the body 210 via struts and/or braces;

wings elements, wherein each can comprise low aspect ratio, moderate aspect ratio or high aspect ratio;

wings elements, wherein each wing element can be swept forward or swept back or have zero sweep, and/or the sweep angle can be fixed or varied along the span, and/or each wing element can have fixed wing geometry or variable wing geometry, for example variable sweep or oblique wing configurations;

wings elements, wherein each wing element can have a respective wing chord that can be fixed or varied along the span of the wing element, for example including at least one of the following plan shapes: elliptical plan; constant chord plan, tapered plan; trapezoidal plan; reverse tapered plan; compound tapered plan;

wings elements, wherein each wing element can be based on a delta design, including at least one of the following: regular delta; cropped delta (wing tip is cropped) compound delta; double delta; ogival delta;

wings elements, wherein each wing element can have dihedral or anhedral angle;

wings elements, wherein the wing elements can be formed as fins, for example in cruciform "X" or cruciform "+" configuration, or having one, two, three, four, or more than four fins arranged on the body 210B in any geometrical arrangement;

wings elements, wherein the wing elements can comprise vertical fins or the like, attached on the upper part and/or the lower part at any spanwise position including the tip; and/or the fins can be swept forward or swept back or have zero sweep, and/or sweep angle can be fixed or varied along the span, and/or each vertical fin can have fixed wing geometry or variable wing geometry, for example variable sweep or oblique wing configurations;

each wing element can be fixed, or can be movably mounted to the body 210 and fully pivotable to operate independently as an integral control surface, or can be fixedly mounted to the body 210 and comprises a pivotal control surface;

each wing element can be movably mounted to the body 210 to allow for selective relative translational movement therebetween.

For example the forward set 272B of aerodynamic control surfaces 273B can have any suitable configuration regarding its geometrical and spatial relationship with respect to the aft set 274B of aerodynamic control surfaces 275B, for example as follows:

conventional configuration, in which the forward set 272B of aerodynamic control surfaces 273B forms the main lift-generating wing arrangement of the device 200B, while the aft set 274B of aerodynamic control surfaces 275B, forms part of the stabilizer or tail;

canard configuration, in which the aft set 274B of aerodynamic control surfaces 275B forms the main lift-generating wing arrangement of the device 200B, while the forward set 272B of aerodynamic control surfaces 273B can be in the form of canards or fins as the stabilizer;

tandem configuration, in which both the aft set 274B of aerodynamic control surfaces 275B and the forward set 272B of aerodynamic control surfaces 273B are configured to provide lift and to provide stability;

tailess configuration, in which the forward set 272B of aerodynamic control surfaces 273B is omitted, and the aft set 274B of aerodynamic control surfaces 275B is configured to provide lift and to provide stability;

three-surface or triplet configuration, in which in which the aft set 274B of aerodynamic control surfaces 275B forms the main lift-generating wing arrangement of the device 200B, while the forward set 272B of aerodynamic control surfaces 273B can be in the form of canards or fins forming part of the stabilizer, and further comprising a third set of aerodynamic control surfaces aft of the aft set 274B of aerodynamic control surfaces 275B, forms part of the stabilizer.

For example the forward set 272B of aerodynamic control surfaces 273B and/or the aft set 274B of aerodynamic control surfaces 275B can be blended with the body 210B to provide a blended body configuration.

For example one of the forward set 272B of aerodynamic control surfaces 273B and/or the aft set 274B of aerodynamic control surfaces 275B can be omitted, and the other one of forward set 272B of aerodynamic control surfaces 273B and/or the aft set 274B of aerodynamic control surfaces 275B can be formed as a flying wing configuration, incorporating therein the functions of body 210B, which can then be omitted.

For example the forward set 272B of aerodynamic control surfaces 273B and/or the aft set 274B of aerodynamic control surfaces 275B can both be omitted, and the body 210 can be formed as a lifting body, integrally providing the functions of the aerodynamic control system 270B.

For example, the aerodynamic control system 270B can be replaced with or supplemented by reaction control thrusters.

Figure 17F:
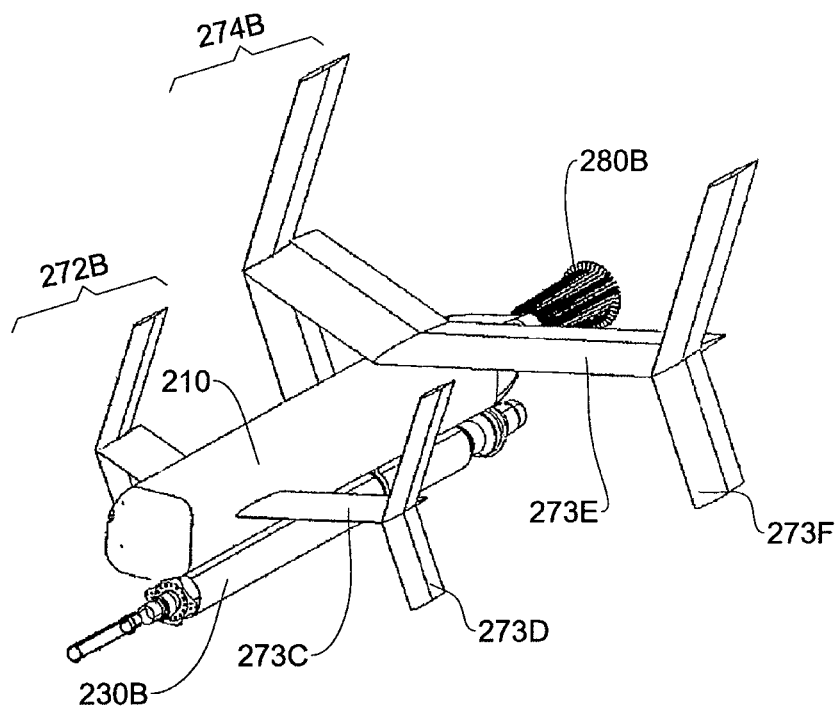
FIGS. 17(f) to 17(g) illustrate an alternative variation of the example of the refueling device FIGS. 16(a) to 16(d), in isometric view, in stowed configuration and in deployed configuration, respectively.
Figure 17G:
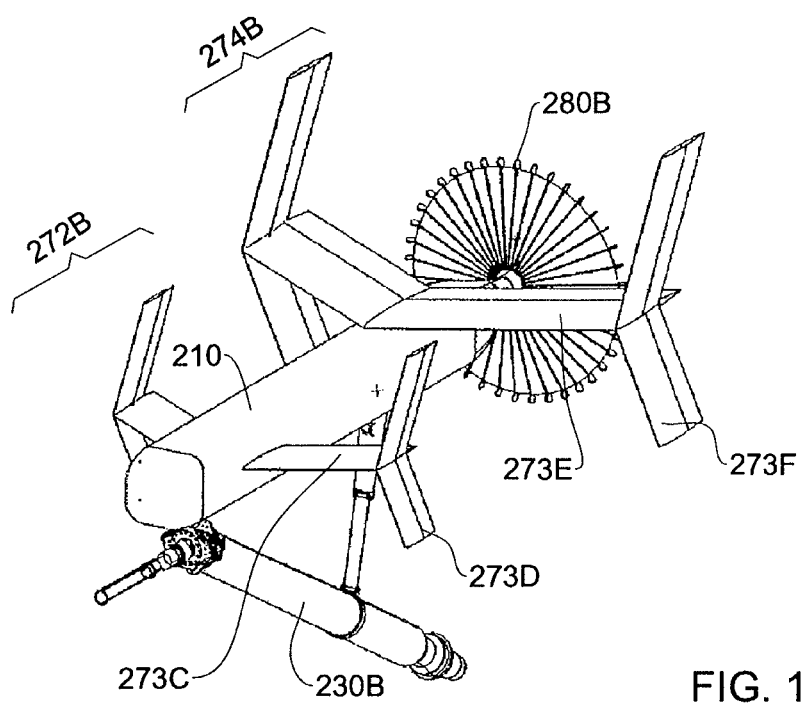

Thus, for example, and referring to FIGS. 17(f) and 17(g), the aerodynamic control system 270B comprises a canard configuration, in which: the forward set 272B of aerodynamic control surfaces comprises canards, for example comprising two horizontal, swept, zero taper canards 273C in mid-wing configuration, one on each side of the body 210B, and optionally including vertical swept-back zero taper fins 273D above and/or below the canards 273C at the respective tips thereof; the aft set 274B of aerodynamic control surfaces can be in the form of a H-tail, in particular comprising two horizontal, swept, zero-taper wing elements 273E in high-wing configuration, on the upper part of the body 210B, and optionally including fins, for example vertical swept-back zero taper fins 273F above and below the wing elements 273E at the respective tips thereof. In this example, one or more of the canards 273C, fins 273D, wing elements 273E and fins 273F, is fully pivotable to operate independently as an integral control surface or is fixedly mounted to the body 210 and comprises a pivotal control surface. Optionally, one or more of the canards 273C, fins 273D, wing elements 273E and fins 273F, can be movably mounted to the body 210 to allow for selective relative translational movement therebetween.

Figure 17H:
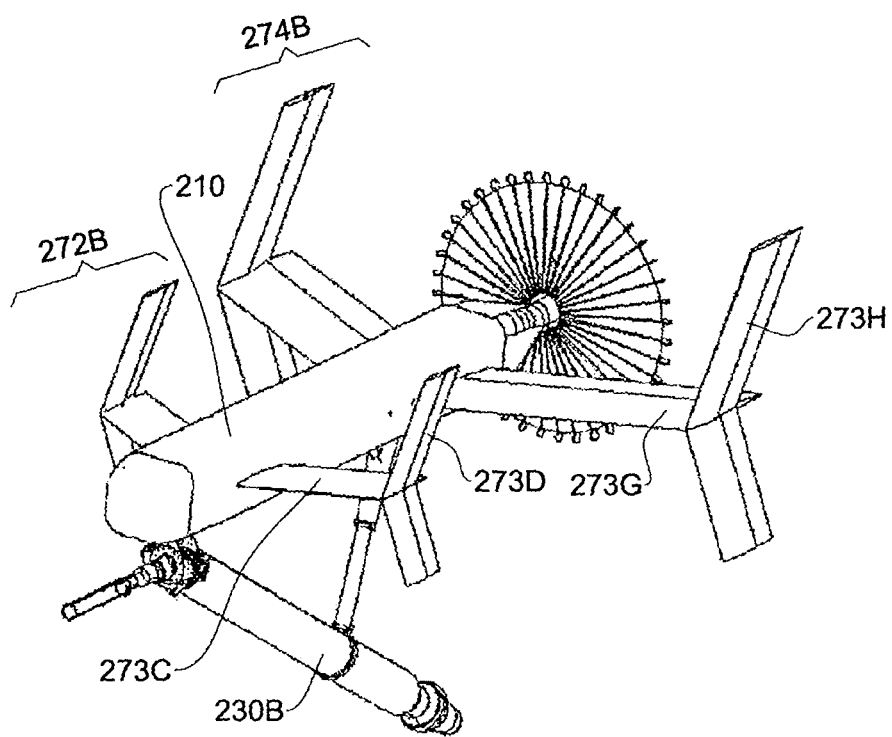
FIG. 17(h) illustrates another alternative variation of the example of the refueling device FIGS. 16(a) to 16(d), in isometric view, in deployed configuration.

In another example, and referring to FIG. 17(h), the aerodynamic control system 270B comprises a canard configuration, in which: the forward set 272B of aerodynamic control surfaces comprises a canard configuration, for example comprising two horizontal, swept, zero taper canards 273C in mid-wing configuration, one on each side of the body 210B, and optionally including vertical swept-back zero taper fins 273D above and below the canards 273C at the respective tips thereof; the aft set 274B of aerodynamic control surfaces can be in the form of a H-tail, in particular comprising two horizontal, swept, zero-taper wing elements 273G in mid-wing configuration, one on each side of the body 210B, and optionally including fins, for example vertical swept-back zero taper fins 273H above and below the wing elements 273G at the respective tips thereof. In this example, one or more of the canards 273C, fins 273D, wing elements 273G and fins 273H, is fully pivotable to operate independently as an integral control surface or is fixedly mounted to the body 210 and comprises a pivotal control surface. Optionally, one or more of the canards 273C, fins 273D, wing elements 273G and fins 273H, can be movably mounted to the body 210 to allow for selective relative translational movement therebetween.

It is to be noted that in other variations of the second example, and in other examples, of the refueling device 200, the respective spatial control system 260 can be similar to the spatial control system 260B the variation of the example of the refueling device 200B or alternative variations thereof and as disclosed above, mutatis mutandis.

The refueling device 200B can optionally further comprise a force generating arrangement (not shown), similar to the corresponding feature of the first example or alternative variations thereof and as disclosed above, mutatis mutandis, and/or can be operated in a corresponding manner.

In the variations of the second example illustrated in FIGS. 17(*a*) to 17(*h*), a respective force generating arrangement 295B is configured for selectively generating a force FB (see FIG. 17(*c*)) along the boom axis 231B in a direction towards nozzle 235B.

In these variations of the second example, the force generating arrangement 290B comprises (a) at least some elements of the spatial control system 260B, in particular the selectively controllable aerodynamic control system 270B; and optionally (b) at least some elements of the aerodynamic stabilizer arrangement, in particular in the form of a respective drogue structure 280B.

The force generating arrangement 290B is configured for selectively generating force FB in a direction aligned with the boom axis 231B by generating a negative lift force LF (or reducing the lift force by force LF) and a drag force LD, which together provide force FB of the required magnitude and vector. The negative lift force LF can be generated by suitably controlling the spatial control system 260B, in particular the selectively controllable aerodynamic control system 270B. For example, appropriately changing an angle of attack, and/or providing a flap angle to the respective control surfaces of the control system 270B can reduce the lift generated by the control system 270B, and thus result in a net downwards force corresponding to negative lift force LF. Concurrently, in at least some cases, the drag force LD can also be generated by suitably controlling the spatial control system 260B, in particular the selectively controllable aerodynamic control system 270B. For example, appropriately changing an angle of attack, and/or providing a flap angle to the respective control surfaces of the control system 270B can also change the drag generated by the control system 270B, and thus result in an increase in drag corresponding to drag force LD. Additional drag force can be generated, where necessary to complement or replace the drag generated by the control system 270B to provide the appropriate drag force LD, by controlling the drag generated by the aerodynamic stabilizer arrangement, in particular in by the drogue structure 280B.

The force generating arrangement 295B is in particular configured for selectively generating a force FB having a magnitude sufficient for forcing the nozzle 235B into engagement with the fuel receptacle 22 of the receiver aircraft when the nozzle 295B (and the boom member 230B) and the fuel receptacle 22 are in a predetermined relative spatial disposition, i.e., when the refueling device 200B reaches an engagement enabling position and the boom axis 231B is in the engagement enabling orientation with respect to the receiver aircraft 20, and in particular with respect to the fuel receptacle 22.

The force generating arrangement 295B is further configured for selectively operating in this manner responsive to the nozzle 235B being in a predetermined proximity to the fuel receptacle 22, i.e. responsive to the nozzle 235B being in a predetermined spacing with respect to the fuel receptacle 22, typically the engagement enabling spatial position, and can be operated manually or automatically to provide such a force FB, as will become clearer herein.

Thus, at the engagement enabling position, when the boom member 230B, or the boom axis 231B, is in a predetermined spatial disposition with respect to the fuel receptacle 22 and the nozzle 235B being in a predetermined spacing with respect to the fuel receptacle 22 (i.e., at the engagement enabling position the boom axis is at the engagement enabling orientation—corresponding to the design angle $\theta_{des}$), the force generating arrangement 295 can be selectively actuated to compel the boom member 230B to follow a predetermined trajectory (together with the device 200B), for example aligned with the boom axis 231B in the direction of the receiver aircraft 20, to ensure alignment and engagement between the nozzle 234B and the fuel receptacle 22. In this example, the boom member 230B (and thus the boom axis 231B) is maintained at the engagement enabling orientation—corresponding to the design angle $\theta_{des}$, while the body 210B remains at the same spatial disposition with respect to the receiver aircraft 20. The body 210B is moved towards the receiver aircraft 20 along a the direction of the boom axis 231B, maintaining the boom axis 231B at the engagement enabling orientation—corresponding to the design angle $\theta_{des}$, to effect engagement between the nozzle 235B and the fuel receptacle 22. In alternative variations of this example, the boom 230B is telescopic, and is partially or fully telescopically extended towards the receiver aircraft 20 while the device 200B can be moved towards or away from the receiver aircraft 20 to effect engagement between the nozzle 235B and the fuel receptacle 22.

Once the nozzle 235B is forced into engagement with the fuel receptacle 22 of the receiver aircraft 20, the tanker aircraft 12 can begin refueling the receiver aircraft 20.

In alternative variations of this example and in other examples, the force generating arrangement 295B can comprise any other suitable drag inducing arrangement, for example spoilers on the boom member 230 and/or on other parts of the device 200B.

In yet other variations of this example and in other examples, the force generating arrangement 295B can be configured for generating a thrust force in the required direction. For example, one or a plurality of suitable thrust nozzles can be mounted to the body 210B and/or to the boom member 230B to provide the required thrust vector parallel to the boom axis 231B towards nozzle 235B. Such thrust nozzle(s) can be operatively connected to a suitable compressed air or compressed gas supply, for example carried by the refueling device itself, or carried by the tanker aircraft and supplied to the refueling device via pneumatic or gas lines, or generated by the tanker aircraft and/or the refueling device.

In yet other alternative variations of this example and in other examples, the force generating arrangement can be omitted, and for example the receiver aircraft and/or the device 200B can comprise suitable means for mechanically engaging the nozzle 235B to the fuel receptacle that does not require such a force FB to be generated by the device 200B. For example, the fuel receptacle and/or the boom member 230B can comprise a suitable mechanical clamp that engages the terminus 236B of the boom member 230B to the fuel receptacle 22, and pulls in the nozzle 235B into engagement with the fuel receptacle 22.

The device 200B comprises controller 285B for controlling operation of one or more of the force generating arrangement 290B, the spatial control system 260B (in particular the selectively controllable aerodynamic control system 270B), the aerodynamic stabilizer arrangement (in particular in the form of a respective drogue structure 280B), for example similar to controller 180 as described herein, mutatis mutandis, and thus for example comprises any suitable computer control system, and can be internally or externally mounted in the refueling device 200B. In alternative variations of this example and in other examples, the controller 285B or portions thereof can instead comprise any suitable electronic control unit, or any other suitable control unit, and/or the controller 285B or portions thereof can be comprised elsewhere in the in-flight refueling system 50 or in the tanker aircraft 12.

The refueling device 200B further comprises a suitable spatial data acquisition system, also referred to herein as a data acquisition system 299B for providing or enabling the calculation of spatial data relating to the relative spatial dispositions between the refueling device 200B and the receiver aircraft 20, in particular the relative spatial dispositions between the fuel delivery nozzle 235B of the refueling device 200B and the fuel receptacle of the receiver aircraft, to enable selectively controlling the refueling device to provide automatic (optionally including autonomous) and/or manual steering of the refueling device 200B to the engagement enabling position and subsequent selective engagement of the fuel delivery nozzle to the fuel receptacle of the receiver aircraft.

In this variation of the second example of the device 200B, the data acquisition system is in the form of imaging system 289B, in particular configured for providing imaging data of any object coming within a field of regard (FOR) aft of the refueling device 200B.

The imaging system 289B is operatively connected to a control computer system 255B, for example similar to control computer system 155 as described herein, mutatis mutandis, and which can be integral with, connected to, or independent from controller 285B. In particular, and referring particularly to FIG. 17(b), such an object is the receiver aircraft 20 and more particularly a part AP thereof including the fuel receptacle 22, and the sensing volume 259B defines an outer envelope limit 258B in which image data of part AP can be processed, inter alia, by control computer system 255B to provide control signals, for example steering commands, to the spatial control system 260B and/or the force generating arrangement 290B, for example via controller 285B to control operation of the refueling device 200B, in particular the relative spatial position and orientation of the refueling device 200B with respect to the receiver aircraft 20, in particular the position and orientation of the boom member 230B and nozzle 235B with respect to the fuel receptacle 22, so that the nozzle 235B can be controllably brought into selective engagement with the fuel receptacle 22 in a safe and effective manner. The manner of operation of the imaging system 289B and control computer system 255B will be described in greater detail further herein.

In alternative variations of this example, the imaging system 289B can be replaced with any other suitable data acquisition system for providing the aforesaid spatial data.

In yet other alternative variations of this example and in other examples, the refueling device 200B can omit the imaging system 289B and can be actively controlled by an operator, for example, to control the relative spatial position and orientation of the refueling device 200B with respect to the receiver aircraft 20, in particular the spatial position and orientation of the boom member 230B and/or nozzle 235B with respect to the fuel receptacle 22, so that the nozzle 235B can be controllably brought into selective engagement with the fuel receptacle 22 in a safe and effective manner, for example via direct visual tracking of the device by one or more operators (for example, an operator can be in the tanker aircraft 12 and/or an operator can be in the refueling aircraft 20). Alternatively, the refueling device can be operated as a free flying refueling device towed at the end of hose 52, and the relative spatial position and orientation of the refueling device 200B with respect to the receiver aircraft 20 (in particular the position and orientation of the boom member 230B and nozzle 235B with respect to the fuel receptacle 22, so that the nozzle can be controllably brought into selective engagement with the fuel receptacle 22 in a safe and effective manner) is achieved by maneuvering the receiver aircraft 20 only. In such a case, the spatial control system 260B can optionally comprise a non-adjustable aerodynamic stability system that is configured for allowing the refueling device 200B to adopt a particular, pre-set, desired angle θ while maintaining a zero pitching moment (and/or zero yawing moment and/or zero rolling moment), this being the design angle $\theta_{des}$ as discussed above for example.

Optionally, a suitable air-driven generator can be provided in the refueling device 200B to provide electrical power thereto. Additionally or alternatively, electrical power can be provided to the refueling device 200B by the tanker aircraft 12. Additionally or alternatively, electrical power can be provided to the refueling device 200B by one or more batteries in the refueling device 200B. Additionally or alternatively, electrical power can be provided to the refueling device 200B by one or more ram air turbines (RAT), affixed internally or externally with respect to the refueling device 200B.

In this variation of the second example of device 200B, the imaging system 289B is for example similar to imaging system 350 as described herein, mutatis mutandis, and comprises one or more Light Detection And Ranging (LIDAR) units 351, for example similar as described herein, mutatis mutandis, which can utilize eye-safe laser. The imaging system 350 in this example is located on the underside of the body 210B near the nose of body 210B, but in alternative variations of this example the imaging system 289B can be located elsewhere on the device 200B, for example the at 289B', near the tail of the body 201B, or on the spatial control system 260B, so long as the respective sensing volume 359 extends beyond the position of the nozzle 235B to include the nozzle 235B, and part AP of the receiver aircraft 20 when the part AP is in close proximity to the nozzle 235B.

In alternative variations of this example, the LIDAR unit 351 can be replaced with any other suitable imaging system 350 that provides depth data and electromagnetic intensity data of objects within the sensing volume 359 (including, but not limited to, Flash LADAR, 3D Flash LIDAR Camera, etc.). In still further alternative variations of this example, the LIDAR unit 351 can be replaced with other suitable imaging systems such as stereoscopic cameras, conventional cameras, various radar systems, etc.

In any case, the control computer system 355, included in controller 285B and/or controller 255B for example, comprises a memory including geometrical data of the shape of at least part of the receiver aircraft 20, in particular part AP and or the fuel receptacle 22. The control computer system 355 is further configured for operating on the depth data and the geometrical data to enable identification of a first part of the depth data that corresponds to the part AP and or the fuel receptacle 22.

According to certain examples of the presently disclosed subject matter the data acquisition system 299B further includes fuel receptacle marker 342, comprised on the receiver aircraft 20 in a pre-determined location with respect to the fuel receptacle 22 thereof. The fuel receptacle marker 342 is at a fixed and known geometrical relationship with respect to the fuel receptacle 22, and is electromagnetically visible to the imaging system 350, at least during operation thereof.

In this example, the fuel receptacle marker 342 comprises a retro-reflective surface that reflects incident beams along the same path, and thus provides a strong intensity reflection of the respective reflected beam when illuminated by a beam, as compared with the reflection intensity obtained from other surfaces of the receiver aircraft 20, for example. Such a retro-reflective surface may be provided via a retro-reflective material affixed to a certain known location visible to the imaging system 350 on the receiver aircraft 20. Such retro-reflective materials are well known in the art, and can include for example retro-reflective tape or retro-reflective paint.

It is to be noted that the data acquisition system 299B can include any one of the boom tip marker 340 and the fuel receptacle marker 342, or a combination of both. Alternatively, in some cases, the data acquisition system 299B can include none of the markers (in this case the natural reflective properties of the surfaces can be used).

The control computer system 355 is further configured for operating on the depth data and the electromagnetic intensity data, as disclosed herein, mutatis mutandis, to enable identification of a second part of the depth data that corresponds to the high intensity reflection originating from the boom tip marker 340, which in turn enables identification of the part of a third depth data that corresponds to nozzle 316 since the relative spatial relationship between the boom tip marker 340 and nozzle 316 is known.

Accordingly, when the aforesaid first part and second part (first part and third part) of the depth data is known, the control computer system 355 can determine the relative disposition between the boom system 300, and in particular the nozzle 316, and the receiver aircraft 20, in particular the fuel receptacle 22 thereof.

The in-flight refueling systems 50 including this alternative variation of the second example of the refueling device 200B, and at least some alternative variations thereof, can also be operated in a number of different ways to provide selective engagement of the nozzle 235B with the fuel receptacle 22 of a receiver aircraft 20, and enable subsequent refueling of the receiver aircraft 20 from the tanker aircraft 12 in flight, for example as disclosed herein for the first example or alternative variations thereof, or the second example, mutatis mutandis.

Figure 29:
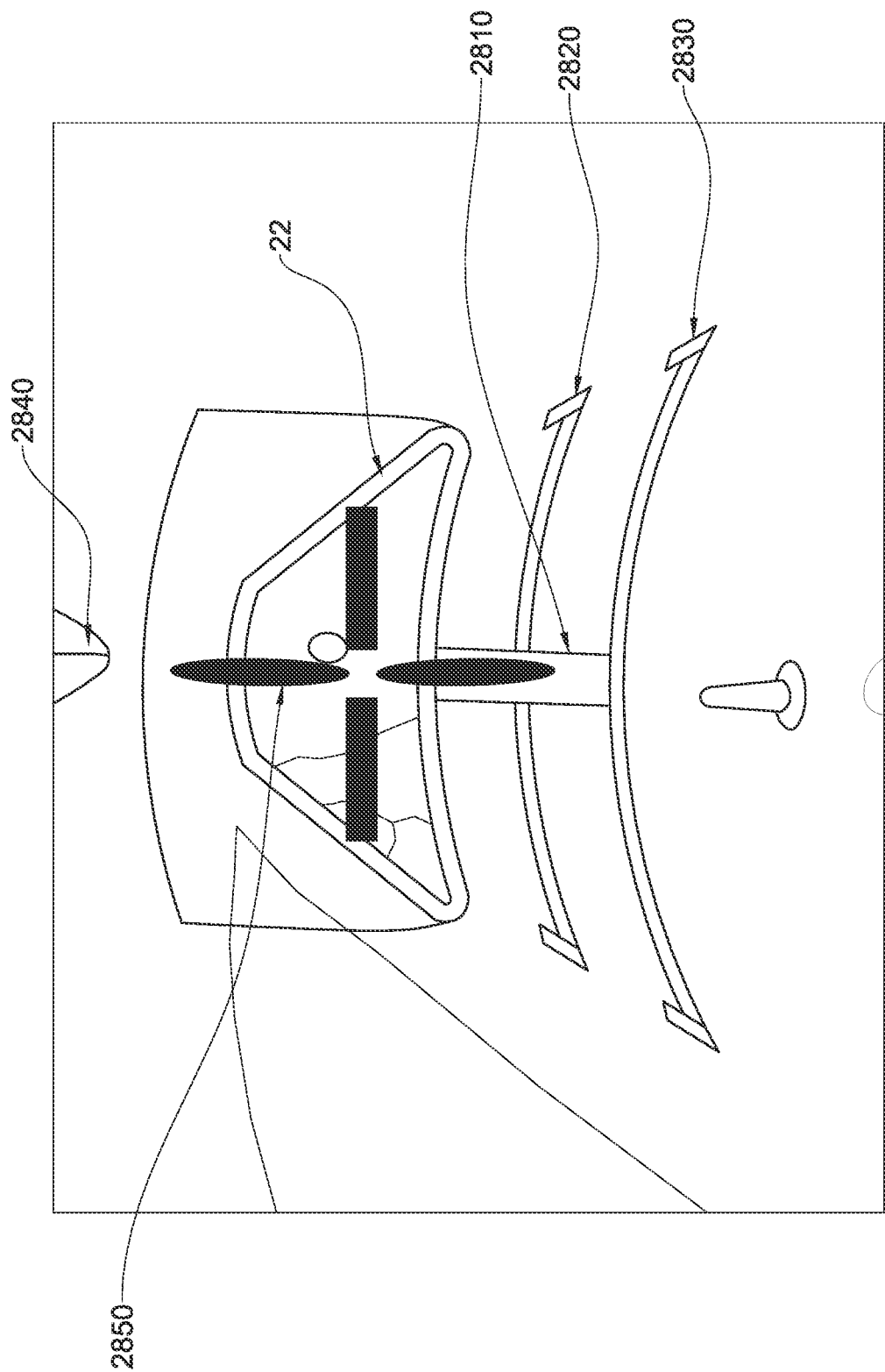
FIG. 29 is an illustration of an example of a sensed image indicating that the refueling device is positioned in an engagement enabling position, according to certain examples of the presently disclosed subject matter.
Figure 30:
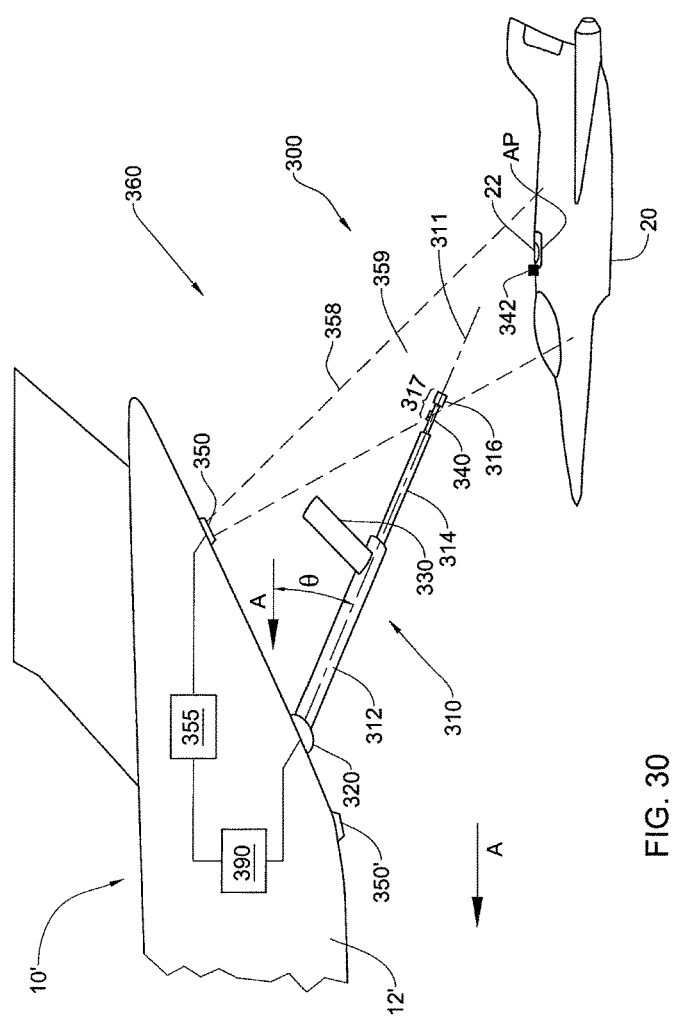
FIG. 30 is a partial side view of another example of a tanker system according to certain examples of the presently disclosed subject matter.

Referring to FIG. 30, a tanker system according to another example of the presently disclosed subject matter, generally designated 10', comprises a tanker aircraft 12' comprising an aircraft-fixed flying boom system, designated by the reference numeral 300, and may optionally further comprise one or more non-aircraft-fixed in-flight refueling systems. For example, each non-aircraft-fixed in-flight refueling system can comprise an in-flight refueling system 50 as disclosed above with reference to FIGS. 1 to 29, mutatis mutandis. For example, the tanker aircraft 12 can have two such in-flight refueling systems 50, one comprised on each one of the port wing and starboard wing, and, together with the fixed flying boom system 300, the tanker aircraft 12' is configured for in-flight concurrent refueling of up to three receiver aircraft 20. In yet other alternative variations of this example the tanker aircraft 12' can have no such in-flight refueling systems 50, or at least one, or two, or more than three in-flight refueling systems 50, arranged in any suitable configuration with respect to the tanker aircraft 12'.

The fixed flying boom system 300 comprises a refueling device in the form of telescoping boom fueling unit 310, which comprises a spatial control system including at least one of a mechanical connection 320 and a motion control system 330.

The boom fueling unit 310 is movably affixed at its forward end to an underside of the aft end of the fuselage of the tanker aircraft 12' via the mechanical connection 320, such as for example an articulation joint, gimbals, and so on. The mechanical connection 320 is configured for providing the boom fueling unit 310 with two rotational degrees of freedom about the yaw and pitch axes at mechanical connection 320, relative to the tanker aircraft 12'.

The boom fueling unit 310 comprises an elongate boom member 312, and a telescoping aft section 314 configured for being selectively telescopically deployed and selectively telescopically retracted into boom member 312, along boom axis 311, under the control of controller 390 (that in some cases can be controller 180 or part thereof), providing the boom system 300 with a translational degree of freedom with respect to the tanker aircraft 12'. At the boom tip or terminus of aft section 314, the boom fueling unit 310 comprises a fuel delivery nozzle module 317 including fuel delivery nozzle 316, which is in selective fuel communication, via a hose, pipe and so on (not shown), with a refueling fuel tank (not shown) carried by the tanker aircraft 12'. The nozzle 316 is configured for reversibly engaging with the fuel receptacle 22 of a receiver aircraft 20 (in a similar manner to the examples illustrated in FIGS. 1 to 29 disclosed herein, mutatis mutandis), and thus can comprise any conventional design of such nozzles, which are well known, or indeed can comprise any other current or future design of such an in-flight refueling nozzle.

The boom fueling unit 310 further comprises motion control system 330 configured for controlling the position of the boom fueling unit 310 in elevation and azimuth, i.e., about the pitch and yaw axes at mechanical connection 320. In this example, the motion control system 330 comprises aerodynamic lift/control surfaces, also known as ruddevators 325, operatively connected to controller 390. While in this and other examples ruddevators 325 can be in a V-tail type configuration, in yet other alternative variations of this example the aerodynamic lift/control surfaces can have any other suitable configuration. Selectively and controllably changing the incidence angles of the ruddevators 325 via controller 390 generates aerodynamic forces that enable the boom fueling unit 310 to be aligned or aimed in any particular direction within a predefined envelope. Additionally or alternatively, the motion control system 330 comprises reaction control thrusters, which can also be operatively connected to controller 390.

In particular, motion control system 330 is configured for selectively and controllably providing a non-zero angular disposition, angle θ, between the boom axis 311 and the longitudinal axis of the receiver aircraft 20.

The boom system 300, in particular the nozzle 316 can be sized to allow suitable fuel flow rates for refueling a wide range of receiver aircraft. By way of non-limiting example, relative high fuel flow rates (for example up to 1,000 US gallons/6,500 lb per minute) can be provided for refueling operations of large aircraft (for example transport aircraft, bombers, etc.), while for fighter aircraft that cannot accept fuel at the maximum flow rate of the boom system 300, the refueling pressure can be correspondingly reduced. Alternatively the boom system 300 can be sized to allow suitable fuel flow rates for refueling a narrow range of receiver aircraft, for example only fighter aircraft or only larger aircraft (for example about 400 US gallons/2,600 lb per minute).

In operation of boom system 300, angle θ can be chosen such as to be a nominal design angle (angle $\theta_{des}$) that is within a particular allowable angular range which corresponds to the range of relative angular positions of the boom system 300 (and boom axis 311) with respect to the receiver aircraft 20, which allow for engagement between the nozzle 316 and the fuel receptacle 22.

In practice, the actual pitch, roll and yaw angles of the boom axis (and the extension of the telescoping aft section 314 with respect to boom member 312) determine the spatial position of the boom tip including the nozzle 316 with respect to the tanker aircraft 12'. In order to allow for engagement, the boom tip including the nozzle 316 needs to be within the respective refueling geometrical envelope and this position needs to be matched with the position of receptacle 22 of the receiver aircraft 20. The refueling geometrical envelope represents the safe limits of movement for the boom fueling unit 310 with respect to the receiver aircraft 20 and within which contact between the receiving aircraft 20 and the boom fueling unit 310 is permitted, and can correspond to at least part of the sensing volume 359. This position for the boom tip including the nozzle 316 can be achieved by adjusting angular alignment of the boom axis in elevation and azimuth, i.e., about the pitch and yaw axes at mechanical connection 320, together with axial extension along the boom axis via extension/retraction of the telescoping aft section 314 with respect to boom member 312. Thus, at a particular engagement enabling position, the boom tip and nozzle 316 can be positioned close to the receptacle 22, with the boom axis being aligned at an angle θ which can deviate from the nominal design angle (angle $\theta_{des}$) by a allowable angular clearance (+Δθ, −Δθ), but nevertheless still within the aforesaid allowable angular range (angle $\theta_{max}$ to angle $\theta_{min}$). The structure of the nozzle 316 and the receptacle 22 can be such as to allow for such deviations of angle θ from angle $\theta_{des}$ within the aforesaid allowable angular range. For example, the nozzle 316 can incorporate a ball joint and the receptacle 22 can include a funnel guide for the nozzle 316 to provide the allowable angular clearance (+Δθ, −Δθ), for example in a similar manner to that schematically illustrated in FIG. 10(b) regarding other examples, mutatis mutandis. By way of non-limiting example, where the nominal design angle $\theta_{des}$ is +30 degrees, engagement between the nozzle 316 and receptacle 22 can occur even when the boom axis has an angle of +40 degrees in elevation and +8 degrees in azimuth, assuming that the nozzle 316 can engage with the receptacle 22 with a relative spatial disposition therebetween of −10 degrees in elevation and −8 degrees in azimuth.

In at least some cases, angle θ (which can have an angular component in yaw and/or in pitch and/or in roll) can be further compensated for any off-nominal pitch of the receiver aircraft 20 (for example if the receiver aircraft 20 is traveling along direction A at a non-zero angle of attack) and/or for any off-nominal roll of the receiver aircraft 20 (for example if the receiver aircraft 20 is traveling along direction A at a non-zero roll angle) and/or for any off-nominal yaw of the receiver aircraft 20 (for example if the receiver aircraft 20 is traveling along direction A at a non-zero sideslip angle) to ensure that the actual angular disposition between the boom axis 311 and the receiver aircraft longitudinal axis is maintained at design angle $\theta_{des}$ even as the relative spatial orientation between the receiver aircraft 20 and the forward direction changes. Such compensation can be achieved, for example, by steering the tanker aircraft 12' in a corresponding manner.

Thus, at the design angle $\theta_{des}$ (and for other angles θ within the aforesaid allowable angular range (angle $\theta_{max}$ to angle $\theta_{min}$)) the boom axis 311 is in an engagement enabling orientation with respect to the receiver aircraft 20, and in particular with respect to the fuel receptacle 22.

In non-limiting examples, angle θ (and in particular angle $\theta_{des}$) can be any suitable angle in a range between about 5° and about 85°; or in a range between about 10° and about 80°; or in a range between about 15° and about 70°; or in a range between about 20° and about 60°; or in a range between about 25° and about 50°; or in a range between about 20° and about 40°; or in a range between about 25° and about 40°; or in a range between about 28° and about 32°.

In one non-limiting example, angle $\theta_{des}$ can be about 30°, and operation of the boom system 300 to adopt this angle automatically renders it compatible for use with existing receiver aircraft 20, in which the fuel receptacles 22 are configured for receiving and engaging with a nozzle at the end of a boom where the boom is at about 30° to the longitudinal axis of the receiver aircraft, without the need for modifying the configuration of the fuel receptacle thereof.

Thus, when angle θ is equal to design angle $\theta_{des}$, or within the aforesaid allowable angular range (angle $\theta_{max}$ to angle $\theta_{min}$), the receiver aircraft travelling along direction A with zero angle of attack and zero sideslip and zero roll, and boom axis 311 is at the required spatial orientation to the forward direction A of the tanker aircraft and the receiver aircraft such as to ensure engagement between the nozzle 316 in the fuel receptacle 22, without the need for modifying the configuration of the fuel receptacle thereof.

The boom system 300 further comprises a suitable data acquisition system 360 for providing or enabling the calculation of spatial data relating to the relative spatial dispositions between the boom system 300 and the receiver aircraft 20, in particular the relative spatial dispositions between the fuel delivery nozzle module 317 including fuel delivery nozzle 316 of the boom system 300, and the fuel receptacle 22 of the receiver aircraft, to enable selectively controlling the boom system 300 to provide automatic (optionally including autonomous) and/or manual alignment of the boom system 300 in the engagement enabling position and subsequent selective engagement of the fuel delivery nozzle to the fuel receptacle of the receiver aircraft.

In this example the data acquisition system 360 includes imaging system 350, in particular configured for providing imaging data of any object coming within a field of regard (FOR), in particular the fuel delivery nozzle module 317 including fuel delivery nozzle 316, and the fuel receptacle 22. Such a field of regard has a predetermined depth aft of the imaging system and in this example comprises sensing volume 359 generally aft of the imaging system 350, which for example comprises a prismoidal volume or any other suitable shape, for example conical, frustoconical, cylindrical, spherical, part-spherical (e.g. hemispherical), parallelepiped (for example cubic) or any other regular or irregular shape. The sensing volume 359, i.e., the predetermined depth of the FOR, extends beyond the position of the fuel delivery nozzle module 317 further than is required corresponding to the engagement enabling position, i.e., further than the maximum extension of the aft section 314 when this is in its fully deployed position. The imaging system 350 is operatively connected to a control computer system 355, which can be integral with, connected to, or independent from controller 390. In particular, such an object is the receiver aircraft 20 and more particularly a part AP thereof including the fuel receptacle 22 and/or another part of the receiver aircraft 20 (including a part that does not include the fuel receptacle 22, but, when recognized, can enable estimation of the fuel receptacle 22 position and orientation), and the sensing volume 359 defines an outer envelope limit 358 in which image data of part AP can be processed, inter alia, by control computer system 355. The control computer system 355 can then provide control signals, for example alignment commands, to the motion control system 330, for example via controller 390, to control operation of the boom system 300, in particular the relative orientation of the boom fueling unit 310 and the relative position of the nozzle 316 with respect to the receiver aircraft 20, in particular with respect to the fuel receptacle 22, so that the nozzle 316 can be controllably brought into selective engagement with the fuel receptacle 22 in a safe and effective manner.

In this example, the imaging system 350 comprises one or more Light Detection And Ranging (LIDAR) units 351, which can utilize eye-safe laser. The imaging system 350 in this example is located on the underside of the fuselage of the tanker aircraft 12', but in alternative variations of this example the imaging system 350 can be located elsewhere on the tanker aircraft 12', for example the wings, elevators, etc., so long as the sensing volume 359 extends beyond the position of the nozzle 316 to include the nozzle module 317 and nozzle 316, and part AP when the part AP is in close proximity to the nozzle 316. One exemplary non-limiting alternative location is shown in the figure under reference numeral 350'.

Figure 31:
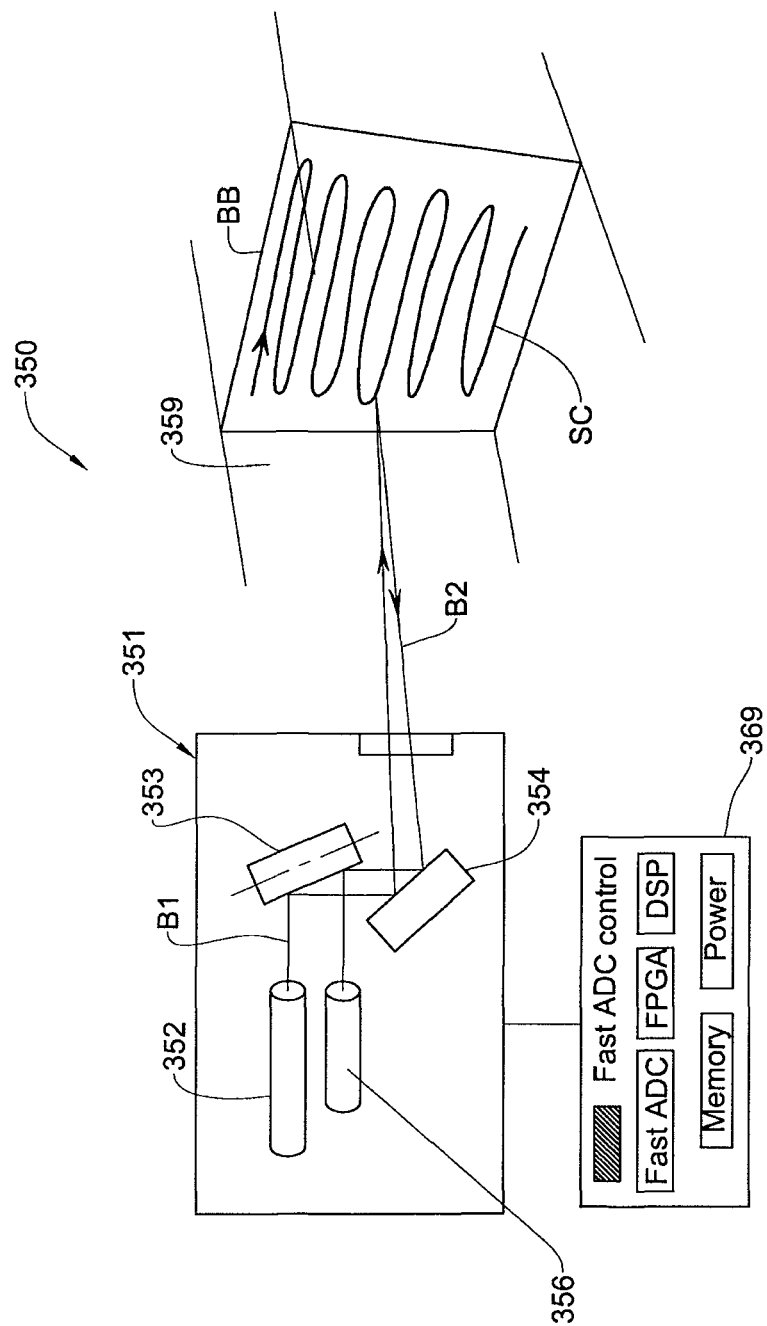
FIG. 31 is a schematic illustration of an image acquisition system according to certain examples of the presently disclosed subject matter.

In particular, and referring also to FIG. 31, the LIDAR unit 351 is configured for providing depth data and electromagnetic data (for example electromagnetic intensity data) relating to any object within the sensing volume 359, in particular relating to one or more of the nozzle module 317, nozzle 316 and part AP.

In this example, the LIDAR unit 351 comprises a fiber laser unit 352 configured for generating and radiating a laser beam B1 towards horizontally rotated polygon 353, which in turn deflects the beam B1 to a mirror 354, which can be controllably moved in elevation. The controlled combined motion of the mirror 354 and polygon 353 scans the outgoing beam B1 in a two-dimensional pattern SC in sensing volume 359, along azimuth and elevation within sensing volume 359, for example with respect to one or more planes BB orthogonal to a depth direction radiating from the LIDAR unit 351. Each time the outgoing beam B1 impinges on an object within the sensing volume 359, a reflected beam B2 returns along a path similar to that of the outgoing beam B1, deflected by the mirror 354 and polygon 353, and detected by detector 356.

It is to be noted that in some cases, a single mirror which can be rotated in two dimensions can be used instead of the mirror 354 and polygon 353.

Control module 369 includes one or more of a fast Analog to Digital Converter (ADC) card, Field Programmable Gate Array (FPGA), Digital Signal Processor (DSP), memory and power supply for operation of the LIDAR unit 351.

Fast Analog to Digital Converter (ADC) card can be one having a typical conversion speed of about 1.5 GHZ or more. The fiber laser unit 352 can generate a laser pulse having a very fast rising time therefore the returning (i.e. the reflected) beam requires a very fast detector such as an Avalanche Photo Diode. An Avalanche Photo Diode is a very sensitive Photo Diode which enables measuring the time of light with an accuracy of typically about 10 centimeters. Such accuracy can be further increased for example using the known functional time evolution of the laser pulse. Using such algorithm, accuracies of few millimeters can be achieved.

The Field Programmable Gate Array (FPGA) can be used to enable the required processing power for processing the data acquired by the LIDAR unit 351.

The Digital Signal Processor (DSP) can be a real time processor that can be configured to analyze the data acquired by the LIDAR unit 351 and provide the electromagnetic data and the depth data. Such data can be stored in the memory and can be transferred (e.g. transmitted) for further computations in one or more additional/alternative computers.

The fiber laser unit 352 is a Fiber laser which can comprise an optical fiber to which diode lasers (e.g. having a larger frequency than the required laser radiation) are attached for providing the necessary excited medium (e.g. the light amplifying medium). In some cases, the initiating laser diode at the required frequency is attached to the fiber and starts the laser operation. The laser beam is amplified in the fiber and an amplified beam goes out from the fiber to a collimator device to start the laser operation. A laser beam at 1.5 microns can be used, which is an eye safe light, since it cannot penetrate the cornea of the pilot and hence cannot focus on the retina and cause any damage. The laser beam can be typically composed of about one hundred thousand pulses per second. It is to be noted that the higher the number of pulses is, the higher resolution can be achieved. In some cases, the pulse duration of the laser beam can be about 2 to 10 nanosecond width. The energy of the pulsed laser beam can be set according to the required sampling distance. In some cases, no more than one hundred meters are needed, and in such cases the required energy is typically about five to twenty micro joules per pulse. The rise time of the laser beam can be of about few tenths of a nanosecond. This allows for accurate measurement of the time of light of the laser to the target. It is to be noted that in some cases gas or solid state laser can be alternatively used.

At any particular position of the mirror 354 and polygon 353 (corresponding to a two-dimensional position on plane BB, for example), the time interval between the outgoing beam B1 and the return beam B2 being detected by the detector 356 provides a measure of the depth of the part of the object which reflected the beam, thereby providing the depth data. In addition, the detector 356 also detects the intensity of the part of the object which reflected the beam to provide the intensity data.

In alternative variations of this example, the LIDAR unit 351 can be replaced with any other suitable imaging system 350 that provides depth data and electromagnetic intensity data of objects within the sensing volume 359 (including, but not limited to, Flash LADAR, 3D Flash LIDAR Camera, etc.). In still further alternative variations of this example, the LIDAR unit 351 can be replaced with other suitable imaging systems such as stereoscopic cameras, conventional cameras, various radar systems, etc.

In any case, the control computer system 355 comprises a memory including geometrical data of the shape of at least part of the receiver aircraft 20, in particular part AP and or the fuel receptacle 22. The control computer system 355 is further configured for operating on the depth data and the geometrical data to enable identification of a first part of the depth data that corresponds to the part AP and or the fuel receptacle 22.

according to certain examples of examples of the presently disclosed subject matter the data acquisition system 360 further includes boom tip marker 340, comprised in the fuel delivery nozzle module 317 proximate to the nozzle 316. The boom tip marker 340 is at a fixed and known geometrical relationship with respect to the nozzle 316, independently of the relative motion between the boom system 300 and the tanker aircraft 12', and is electromagnetically visible to the imaging system 350, at least during operation thereof.

In this example, the boom tip marker 340 comprises a retro-reflective surface that reflects incident beams along the same path, and thus provides a strong intensity reflection of the respective beam B2 when illuminated by beam B1, as compared with the reflection intensity obtained from other surfaces of the boom fueling unit 310, for example. Such a retro-reflective surface may be provided via a retro-reflective material affixed to the fuel delivery nozzle module 317. Such retro-reflective materials are well known in the art, and can include for example retro-reflective tape or retro-reflective paint.

According to certain examples of examples of the presently disclosed subject matter the data acquisition system 360 further includes fuel receptacle marker 342, comprised on the receiver aircraft 20 in a pre-determined location with respect to the fuel receptacle 22 thereof. The fuel receptacle marker 342 is at a fixed and known geometrical relationship with respect to the fuel receptacle 22, and is electromagnetically visible to the imaging system 350, at least during operation thereof.

In this example, the fuel receptacle marker 342 comprises a retro-reflective surface that reflects incident beams along the same path, and thus provides a strong intensity reflection of the respective beam B2 when illuminated by beam B1, as compared with the reflection intensity obtained from other surfaces of the receiver aircraft 20, for example. Such a retro-reflective surface may be provided via a retro-reflective material affixed to a certain known location visible to the imaging system 350 on the receiver aircraft 20. Such retro-reflective materials are well known in the art, and can include for example retro-reflective tape or retro-reflective paint.

It is to be noted that the data acquisition system 360 can include any one of the boom tip marker 340 and the fuel receptacle marker 342, or a combination of both. Alternatively, in some cases, the data acquisition system 360 can include none of the markers (in this case the natural reflective properties of the surfaces can be used).

The control computer system 355 is further configured for operating on the depth data and the electromagnetic intensity data to enable identification of a second part of the depth data that corresponds to the high intensity reflection originating from the boom tip marker 340, which in turn enables identification of the part of a third depth data that corresponds to nozzle 316 since the relative spatial relationship between the boom tip marker 340 and nozzle 316 is known.

Accordingly, when the aforesaid first part and second part (first part and third part) of the depth data is known, the control computer system 355 can determine the relative disposition between the boom system 300, and in particular the nozzle 316, and the receiver aircraft 20, in particular the fuel receptacle 22 thereof.

The tanker 12' can be configured to provide the maneuvering instructions for enabling positioning of the receiver aircraft 20 within an engagement area, for example in a similar manner to that disclosed herein with reference to the examples of FIGS. 1 to 29, mutatis mutandis, for example by utilizing a signaling system. Thus, such signaling system can be mounted, for example, on the tanker aircraft 12', at any location visible to the receiver aircraft 20 pilot. In some cases, the signaling system can provide the receiver aircraft 20 pilot with maneuvering instructions on three axes: forward-backward, left-right and up-down, thus enabling it to maneuver the receiver aircraft 20 to the corresponding engagement area that allows for engagement between the fuel nozzle 316 and the fuel receptacle 22. In some cases the signaling system can be a light directing system. Alternatively or additionally, the maneuvering instructions can be provided to by using voice commands (e.g. by utilizing speakers, pilot headset, etc.) or by any other means known per se. In some cases, a maneuvering instructions module can be configured to communicate the maneuvering instructions to an auto pilot system of the receiver aircraft 20, if such system exists, for causing the auto pilot system to maneuver the receiver aircraft 20 accordingly.

The manner of operation of the imaging system 350 and control computer system 355 will be described in greater detail further herein.

In operation, the LIDAR unit 351 illuminates the sensing volume 359 and any object therein, in particular part AP of the receiver aircraft 20 and thereafter acquire suitable image data corresponding thereto which is sent to control computer system 355 for processing to provide the aforesaid control signals for controlling operation of the boom system 300, in particular, to align the boom fueling unit 310 to provide a desired relative position and orientation of the nozzle 316 with respect to the fuel receptacle 22, in particular the engagement enabling position.

In alternative variations of this example and in other examples, the imaging system 350 can comprise any other suitable imaging system (for example, but not limited to, systems providing 2D images and/or stereoscopic images and/or 3D images of (including reconstruction of 3D data corresponding to) the sensing volume 359, in particular but not limited to images that are updated in real time, for example in the form of a video stream) that operate to provide suitable data to the control computer system 355 to, in turn, enable selectively controlling the boom system 300 to provide autonomous and/or manual engagement of the nozzle 316 to the fuel receptacle 22 of the receiver aircraft 20. For example the imaging system 350 can be similar to the imaging system disclosed herein with respect to the examples of FIGS. 1 to 29.

In alternative variations of this example, the fueling unit 310 can be replaced with any other conventional or non-conventional so-called "flying boom" systems.

In alternative variations of this example, the part AP can also comprise a retro-reflective surface to help identify the part of the depth data corresponding to the part AP.

In alternative variations of this example, the boom tip marker 340 and/or the fuel receptacle marker 342 can comprise an electromagnetic source, for example a light source of different wavelength from that of the illumination beam B1, and the illumination data received from the respective boom tip marker 340 and/or the respective fuel receptacle marker 342 (via the imaging system 350 and/or a second imaging system).

In alternative variations of this example, the imaging system 350 can be located in alternative locations on the refueling aircraft 12' and/or on the boom member 312, or on any other location.

There is now provided a description of certain examples of systems of controlling in-flight refueling.

Reference is now made to FIG. 18, which is a block diagram schematically illustrating a system for controlling in-flight refueling, according to certain examples of the presently disclosed subject matter. The system 1805 comprises at least one processing unit 1801. The processing unit 1801 can be a microprocessor, a microcontroller or any other computing device or module, including distributed and/or multiple processing units, which are adapted to independently or cooperatively process data for controlling relevant system 1805 components and for enabling operations related to system 1805 components.

In some cases, the processing unit 1801 can be the control computer system 155, or part thereof. In some cases, the processing unit can be the controller 180. Alternatively, the processing unit 1801 can be a separate component.

In some cases, the processing unit 1801 can be located on-board the refueling device 100, or on-board the receiver aircraft 20, or on-board the tanker aircraft 12. In some cases, more than one processing unit can be used and the plurality of processors can be cooperatively operated.

In some cases, the system 1805 can be distributed between the refueling device 100 and/or the receiver aircraft 20, and/or the tanker aircraft 12 and/or any other location, including remote locations. The communication between the various components of the system 1805 can be realized by any communication components, protocols and modules, and can be wired or wireless.

The system 1805 further comprises a sensor control module 1810. According to some examples of the presently disclosed subject matter, the sensor control module 1810 can be configured to utilize at least one sensor 1890 (possibly according to instructions from the processing unit 1801) as part of the operation of and control over the refueling process.

The sensor control module 1810 can be operatively connected to at least one sensor 1890 and can be configured to control the operation of the sensor 1890. The sensor 1890 can be a suitable data acquisition system, for example, any image acquisition means such as a camera (e.g. a digital still camera, a digital video camera, a Flash LADAR camera, etc.). Alternatively, the sensor 1890 can be a Light Detection And Ranging (LIDAR) unit (including one using an eye-safe laser), a radar (including a radar utilizing an eye-safe laser), a laser array (including a laser array that utilizes eye-safe lasers), electro-acoustic sensors, etc. An exemplary non-limiting LIDAR unit that can be used is described herein, inter alia with reference to FIGS. 31-33. In some cases, sensor 1890 can be configured inter alia for providing data of any object coming within a field of regard (FOR) aft of the refueling device 100 (and/or the tanker aircraft 12). In some cases, the sensor 1890 can be the imaging system 150 or imaging system 350 detailed herein. In some cases, multiple sensors can be utilized, including, for example, a combination of the imaging system 150 and the imaging system 350, or multiple redundant sensors of same type. In some cases, such combination of sensors can enable determination of spatial data also in cases when one of the imaging system 150 and the imaging system 350 does not provide the required data from some reason (e.g. due to a malfunction or due to environmental conditions such as clouds, dazzling light, etc. or due to partial concealment of the FOR by other system components, such as concealment of receptacle by telescope, that can affect the sensors and/or the data received therefrom, or from any other reason).

In some cases, imaging system 150 can be configured inter alia for providing imaging data (including spatial disposition determination enabling data such as data received from a LIDAR unit, etc.) of any object coming within a field of regard (FOR) aft of the refueling device 100 (and/or the tanker aircraft 12). The sensor control module 1810 is configured to operate sensor 1890 (or multiple sensors, mutatis mutandis) in order to acquire data that enables, inter alia, repeated determination of spatial data such as the spatial disposition of the receiver aircraft 20 with respect to an engagement area related thereto and/or determination of the spatial dispositions of the refueling device 100 with respect to an engagement enabling position, etc. as further detailed herein, inter alia with respect to FIGS. 22 and 23.

The system 1805 can further comprise a maneuvering instructions module 1820, a steering control module 1830, a safety module 1840, and an engagement/disengagement control module 1850.

Figure 20:
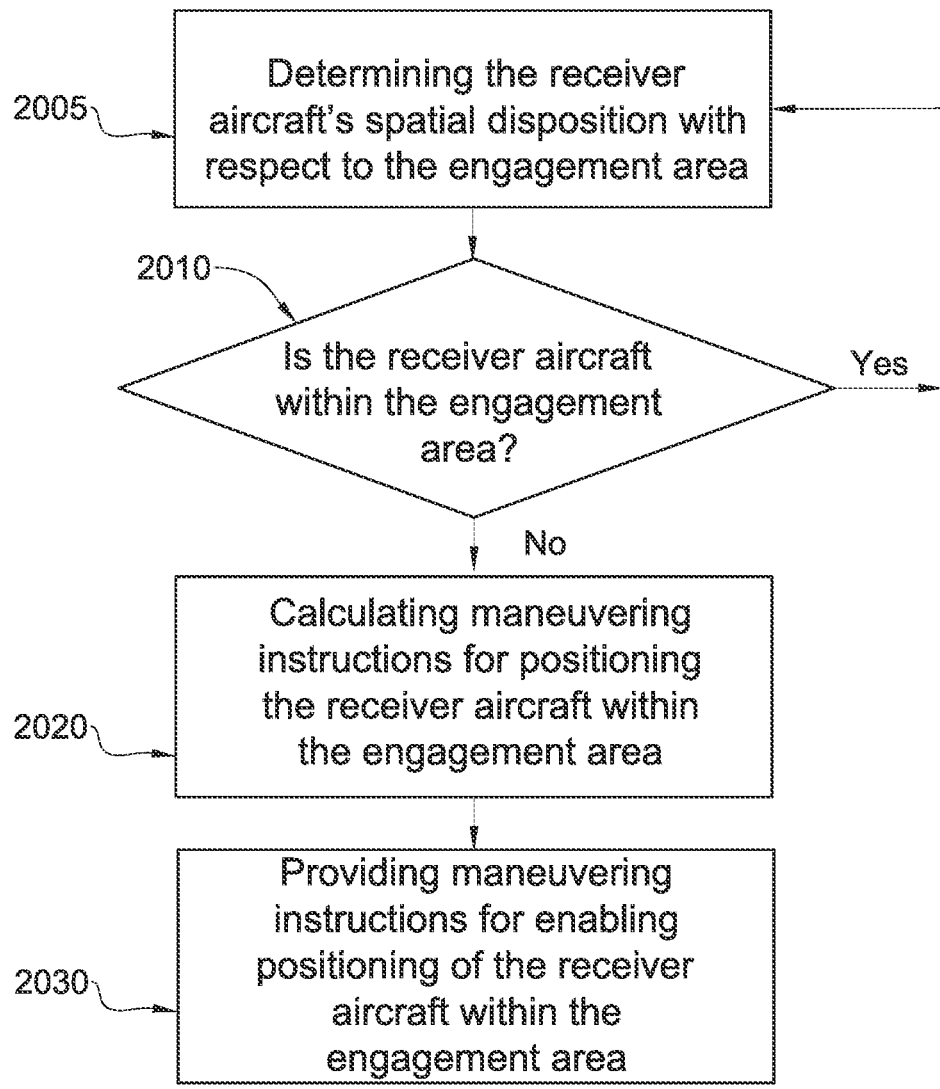
FIG. 20 is a flowchart illustrating a sequence of operations carried out for providing maneuvering commands for positioning a receiver aircraft within an engagement area related thereto, according to certain examples of the presently disclosed subject matter.

Maneuvering instructions module 1820 can be configured to calculate maneuvering instructions for enabling positioning of the receiver aircraft 20 within an engagement area related thereto, and for providing the calculated maneuvering instructions to a pilot of the receiver aircraft 20, as further detailed, inter alia with respect to FIG. 20.

Figure 21:
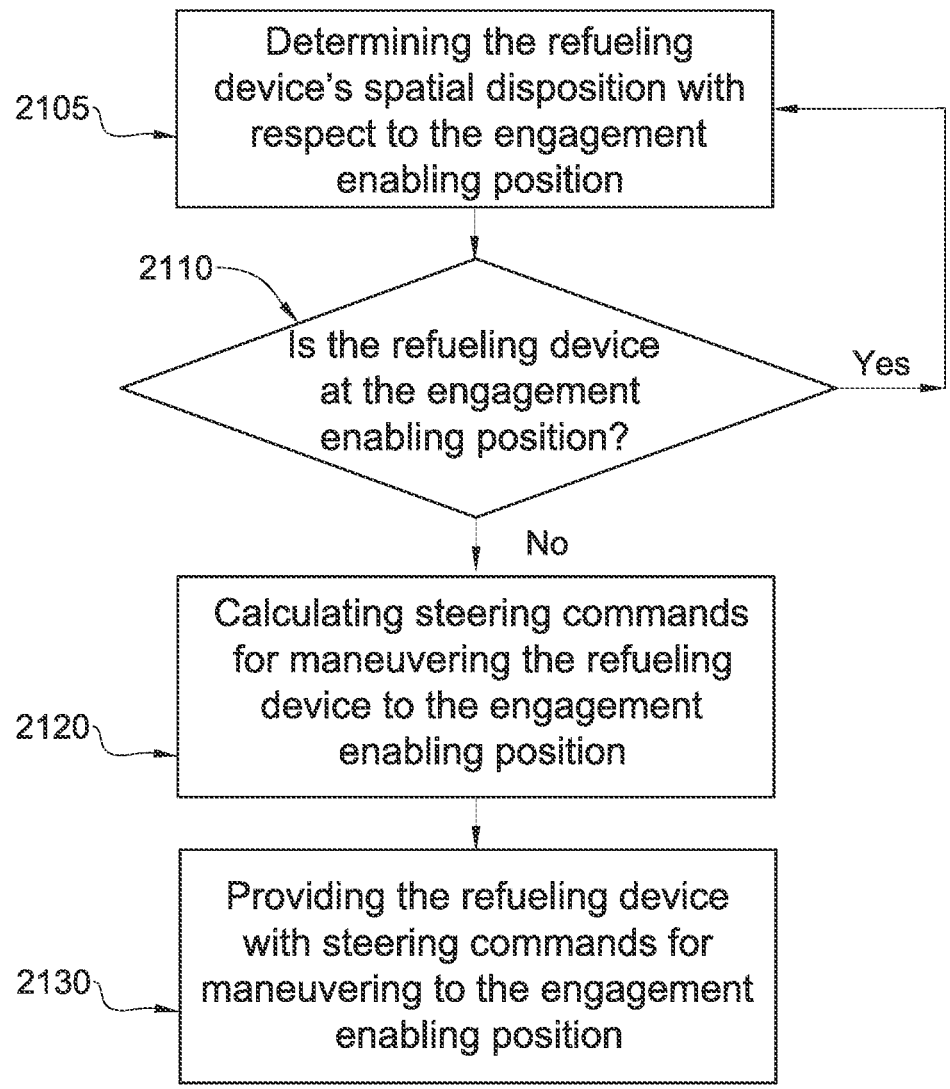
FIG. 21 is a flowchart illustrating a sequence of operations carried out for providing steering commands to a refueling device for maneuvering to an engagement enabling position, according to certain examples of the presently disclosed subject matter.

Steering control module 1830 can be configured, when a non-aircraft-fixed in-flight refueling system is used, to calculate and provide steering commands (e.g. in six degrees of freedom) to the refueling device 100 for steering the refueling device 100 to an engagement enabling position or, when utilizing an aircraft-fixed flying boom system, to calculate and provide alignment commands (e.g. in three degrees of freedom) to the boom fueling unit 310 for aligning the refueling device 100 in an engagement enabling position, as further detailed herein, inter alia with respect to FIG. 21. It is to be noted that the steering commands (e.g. in six degrees of freedom) and the alignment commands (e.g. in three degrees of freedom) are also referred to as maneuvering commands interchangeably.

Figure 19:
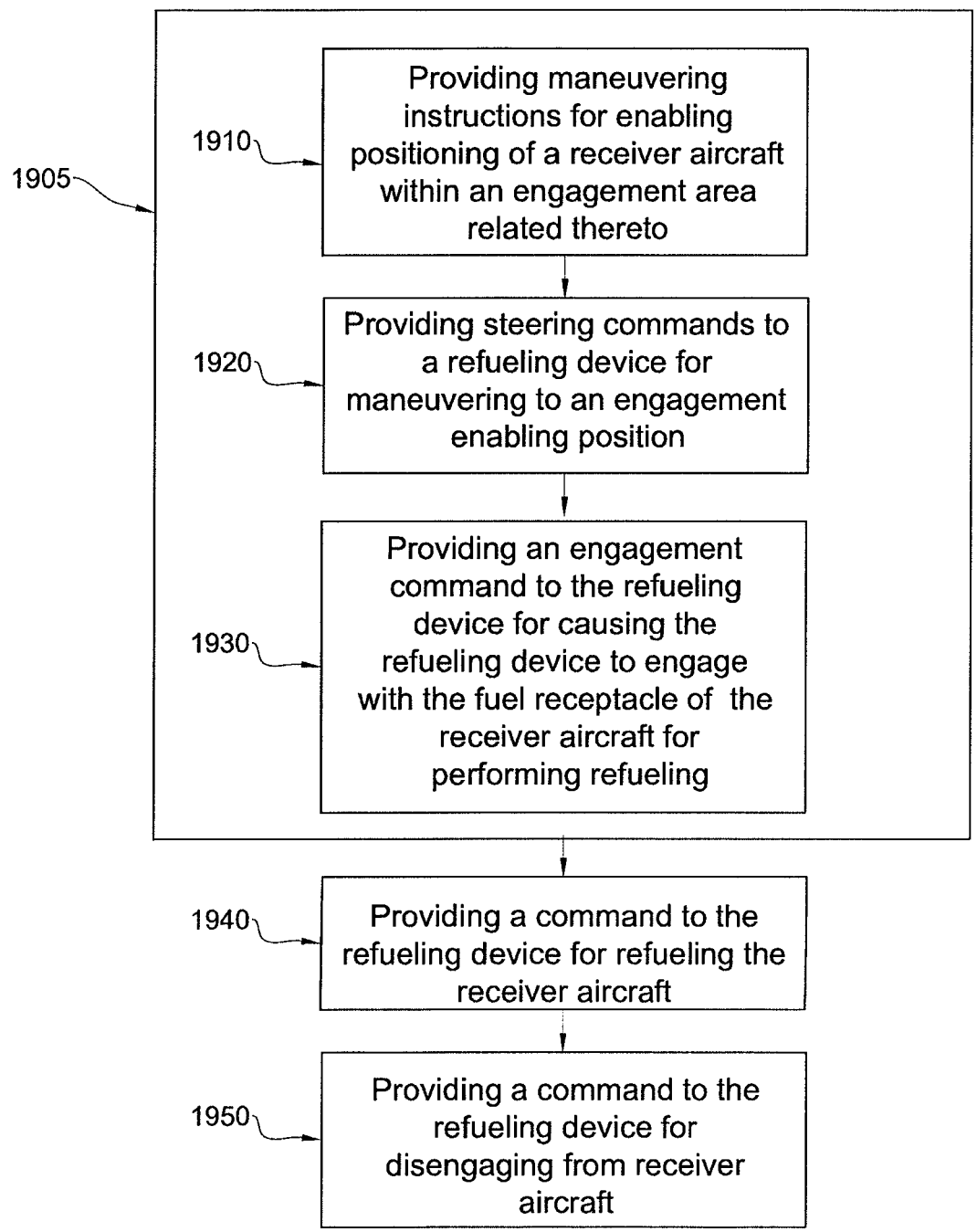
FIG. 19 is a flowchart illustrating a sequence of operations carried out for performing in-flight refueling, according to certain examples of the presently disclosed subject matter.

Safety module 1840 can be configured to monitor hazardous situations in the refueling process, as further detailed herein, inter alia with respect to FIG. 19. The hazardous situations can be defined by a set of thresholds and/or parameters and respective safety conditions. For example, safety module 1840 can be configured to monitor that the refueling device 100 does not approach the receiver aircraft 20 (or vice versa) in an unsafe manner, and/or that the refueling device 100 does not approach the tanker aircraft 12 (or vice versa) in an unsafe manner, etc.

Engagement/disengagement control module 1850 can be configured to provide an engagement command to the refueling device 100 for causing the refueling device 100 to engage with the fuel receptacle 22 of the receiver aircraft 20 for performing refueling, and to provide a command to the refueling device 100 to disengage from the fuel receptacle 22 of receiver aircraft 20, as further detailed herein. According to examples of the presently disclosed subject matter, engagement/disengagement control module 1850 can be responsive to an indication that the receiver aircraft 20 is positioned in an engagement enabling position. The engagement enabling position, in some cases, can depend on a spatial disposition of the refueling device 100 with respect to the receiver aircraft 20, as further detailed herein.

The system 1805 can further comprise a configuration data repository 1860 (hereinafter: "Configuration DR") and a reference data repository 1870 (hereinafter: "Reference DR"). Configuration DR 1860 comprises data indicative of various predefined configurations that are used in the refueling process. According to examples of the presently disclosed subject matter, the configuration DR 1860 can include configuration data related to an engagement area and an engagement enabling position. Further, by way of example, the configuration data related to the engagement area and the engagement enabling position can be used to determine the engagement area and/or the engagement enabling position in a given scenario (and for a given set of parameters). Additional data with respect to the configuration data will be provided herein, inter alia with respect to FIGS. 22 and 23. Reference DR 1870 comprises reference data to be used, inter alia, for determining (it is to be noted that in some cases such determination is made, for example, repeatedly) the receiver aircraft's 20 spatial disposition with respect to the engagement area related thereto and the refueling device's 100 spatial disposition with respect to the engagement enabling position, etc. According to some examples, the reference data can be used in combination with dynamic data acquired by the sensor 1890 for enabling evaluation of the sensor's 1890 data. Further explanations regarding the reference data are provided herein, inter alia with respect to FIGS. 22 and 23. It is to be noted that in some cases, Reference DR 1870 can also be used by the safety module 1840 for determining hazardous situations.

It is to be noted that according to some examples of the presently disclosed subject matter, some or all of the Configuration DR 1860, the Reference DR 1870, the sensor control module 1810, the maneuvering instructions module 1820, the steering control module 1830, the safety module 1840, and the engagement/disengagement control module 1850 can be combined and provided as a single system/module, or, by way of example, at least one of them can be realized in a form of two or more systems/modules, each of which can in some cases be distributed over more than one location.

The system can still further comprise an interface 1880 for enabling one or more components of the system 1805 to operate in cooperation with auxiliary units, devices, systems or modules. For example, the interface 1880 can implement various protocols, software languages, drive signals, etc. Further, by way of example, the interface 1880 can be used to operate certain auxiliary units, devices, systems or modules on board one or more of the refueling device 100, the receiver aircraft 20 or the tanker aircraft 12.

According to another aspect of the presently disclosed subject matter, there are provided methods for in-flight refueling of aircraft. While such methods can be applied to the systems and devices for in-flight refueling of aircraft according to another aspect of the presently disclosed subject matter, and as disclosed herein, for example, the methods can also be applied to other suitable systems and devices for in-flight refueling of aircraft, mutatis mutandis.

According to the second aspect of the presently disclosed subject matter, there are at least three alternative operation modes for in-flight refueling of aircraft:

Operation Mode I—in which a refueling device is automatically (and in some cases autonomously) flown to engagement with the receiver aircraft fuel receptacle.

Operation Mode II—in which an operator in the tanker aircraft or elsewhere (via suitable communications link—for example satellite link, another aircraft including the receiver aircraft, ground control, and so on) controls flying of a refueling device while towed behind the tanker aircraft to engagement with the receiver aircraft fuel receptacle.

Operation Mode III—in which the refueling device is not flown or controlled per se, but instead attains a stable configuration with the boom member at the required inclination angle with respect to the forward direction, and the receiver aircraft maneuvers to a position where it can engage the nozzle to the receiver aircraft fuel receptacle.

Examples of these operation modes will now be described in greater detail.

Operation Mode I

In this operation mode, once the tanker aircraft 12 and receiver aircraft 20 are in close proximity and flying in formation, with the receiver aircraft 20 at a position behind the tanker aircraft 12, the refueling device 100 automatically (and in some cases, autonomously) flies into engagement with the fuel receptacle 22 of the receiver aircraft 20.

Turning to FIG. 19 there is provided a flowchart illustrating a sequence of operations carried out for enabling performance of in-flight refueling, according to certain examples of the presently disclosed subject matter, in particular relating to the example of a system for controlling in-flight refueling, as illustrated in FIG. 18. The sequence of operations begins with performance of an engagement sequence 1905, comprising 3 blocks: 1910, 1920 and 1930.

Figure 22:
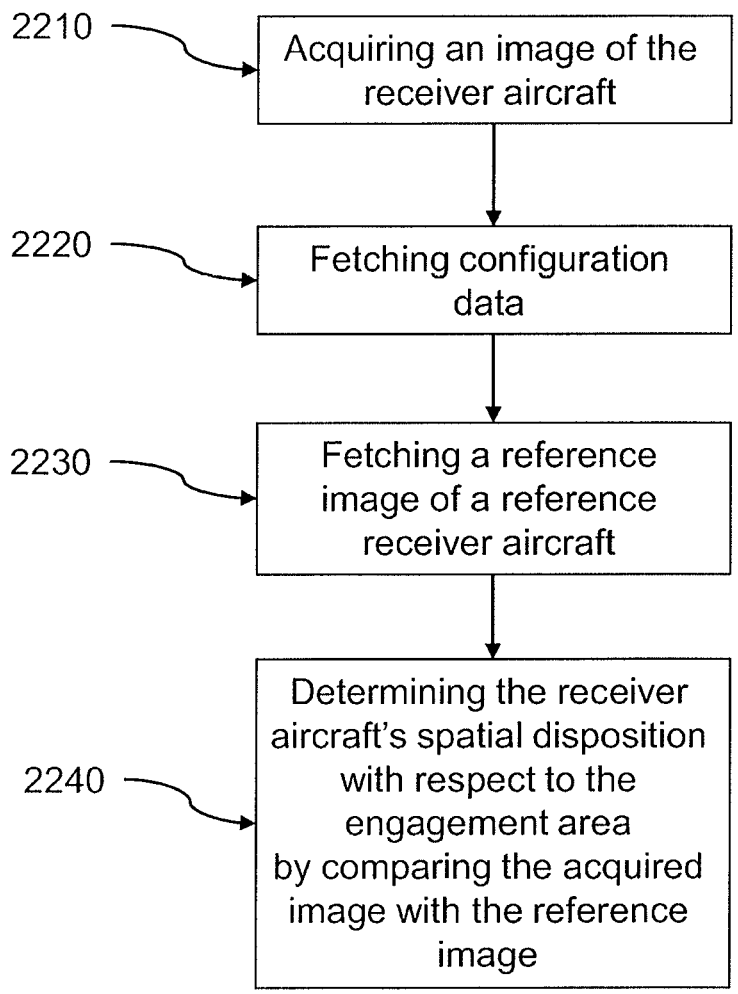
FIG. 22 is a flowchart illustrating a sequence of operations carried out for determining the receiver aircraft spatial disposition with respect to the engagement area related thereto, according to certain examples of the presently disclosed subject matter.

Turning at first to block 1910, in some cases, maneuvering instructions module 1820 is configured to calculate and provide maneuvering instructions for enabling positioning the receiver aircraft 20, and more specifically a fuel receptacle 22 thereof, within an engagement area related to the receiver aircraft 20 (as in cases where more than one receiver aircraft 20 exists, each receiver aircraft 20 can be associated with a different engagement area) (block 1910), as further detailed herein with respect to FIGS. 20 and 22. Inter alia, some examples of methods that can be used for providing the maneuvering instructions to the pilot of the receiver aircraft 20 are also provided herein.

It is to be noted that such maneuvering instructions can be required in some cases, where the pilot of the receiver aircraft 20 has no line of sight to the refueling device 100 or boom fueling unit 310 during all or part of the refueling process, inter alia in light of the receiver aircraft 20 fuel receptacle 22 position. Thus, there can be a need to provide the pilot of the receiver aircraft 20 with maneuvering instructions, as further detailed herein.

As mentioned above, according to examples of the presently disclosed subject matter, the refueling process can include providing maneuvering instructions for positioning the receiver aircraft 20 within an engagement area related thereto. The engagement area is a virtual volume in which the refueling device 100 (when a non-aircraft-fixed in-flight refueling system is used) or boom fueling unit 310 (when utilizing an aircraft-fixed flying boom system) can be maneuvered in order to engage with the fuel receptacle 22 of the receiver aircraft 20. According to some examples of the presently disclosed subject matter, the engagement area can be defined by various specifications that depend on several parameters. According to one example, the parameters are associated with maneuvering capabilities of the refueling device 100 (when a non-aircraft-fixed in-flight refueling system is used) or the boom fueling unit 310 (when utilizing an aircraft-fixed flying boom system). Such maneuvering capabilities can be defined, for example, by the range and types of motion that can be achieved by utilizing the spatial control system 160 and/or the force generating arrangement 190 of the refueling device 100 (when a non-aircraft-fixed in-flight refueling system is used) or the mechanical connection 320 and/or the motion control system 330 of the boom fueling unit 310 (when utilizing an aircraft-fixed flying boom system), etc.

According to certain examples of the presently disclosed subject matter, the parameters defining the engagement area can further include, inter alia, the length of the hose 52 (when a non-aircraft-fixed in-flight refueling system is used), the length of the boom fueling unit 310 (when utilizing an aircraft-fixed flying boom system), the flight speed, the flight altitude, weather conditions, the fuel pressure within the hose 52 (when a non-aircraft-fixed in-flight refueling system is used), the location of the fuel receptacle 22 of the receiver aircraft 20, etc. In some cases, the engagement area can be substantially in the shape of a cube, a sphere, or any other shape, including a non-regular shape, with a certain volume. The various engagement area specifications can be stored, for example, on configuration DR 1860. For example, the engagement area specifications can include a set of spatial dispositions between the refueling device 100 and the receiver aircraft 20 or any other volumetric specification. According to further examples of the presently disclosed subject matter, the engagement area specifications can be used in combination with reference data for enabling the refueling device 100, based on dynamic data acquired by the sensor 1890, to identify when the receiver aircraft 20 is within a position that meets the engagement area specification. In this case, correlations can be computed between the data acquired by the sensor 1890 and the reference data, in order to determine if and when the receiver aircraft 20 is within the engagement area, as further detailed herein, inter alia with reference to FIG. 30-32.

Figure 24:
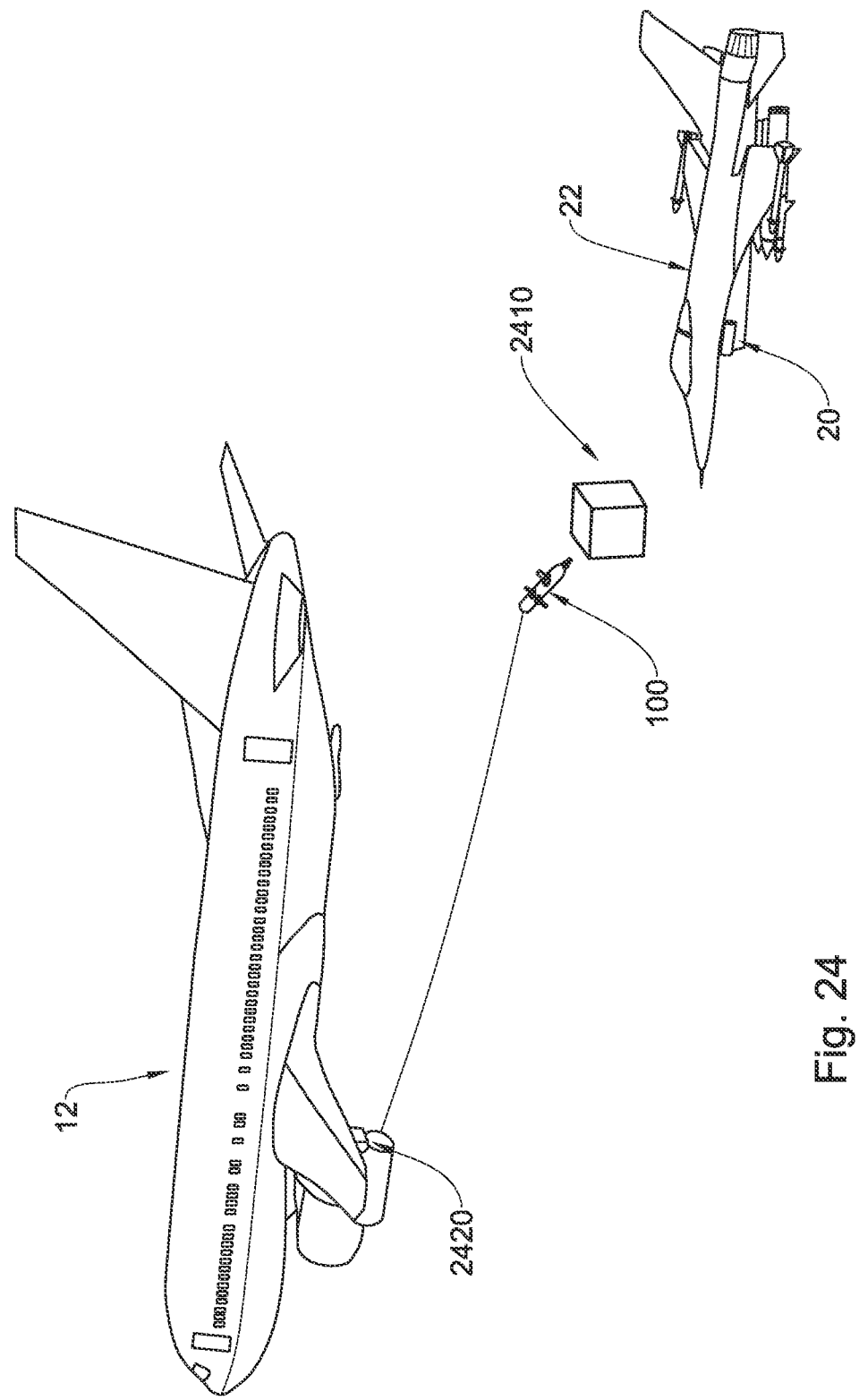
FIG. 24 is an illustration of an example of a receiver aircraft positioned outside a virtual engagement area, according to certain examples of the presently disclosed subject matter.

Before moving on to describe FIG. 19, and for the purpose of providing a visual illustration of an exemplary engagement area, attention is drawn to FIG. 24, showing an illustration of one example of a receiver aircraft positioned outside a virtual engagement area, according to certain examples of the presently disclosed subject matter. The engagement area 2410 in the illustrated example is a virtual pre-determined volume, shaped substantially like a cube, in which the refueling device 100 (or, when utilizing an aircraft-fixed flying boom system—the boom fueling unit 310) can navigate until engaging with the fuel receptacle 22 of the receiver aircraft 20, as detailed herein. Although in this example the virtual engagement area is shaped substantially like a cube, the virtual engagement area can have any other shape with a certain volume. The virtual engagement area can be defined by a set of parameters that correspond to a volumetric shape. It can be further appreciated that in the illustrated example, the receiver aircraft 20 is not positioned within the engagement area 2410. The illustration of FIG. 24 is provided for clarity of explanation only and is by no means binding.

Returning to FIG. 19, in some cases, the engagement area specifications can be defined using, inter alia, a parameter denoting a position of the center of such an engagement area, or any other point within the engagement area, and a set of offset vectors, collectively representing a volume. In some cases, the center (or any other point of reference) of the engagement area can be determined in accordance with one or more of the following parameters: the length of the hose 52 in a deployed position (when a non-aircraft-fixed in-flight refueling system is used), the length of the boom fueling unit 310 (when utilizing an aircraft-fixed flying boom system), a given pitch angle between the boom axis 131 (when a non-aircraft-fixed in-flight refueling system is used) or the boom fueling unit 310 (when utilizing an aircraft-fixed flying boom system) and the forward direction A, a given yaw angle between the boom axis 131 (when a non-aircraft-fixed in-flight refueling system is used) or the boom fueling unit 310 (when utilizing an aircraft-fixed flying boom system) and the forward direction A and a given fuel pressure within the hose 52 (when a non-aircraft-fixed in-flight refueling system is used), etc. One or more of the parameters which are used to determine the center (or any other point of reference) of the engagement area can vary during flight and/or during the engagement sequence 1905 and the system 1805 can measure the relevant parameters dynamically for determining the center (or any other point of reference) of the engagement area.

In some cases (e.g. when a non-aircraft-fixed in-flight refueling system is used), the point of reference for the engagement area can be positioned in a position from which utilization of the force generating arrangement 190 enables the nozzle 135 to engage with the fuel receptacle 22 of the receiver aircraft 20 and the engagement area is defined with reference to this point. In other cases (e.g. when utilizing an aircraft-fixed flying boom system), the point of reference for the engagement area can be positioned in a position which enables the nozzle 316 to engage with the fuel receptacle 22 of the receiver aircraft (e.g. by extending the telescoping aft section 314 thus applying force on the fuel receptacle 22 due to reaction force on the other side of the boom fueling unit 310, at the mechanical connection 320) and the engagement area is defined with reference to this point.

In some examples, this point of reference is defined in the system as an engagement enabling position, and can also be used by an engagement/disengagement control module 1850, for controlling engagement and of the nozzle 135 (or nozzle 316) with the fuel receptacle 22 of the receiver aircraft 20. It will be appreciated that this point can also depend, inter alia, on the parameters described herein, and in some cases, is dynamically calculated according to the relevant parameters during the engagement sequence 1905.

According to some examples of the presently disclosed subject matter, e.g. when a non-aircraft-fixed in-flight refueling system is used, the engagement enabling position can be characterized by the boom member 130 being in a predetermined maximal spaced and spatial relationship with respect to the fuel receptacle 22 of the receiver aircraft 20. According to some examples of the presently disclosed subject matter, e.g. when utilizing an aircraft-fixed flying boom system, the engagement enabling position can be characterized by the boom fueling unit 310 (or nozzle 316 thereof) being in a predetermined maximal spaced and spatial relationship with respect to the fuel receptacle 22 of the receiver aircraft 20.

Throughout the description and the claims, reference is made interchangeably to the terms spatial relationship and spatial disposition. The terms spatial relationship and spatial disposition or the like can relate to spatial distances, spatial angles (including orientations), or any other spatial reference that is used for characterizing a spatial relationship between two objects, e.g. between any two of the following: the tanker aircraft 12, the receiver aircraft 20 (and a fuel receptacle 22 thereof), the refueling device 100 and the boom fueling unit 310. In some cases the spatial relationship can include aligning the boom axis 131 of the boom member 130 (e.g. when a non-aircraft-fixed in-flight refueling system is used) or the boom axis 311 of the boom fueling unit 310 (e.g. when utilizing an aircraft-fixed flying boom system), in an engagement enabling orientation.

In some cases, when a non-aircraft-fixed in-flight refueling system is used, the maximal spaced relationship between the boom member 130 of the refueling device 100 and the fuel receptacle 22 of the receiver aircraft 20 at the engagement enabling position can depend on various parameters, such as: the hose 52 length and flexibility, the flight speed, the flight altitude, the characteristics of the force generating arrangement 190, etc., and in such cases, the maximal space can be calculated as necessary, inter alia dynamically during the refueling process, based on current values of the respective parameters. For example, it can be appreciated that the less flexible the hose 52, the maximal space between the boom member 130 of the refueling device 100 and the fuel receptacle 22 of the receiver aircraft 20 at the engagement enabling position is reduced. In some cases, the maximal space between the boom member 130 of the refueling device 100 and the fuel receptacle 22 of the receiver aircraft 20 at the engagement enabling position can be defined by the movement range of the boom member 130 in the direction of the fuel receptacle 22 of the receiver aircraft 20.

In some cases, when utilizing an aircraft-fixed flying boom system, the maximal spaced relationship between the boom member 312 of the boom fueling unit 310 and the fuel receptacle 22 of the receiver aircraft 20 at the engagement enabling position can also depend on various parameters, such as: the flight speed, the flight altitude, etc., and in such cases, the maximal space can be calculated as necessary, inter alia dynamically during the refueling process, based on current values of the respective parameters. In some cases, the maximal space between the boom member 312 of the boom fueling unit 310 and the fuel receptacle 22 of the receiver aircraft 20 at the engagement enabling position can be defined by the extension range of the telescoping aft section 314 in the direction of the fuel receptacle 22 of the receiver aircraft 20.

In some cases, the spatial relationship between the boom member 130 of the refueling device 100 (e.g. when a non-aircraft-fixed in-flight refueling system is used), or the boom fueling unit 310 (e.g. when utilizing an aircraft-fixed flying boom system), and the fuel receptacle 22 of the receiver aircraft 20 at the engagement enabling position can also depend on various parameters, such as the characteristics of the fuel receptacle 22 of the receiver aircraft 20, etc. According to examples of the presently disclosed subject matter the spatial relationship with which the engagement enabling position is associated can also include an angle parameter. In this regard, it can be appreciated that in case the fuel receptacle 22 of the receiver aircraft 20 has an entrance angle, the boom axis 131 of the boom member 130 (e.g. when a non-aircraft-fixed in-flight refueling system is used), or the boom axis 311 of the boom fueling unit 310 (e.g. when utilizing an aircraft-fixed flying boom system), should be in a spatial disposition that enables the nozzle (nozzle 135 or nozzle 316) to engage therewith (e.g. the boom axis 131 or boom axis 311 needs to be aligned with a fuel receptacle 22 of the receiver aircraft 20).

It has been explained herein that when a non-aircraft-fixed in-flight refueling system is used spatial control system 160 can, in accordance with certain examples, be configured for selectively and controllably providing a non-zero angular disposition, angle θ, between the boom axis 131 and the forward direction A, that enables this angle θ to be selectively maintained between the boom axis 131 and the forward direction A at least for a part of the time when the refueling device 100 is being towed by the tanker aircraft 12 via hose 52, and in particular during the engagement operation of the fuel device 100 to the receiver aircraft 20 and during refueling thereof. It is to be noted that such angle θ can be predetermined. In some cases the angle θ can be stored in the configuration DR 1860.

It is to be noted that when utilizing an aircraft-fixed flying boom system, a mechanical connection 320 and/or a motion control system 330 can be utilized for selectively and controllably providing a non-zero angular disposition, angle θ, between the boom axis 311 and the receiver aircraft (e.g., between the boom axis 311 and. forward direction, A when the receiver aircraft is also aligned with forward direction A) and selectively maintain this angle θ at least for a part of the time during the engagement operation of the boom fueling unit 310 to the receiver aircraft 20 and during refueling thereof. It is to be noted that such angle θ can be predetermined, and can lie within a range of angles in which such engagement between the boom fueling unit 310 to the receiver aircraft 20. In some cases the angle θ can be stored in the configuration DR 1860.

In some examples, it is to be noted that the engagement enabling position is not necessarily a specific x, y, z coordinate, as, under certain conditions, the exact coordinates of the point of reference for the engagement area can vary, or some tolerance can be accepted (for example using tolerance ranges). In addition, there can be more than one engagement enabling position that meets the conditions detailed herein, each of which is an engagement enabling position.

Figure 26:
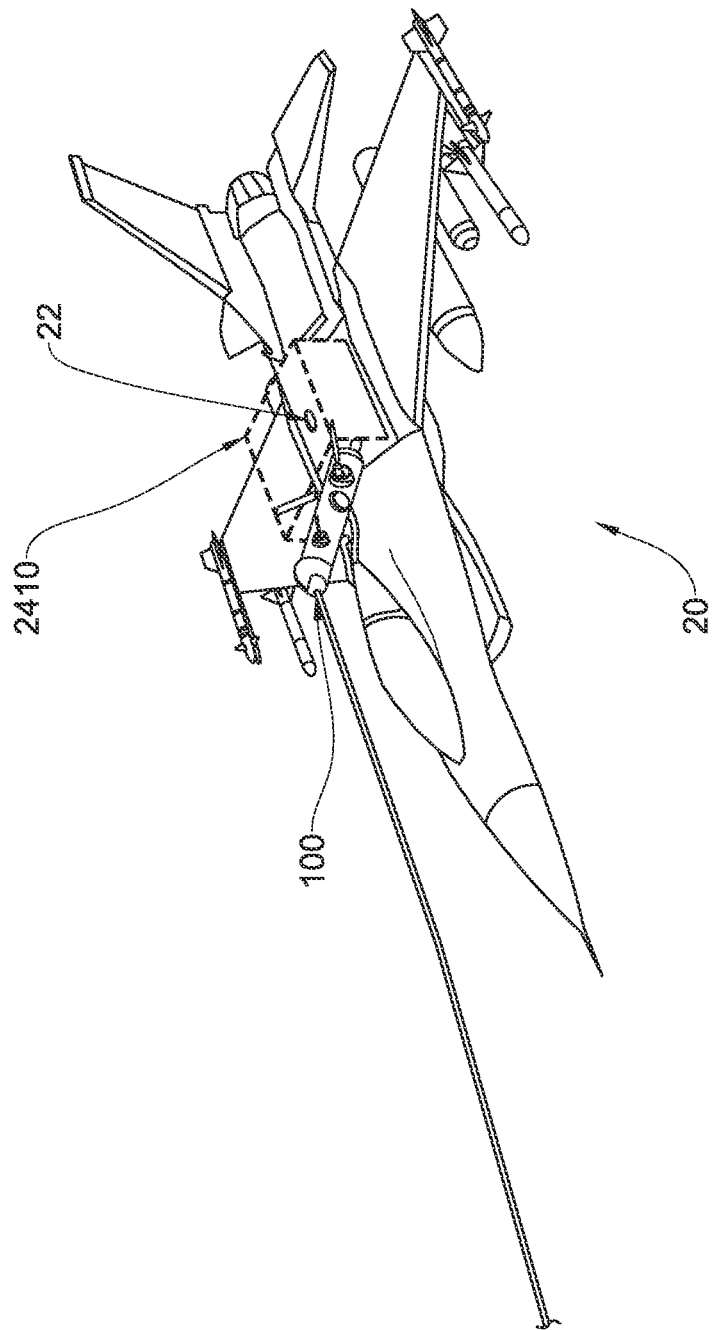
FIG. 26 is an illustration of an example of a refueling device not in an engagement enabling position, according to certain examples of the presently disclosed subject matter.
Figure 27:
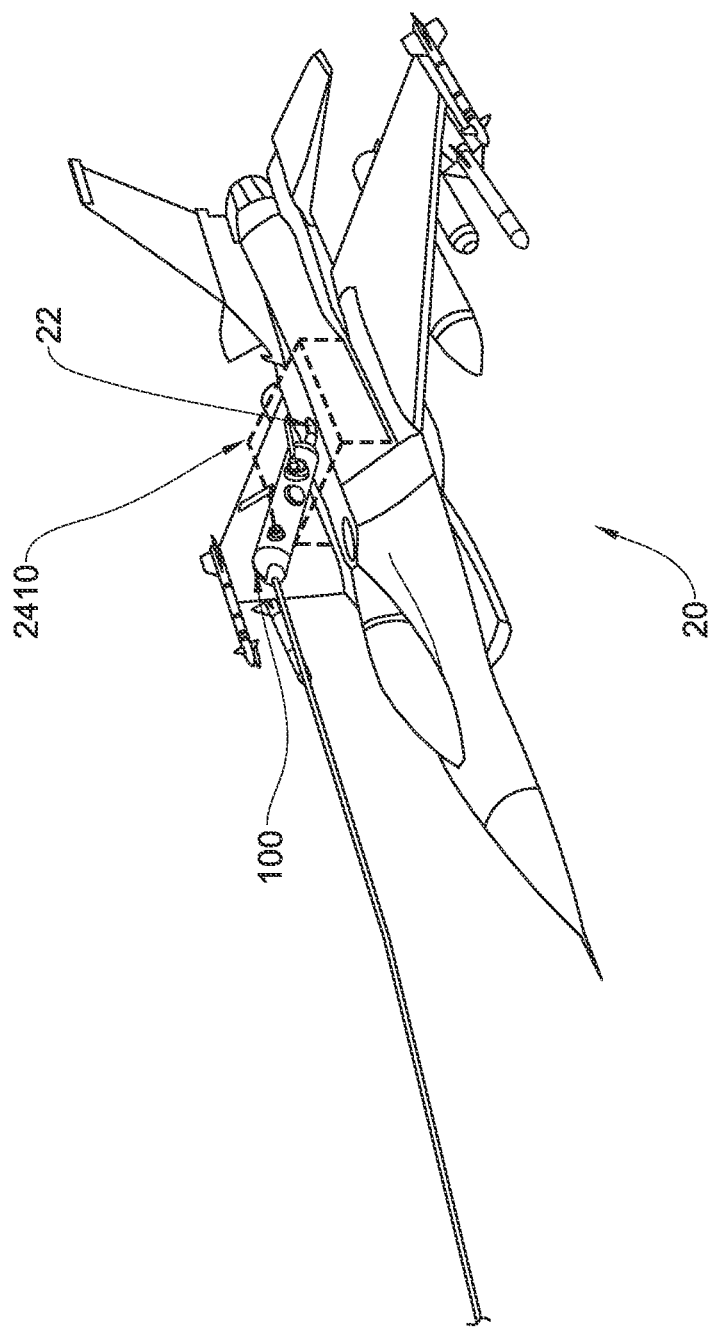
FIG. 27 is an illustration of an example of a refueling device positioned in an engagement enabling position, according to certain examples of the presently disclosed subject matter.

Before moving on to describe FIG. 19, and for the purpose of providing a visual illustration of an exemplary engagement enabling position, attention is drawn to FIG. 26 and FIG. 27. Reverting to FIG. 26, there is shown an illustration of an example of a refueling device not in an engagement enabling position, according to certain examples of the presently disclosed subject matter. It can be appreciated that the receiver aircraft 20, and more particularly a fuel receptacle 22 thereof, is positioned within the engagement area 2410, however, the refueling device 100 is not positioned in an engagement enabling position. In this example, as illustrated in FIG. 26, it can be appreciated that the refueling device 100 is not aligned with the fuel receptacle 22 of the receiver aircraft 100. The illustration of FIG. 26 is provided for clarity of explanation only and is by no means binding. Reverting to FIG. 27, there is shown an illustration of an example of a refueling device positioned in an engagement enabling position, according to certain examples of the presently disclosed subject matter. It can be appreciated that the refueling device 100 is positioned in an engagement enabling position that can enable engagement with the fuel receptacle 22 of the receiver aircraft 100. The illustration of FIG. 27 is provided for clarity of explanation only and is by no means binding.

It is to be noted that a refueling device 100 is shown in FIGS. 24-27 for illustration purposes only and other refueling systems can also be used, including, but not limited to, a boom fueling unit 310 as further detailed herein.

Returning to FIG. 19, in some cases, maneuvering instructions module 1820 can be configured to provide the maneuvering instructions for enabling positioning of the receiver aircraft 20 within an engagement area, for example by utilizing a signaling system. Such signaling system can be mounted, for example, on the tanker aircraft 12, at any location visible to the receiver aircraft 20 pilot. In some cases, the signaling system can provide the receiver aircraft 20 pilot with maneuvering instructions on three axes: forward-backward, left-right and up-down, thus enabling it to maneuver the receiver aircraft 20 to the engagement area 2410. In some cases the signaling system can be a light directing system. Alternatively or additionally, the maneuvering instructions can be provided to by using voice commands (e.g. by utilizing speakers, pilot headset, etc.) or by any other means known per se. In some cases, maneuvering instructions module 1820 can be configured to communicate the maneuvering instructions to an auto pilot system of the receiver aircraft 20, if such system exists, for causing the auto pilot system to maneuver the receiver aircraft 20 accordingly.

Figure 25:
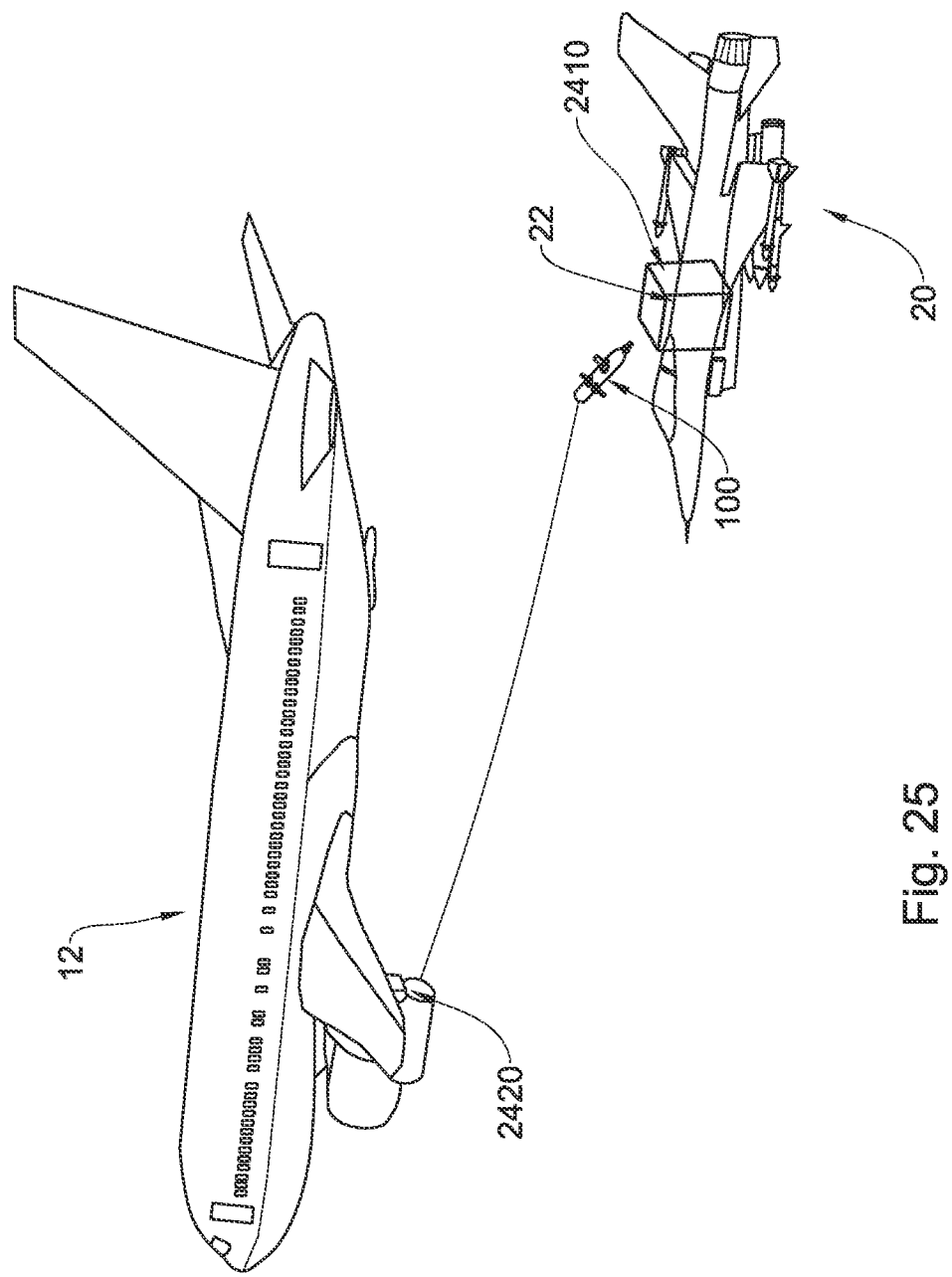
FIG. 25 is an illustration of an example of a receiver aircraft positioned inside a virtual engagement area, according to certain examples of the presently disclosed subject matter.

Before moving on to describe FIG. 19, and for the purpose of providing a visual illustration of an exemplary engagement area, attention is drawn to FIG. 25, showing an illustration of an example of a receiver aircraft positioned inside a virtual engagement area, according to certain examples of the presently disclosed subject matter. It can be noted that the receiver aircraft 20, and more particularly the fuel receptacle 22 thereof, are positioned within the engagement area 2410. Also in this illustration the engagement area 2410 is a virtual pre-determined volume, shaped substantially like a cube, in which, when a non-aircraft-fixed in-flight refueling system is used, the refueling device 100 can navigate until arriving at an engagement enabling position (in which the boom member 130 when a non-aircraft-fixed in-flight refueling system is used or the boom fueling unit 310 (or nozzle 316 thereof) when utilizing an aircraft-fixed flying boom system, is in a predetermined maximal spaced and spatial relationship with respect to the fuel receptacle 22 of the receiver aircraft 20) and engaging with the fuel receptacle 22 of the receiver aircraft 20, as detailed herein.

Although also in this example the virtual engagement area is shaped substantially like a cube, the virtual engagement area can have any other shape with a certain volume. It can be noted that the illustration further illustrates an example of a signaling system 2420 mounted on tanker aircraft 12. It can be appreciated that such a signaling system can be used by maneuvering instructions module 1820 for providing maneuvering instructions to the pilot of the receiver aircraft 20. It is to be noted that alternative and/or additional signaling systems can be used. The illustration of FIG. 25 is provided for clarity of explanation only and is by no means binding.

Bearing all this in mind, and returning to FIG. 19, it is to be noted that block 1910 can be performed repeatedly (e.g. every pre-determined period) or continuously, at least until the nozzle 135 or nozzle 316 is engaged with the fuel receptacle 22 of the receiver aircraft 20, as further detailed herein. Thus, while the receiver aircraft 20 is not positioned within the engagement area, maneuvering instructions module 1820 provides the pilot of the receiver aircraft 20 (and, in some cases, an auto pilot system that controls the maneuvering of the receiver aircraft 20) with maneuvering instructions for positioning the receiver aircraft 20 within an engagement area.

Although the process above (referring to block 1910) was described with respect to maneuvering of the receiver aircraft 20, it is to be noted that in some cases, in addition or as an alternative to maneuvering of the receiver aircraft 20 for approaching the refueling device 100 or the boom fueling unit 310, the tanker aircraft 12 can approach the receiver aircraft 20, thus bringing the refueling device 100 or the boom fueling unit 310 in the direction of the receiver aircraft 20. In such cases, the maneuvering instructions can be additionally or alternatively provided to the pilot of the tanker aircraft 12 mutatis mutandis.

It is to be further noted that the process relating to block 1910 can in some cases be an independent process, and in other cases it can be performed as part of a sequence of processes, such as engagement sequence 1905.

Figure 23:
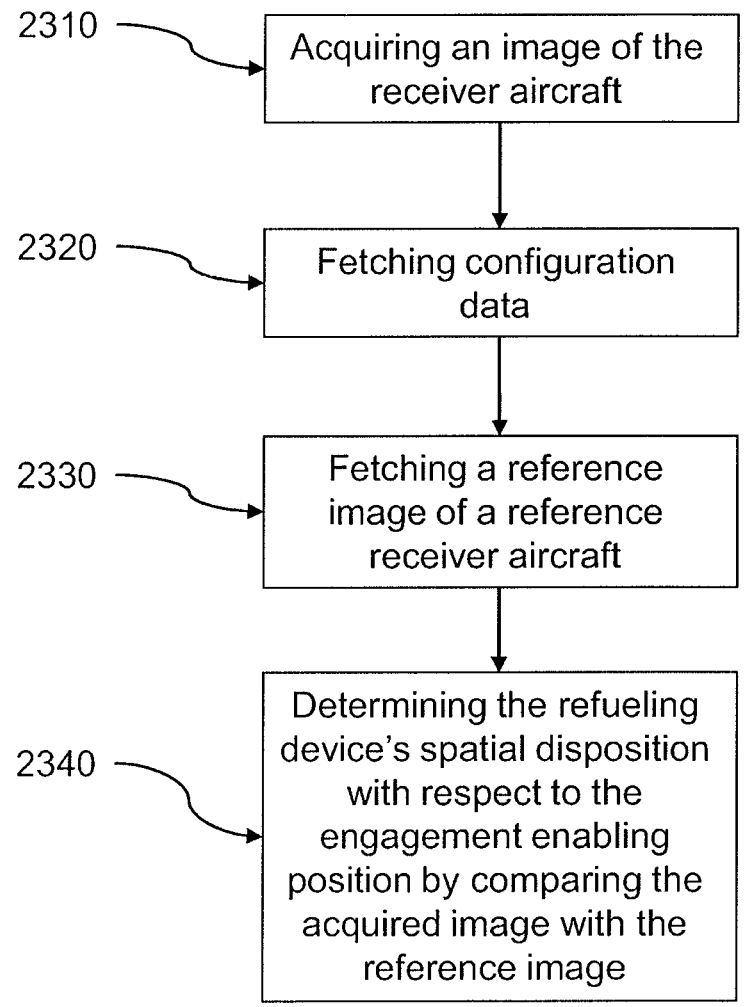
FIG. 23 is a flowchart illustrating a sequence of operations carried out for determining the refueling device spatial disposition with respect to the engagement enabling position, according to certain examples of the presently disclosed subject matter.

Turning now to block 1920 in FIG. 19, in some cases, when a non-aircraft-fixed in-flight refueling system is used, once an engagement area specification condition is met (e.g. it is determined that the receiver aircraft 20 is positioned within the engagement area), steering control module 1830 can be configured to provide commands for causing the steering of the refueling device 100 to an engagement enabling position, in which the boom member 130 is in a predetermined maximal spaced and spatial relationship with respect to the fuel receptacle 22 of the receiver aircraft 20 (block 1920), as further detailed herein, inter alia with respect to FIGS. 21 and 23.

In some cases, the steering commands module 1830 can be operatively connected to the spatial control system 160 and/or to the force generating arrangement 190 of the refueling device 100. In such cases, the steering commands module 1830 can provide steering commands for controlling the spatial control system 160 and/or to the force generating arrangement 190 and thus enabling steering the refueling device 100 to an engagement enabling position, in which the boom member 130 is in a predetermined maximal spaced and spatial relationship with respect to the fuel receptacle 22 of the receiver aircraft 20.

In some cases, the steering commands can be based, inter alia, on characteristics of the spatial control system 160. Such characteristics can be, for example, operation parameters of reaction control thrusters associated with the refueling device and capable of steering the refueling device 100 and/or operation parameters of aero-dynamic control surfaces of the refueling device 100.

In some cases, based on the steering commands from the steering commands module 1830, the refueling device 100 can be adapted to steer automatically. In particular, in some cases, using the commands, autonomous steering of the refueling device 100 can be achieved (e.g. when all the necessary components are fitted within the refueling device 100).

Thus, in accordance with some examples of the presently disclosed subject matter, there can be provided a refueling device 100 which can bring itself automatically, and in some cases (when all the necessary components are fitted within the refueling device 100) autonomously, into fluid communication with the fuel receptacle 22 of the receiver aircraft 20. In further examples, there can be provided a refueling device which can automatically, and in some cases (when all the necessary components are fitted within the refueling device 100) autonomously, align its boom axis 131 with a fuel receptacle 22 of the receiver aircraft 20, and move the boom member 130 in a predetermined trajectory towards the receiver aircraft 20 and thus enable the refueling device 100 to automatically bring itself into engagement with the fuel receptacle 22 of the receiver aircraft 20.

It is to be noted that block 1920 can be performed repeatedly (e.g. every pre-determined period) or continuously. For example, block 1920 can be performed until engagement of the nozzle 135 to the fuel receptacle 22 of the receiver aircraft 20, as further detailed herein, and in some cases even after such engagement. While the refueling device 100 is not positioned within an engagement enabling position, steering control module 1830 provides the refueling device 100 with steering commands for maneuvering the refueling device 100 to the engagement enabling position, in which the boom member 130 is in a predetermined maximal spaced and spatial relationship with respect to the fuel receptacle 22 of the receiver aircraft 20.

According to some examples of the examples of the presently disclosed subject matter, when utilizing an aircraft-fixed flying boom system, once an engagement area specification condition is met (e.g. it is determined that the receiver aircraft 20 is positioned within the engagement area), steering control module 1830 can be configured to provide commands for aligning the boom fueling unit 310 in an engagement enabling position, in which the boom member 311 is in a predetermined maximal spaced and spatial relationship with respect to the fuel receptacle 22 of the receiver aircraft 20.

In some cases, the steering commands module 1830 can be operatively connected to the mechanical connection 320 and/or a motion control system 330 and/or to the telescoping aft section 314 of the boom fueling unit 310. In such cases, the steering commands module 1830 can provide alignment commands for controlling a mechanical connection 320 and/or a motion control system 330 and/or to a telescoping aft section 314 of the boom fueling unit 310 and thus enabling aligning the refueling device 100 at an engagement enabling position, in which the boom fueling unit 310 is in a predetermined maximal spaced and spatial relationship with respect to the fuel receptacle 22 of the receiver aircraft 20. It is to be noted that the alignment commands can result in motion of the aircraft-fixed flying boom system in three degrees of freedom (e.g. pitch, yaw and translation).

In some cases, the alignment commands can be based, inter alia, on characteristics of the mechanical connection 320 and/or the motion control system 330 and/or the telescoping aft section 314 of the boom fueling unit 310.

In some cases, based on the alignment commands from the steering commands module 1830, the boom fueling unit 310 can be adapted to align itself automatically. In particular, in some cases, using the commands, autonomous aligning of the boom fueling unit 310 can be achieved (e.g. when all the necessary components are fitted within the boom fueling unit 310).

Thus, in accordance with some examples of the presently disclosed subject matter, there can be provided a boom fueling unit 310 which can bring itself automatically, and in some cases (when all the necessary components are fitted within the boom fueling unit 310) autonomously, into fluid communication with the fuel receptacle 22 of the receiver aircraft 20. In further examples, there can be provided a boom fueling unit 310 which can automatically, and in some cases (when all the necessary components are fitted within the boom fueling unit 310) autonomously, align itself with a fuel receptacle 22 of the receiver aircraft 20, and move itself in a predetermined trajectory towards the receiver aircraft 20 and thus enable the boom fueling unit 310 to automatically bring itself into engagement with the fuel receptacle 22 of the receiver aircraft 20.

It is to be noted that block 1920 can be performed repeatedly (e.g. every pre-determined period) or continuously. For example, block 1920 can be performed until engagement of the boom fueling unit 310 to the fuel receptacle 22 of the receiver aircraft 20, as further detailed herein, and in some cases even after such engagement. While the boom fueling unit 310 is not positioned within an engagement enabling position, steering control module 1830 provides the boom fueling unit 310 with alignment commands for maneuvering the boom fueling unit 310 to the engagement enabling position, in which it is in a predetermined maximal spaced and spatial relationship with respect to the fuel receptacle 22 of the receiver aircraft 20.

It is to be further noted that the process relating to block 1920 can in some cases be an independent process, and in other cases it can be performed as part of a sequence of processes, such as engagement sequence 1905.

Attention is now drawn to block 1930 in FIG. 19. In some cases, when a non-aircraft-fixed in-flight refueling system is used, once the receiver aircraft 20 is positioned within the engagement area and the refueling device 100 is positioned in an engagement enabling position (in which the boom member 130 is in a predetermined maximal spaced and spatial relationship with respect to the fuel receptacle 22 of the receiver aircraft 20), the engagement/disengagement control module 1850 can be configured to provide the refueling device 100 with an engagement command for causing the refueling device 100 to engage to the fuel receptacle 22 of the receiver aircraft 20 for enabling refueling of the receiver aircraft 20 (block 1930). It is to be noted that at the engagement enabling position the nozzle 135 is properly aligned with the fuel receptacle 22 (the boom member 130 and boom axis 131 being at the design angle $\theta_{des}$ to the forward direction A) and sufficiently close thereto, i.e., at a predetermined spacing from the receiver aircraft, said boom axis being aligned in an engagement enabling orientation at said spaced position.

In some cases, the engagement command can cause activation of the force generating arrangement 190, e.g., by deploying the air brakes 195, 196, thus generating a force along boom axis 131 that effectively pushes the nozzle 135 into engagement with the fuel receptacle 22 of the receiver aircraft 20. Such force can cause the boom member 130 to move in a predetermined trajectory towards the receiver aircraft 20 for enabling engagement between the nozzle 135 and the fuel receptacle 22 of the receiver aircraft 20 (e.g. for enabling fuel communication therebetween). In some cases, prior to deploying the air brakes 195, 196, the boom member 130 can be extended, for example until reaching a predetermined space from the fuel receptacle 22 of the receiver aircraft 20. In some cases, the engagement command can cause extension of the boom member 130 until connection with the fuel receptacle 22 of the receiver aircraft 20, with no use of any air brakes mechanism. In other words, once the refueling device 100 is at the aforesaid engagement enabling orientation and spaced position, the boom member is subsequently moved along said boom axis towards the receiver aircraft for enabling fuel communication therebetween. Movement of the boom member can be effected in one of two ways, or combination thereof: the refueling device 100 remains in the spaced position, and the boom member 130 is extended telescopically; the boom member 130 can be in the retracted or extended position, and the refueling device 100 is bodily moved towards the receiver aircraft for enabling fuel communication therebetween.

In accordance with some examples of the presently disclosed subject matter, there can be provided a refueling device 100 which can bring itself automatically, and in some cases (when all the necessary components are fitted within the refueling device 100) autonomously, into fluid communication with the fuel receptacle 22 of the receiver aircraft 20. In further examples, there can be provided a refueling device 100 which can automatically, and in some cases (when all the necessary components are fitted within the refueling device 100) autonomously, engage the nozzle 135 with the fuel receptacle 22 of the receiver aircraft 20.

In some cases, prior to providing the refueling device 100 with an engagement command, maneuvering instructions module 1820 can be configured to cause a signaling system to provide the pilot of the receiver aircraft 20 with a notification indicating that the refueling device 100 is about to engage to the fuel receptacle 22, thus requiring the pilot of the receiver aircraft 20 to stabilize it.

According to some examples of the examples of the presently disclosed subject matter, when utilizing an aircraft-fixed flying boom system, once the receiver aircraft 20 is positioned within the engagement area and the boom fueling unit 310 is positioned in an engagement enabling position (in which it is in a predetermined maximal spaced and spatial relationship with respect to the fuel receptacle 22 of the receiver aircraft 20), the engagement/disengagement control module 1850 can be configured to provide the boom fueling unit 310 with an engagement command for causing the boom fueling unit 310 to engage to the fuel receptacle 22 of the receiver aircraft 20 for enabling refueling of the receiver aircraft 20. It is to be noted that at the engagement enabling position the boom member 312 is aligned such that the nozzle tip is sufficiently close to the fuel receptacle 22 of the receiver aircraft 20, i.e., at a predetermined spacing from the fuel receptacle 22 of the receiver aircraft 20, said boom axis 311 being aligned in an engagement enabling orientation at said spaced position.

In some cases, the engagement command can cause extension of the telescoping aft section 314 thus applying force on the fuel receptacle 22 due to reaction force on the other side of the boom fueling unit 310, at the mechanical connection 320.

In accordance with some examples of the presently disclosed subject matter, there can be provided a boom fueling unit 310 which can bring itself automatically, and in some cases (when all the necessary components are fitted within the boom fueling unit 310) autonomously, into fluid communication with the fuel receptacle 22 of the receiver aircraft 20. In further examples, there can be provided a boom fueling unit 310 which can automatically, and in some cases (when all the necessary components are fitted within the boom fueling unit 310) autonomously, engage the nozzle 316 with the fuel receptacle 22 of the receiver aircraft 20.

In some cases, prior to providing the boom fueling unit 310 with an engagement command, maneuvering instructions module 1820 can be configured to cause a signaling system to provide the pilot of the receiver aircraft 20 with a notification indicating that the boom fueling unit 310 is about to engage to the fuel receptacle 22, thus requiring the pilot of the receiver aircraft 20 to stabilize it.

It is to be further noted that the process relating to block 1930 can in some cases be an independent process, and in other cases it can be performed as part of a sequence of processes, such as engagement sequence 1905.

Attention is now drawn to Block 1940 in FIG. 19. In some cases, following engagement sequence 1905, the system 1805 can be configured to provide a command to the refueling device 100 to perform refueling of the receiver aircraft 20 by pumping fuel to the receiver aircraft 20 from the tanker aircraft 12 (block 1940). In some cases, when a non-aircraft-fixed in-flight refueling system is used, at any time following engagement sequence 1905, the system 1805 can be further configured to deactivate the force generating arrangement 190, e.g. by retracting the air brakes 195, 196. In one example, the command to deactivate the force generating arrangement 190 and the refueling command can be issued by the engagement/disengagement module 1850. Further by way of example, engagement/disengagement module 1850 can be configured to provide a deactivation command when an indication is received that the refueling device 100 is engaged with the receiver aircraft 20. Further by way of example, the refueling command can be issued for example when an engagement indication is issued.

Attention is now drawn to Block 1950 in FIG. 19. the engagement/disengagement control module 1850 can be further configured to provide the refueling device 100 (when a non-aircraft-fixed in-flight refueling system is used) or the boom fueling unit 310 (when utilizing an aircraft-fixed flying boom system) with a disengagement command for causing it to disengage from the fuel receptacle 22 of the receiver aircraft 20 in response to receiving an indication that the fuel level in the fuel tank of the receiver aircraft 20 reached a desired level or when an indication of a hazard is issued (block 1950).

In some cases, prior to providing the refueling device 100 (when a non-aircraft-fixed in-flight refueling system is used) or the boom fueling unit 310 (when utilizing an aircraft-fixed flying boom system) with a disengagement command, maneuvering instructions module 1820 can be configured to cause the signaling system to provide the pilot of the receiver aircraft 20 with a notification indicating that the refueling is done, and in some cases instruct the pilot of the receiver aircraft 20 to perform a maneuver in order to fly away from the refueling device 100.

It is to be noted that throughout the refueling process, safety module 1840 can monitor certain parameters, for example parameters that relate to the spatial dispositions between any two or more of the following: the receiver aircraft 20, the refueling device 100 (when a non-aircraft-fixed in-flight refueling system is used) the boom fueling unit 310 (when utilizing an aircraft-fixed flying boom system) and the tanker aircraft 12, as well as other parameters including the angles, etc., possibly in comparison to predefined reference thresholds or parameters or ranges, to identify possible hazardous situations. Such hazardous situations can include, inter alia, a dangerous approach of the receiver aircraft 20 to the refueling device 100 or to the tanker aircraft 12, a dangerous movement of the receiver aircraft 20, and/or the refueling device 100 (when a non-aircraft-fixed in-flight refueling system is used) and/or the boom fueling unit 310 (when utilizing an aircraft-fixed flying boom system) and/or the tanker aircraft 12, including such movement when the refueling device 100 or the boom fueling unit 310 is engaged to the receiver aircraft 20, etc. It is to be noted that such hazardous situations can be caused for example due to a human error, environmental conditions (weather, wind, etc.), as well as other causes. It is to be further noted that for monitoring such hazardous situations, safety module 1840 can be configured to utilize, inter alia, sensor control module 1810 for sensing the spatial dispositions of the receiver aircraft 20, and/or the refueling device 100 and/or the boom fueling unit 310 and/or the tanker aircraft 12.

In some cases, when safety module 1840 identifies a hazardous situation (e.g. a safety condition is met or, in some cases, is not met), it can be configured, inter alia, to instruct steering control module 1830 to provide steering instructions for causing the refueling device 100 to steer away from the receiver aircraft 20 (when a non-aircraft-fixed in-flight refueling system is used) or to provide commands for maneuvering the boom fueling unit 310 away from the receiver aircraft 20, and/or to provide an indication to the pilot of the receiver aircraft 20 that a hazardous situation has been identified, thus enabling the pilot to maneuver the receiver aircraft 20 away from danger, etc. It is to be noted that in case the hazardous situation is identified after the refueling device 100 (when a non-aircraft-fixed in-flight refueling system is used) or the boom fueling unit 310 (when utilizing an aircraft-fixed flying boom system) engaged with the receiver aircraft 20, safety module 1840 can be further configured to instruct engagement/disengagement module 1850 to cause the refueling device 100 or the boom fueling unit 310 to disengage from the receiver aircraft 20 prior to performing the maneuvering as detailed herein.

It is to be noted that in some cases, when the receiver aircraft 20 is positioned within the engagement area, or at an earlier stage, the refueling device 100 (when a non-aircraft-fixed in-flight refueling system is used) and/or the boom fueling unit 310 (when utilizing an aircraft-fixed flying boom system) can be deployed to an initial trail position. Such initial trail position can be defined in terms of a spatial disposition with respect to the tanker aircraft 12 and can be characterized, inter alia, by one or more of the following:

When a non-aircraft-fixed in-flight refueling system is used—a required deployment length of the hose 52 (that in some cases can depend, inter alia, on the flight speed, the flight altitude, the receiver aircraft 20 type, the engagement area specification, etc., whereas in other cases it can be for example pre-determined) or, when utilizing an aircraft-fixed flying boom system, the extension length of the telescoping aft section 314;

A required pitch angle between the boom axis 131 or boom axis 311 and the forward direction A is maintained;

A required yaw angle between the boom axis 131 or boom axis 311 and the forward direction A is maintained.

In some cases, the steering control module 1830 can be configured to monitor the spatial disposition of the refueling device 100 and/or the boom fueling unit 310 with respect to the tanker aircraft 12 and validate that the refueling device 100 and/or the boom fueling unit 310 is positioned in the initial trail position with respect to the tanker aircraft 12. For that purpose, steering control module 1830 can utilize, for example, sensor control module 1810 for repeatedly, and in some cases in real time (for example in the form of a video stream) acquiring an image of the area in which the refueling device 100 and/or the boom fueling unit 310 is expected to be positioned when in the initial trail position. The image can be acquired by a sensor 1890 that can be mounted, for example, on the tanker aircraft 12 in a position that enables it to acquire images of the area in which the refueling device 100 and/or the boom fueling unit 310 is expected to be positioned when in the initial trail position. Such sensor position can be, for example, on the tanker aircraft 12 wing, elevators, tail, on the underside of the fuselage, etc. Utilization of such an image can enable determination of the refueling device's 100 and/or the boom fueling unit 310 spatial disposition with respect to the tanker aircraft 12 (it is to be noted that in some cases such determination is made, for example, repeatedly). For example, the acquired image can be compared with a pre-stored image (e.g. stored on reference data repository 1870) of the refueling device 100 and/or the boom fueling unit 310, illustrating a desired spatial disposition with respect to the tanker aircraft 12, thus enabling determination of the relative spatial disposition of the refueling device 100 and/or the boom fueling unit 310 with respect to the tanker aircraft 12 (it is to be noted that in some cases such determination is made, for example, repeatedly). Such desired spatial disposition can, in some cases, depend on various factors, such as, inter alia, the flight speed, the flight altitude, the refueling device 100 weight, etc. It can be appreciated that pre-stored images of different spatial dispositions of the refueling device 100 and/or the boom fueling unit 310 with respect to the tanker aircraft 12 can be stored in reference DR 1870 and a set of parameters, inter alia, flight speed, flight altitude, refueling device 100 weight, etc., can be specified in association with one or more of the pre-stored images.

According to examples of the presently disclosed subject matter, for a given set of parameters, steering control module 1830 can determine which image is to be used as a reference image. For example, the steering control module 1830 can receive a set of measurements which are correlated with the parameters associated with the images and can compare the current measurements to the various sets of parameters and identify which set is, for example, most closely correlated with the measurements and the steering control module 1830 can select the image with which the parameters are associated as the reference image. Following the selection of the reference image, the steering control module 1830 can repeatedly (e.g. every pre-determined period), or continuously, compare images obtained by the sensor 1890 during the refueling process to the selected reference image, and calculate the spatial disposition of the refueling device 100 with respect to the initial trail position.

In some cases, 3-D models can be used instead of images. According to further examples, the reference DR 1870 can store one or more generic 3-D models (e.g. one for each type of aircraft), and as part of determining the spatial disposition of the refueling device 100 and/or the boom fueling unit 310 with respect to the tanker aircraft 12, an appropriate 3-D model can be selected (for example according to the type of the receiver aircraft 20) and the 3-D model can be adapted using current measurements (e.g. obtained by the sensor 1890) and respective parameters of the 3-D model.

According to other examples of the presently disclosed subject matter, steering control module 1830 can search among the different pre stored reference images for an image which most closely correlates with a current image and can determine the spatial disposition using the pre-stored parameters associated with the selected image.

In some cases, the sensor 1890 can be a LIDAR unit 351. In such cases, the sensor can acquire the images as further detailed herein, inter alia with reference to FIGS. 30-32. The images obtained by the LIDAR unit 351 can comprise both depth data and electromagnetic data within the sensing volume 359. In such cases, the depth and electromagnetic data can be compared with look up tables comprising reference depth data and reference electromagnetic data relating to reference spatial dispositions with respect to the receiver aircraft 20 and/or the boom fueling unit 310, optionally based on the type of the receiver aircraft 20 (e.g. F-15, F-16, etc.) and/or the type of the boom fueling unit 310. Based on the comparison, the spatial disposition of the refueling device 100 or the boom fueling unit 310 with respect to the tanker aircraft 12 and/or to the fuel receptacle 22 of the receiver aircraft 20 can be calculated. In some cases, a full or partial 3-D model of the refueling device 100 and/or the boom fueling unit 310 can be calculated based on the depth and electromagnetic data received from the LIDAR unit 351 and such full or partial 3-D model can be compared with one or more pre-stored generic full or partial 3-D models (e.g. one for each type of aircraft and/or one for each type of boom fueling unit). Based on the comparison, the spatial disposition of the refueling device 100 or the boom fueling unit 310 with respect to the tanker aircraft 12 and/or to the fuel receptacle 22 of the receiver aircraft 20 can be calculated. The look up tables and/or the 3-D models can be stored for example on the reference DR 1870.

It is to be noted that various other methods and techniques can be used in order to determine the refueling device's 100 and/or the boom fueling unit 310 spatial disposition with respect to the tanker aircraft 12 and/or to the fuel receptacle 22 of the receiver aircraft 20 (it is to be noted that in some cases such determination is made, for example, repeatedly).

It is to be noted that, with reference to FIG. 19, some of the blocks can be integrated into a consolidated block or can be broken down to a few blocks and/or other blocks may be added. Furthermore, in some cases, the blocks can be performed in a different order than described herein. It should be also noted that whilst the flow diagrams are described also with reference to the system elements that realizes them, this is by no means binding, and the blocks can be performed by elements other than those described herein.

Turning to FIG. 20, there is shown a flowchart illustrating a sequence of operations carried out for providing maneuvering commands for positioning a receiver aircraft within an engagement area related thereto, according to certain examples of the presently disclosed subject matter. Maneuvering instructions module 1820 can be configured to determine (it is to be noted that in some cases, as indicated herein, such determination is made, for example, repeatedly) the receiver aircraft's 20 spatial disposition with respect to the engagement area related thereto (block 2005), as further detailed with respect to FIG. 22.

Following determination of the receiver aircraft's 20 spatial disposition with respect to the engagement area related thereto, maneuvering instructions module 1820 can be configured to check if the receiver aircraft 20 is positioned within the engagement area (block 2010), based for example on current measurements from sensor/s 1890 as described herein. In some examples, in case the receiver aircraft 20 is positioned within the engagement area, and until the refueling device 100 is engaged with the fuel receptacle 22 of the receiver aircraft 20 (in some cases this process can continue until the refueling process ends), the maneuvering instructions module 1820 can be configured to return to block 2005 and re-determine the receiver aircraft's 20 spatial disposition with respect to the engagement area related thereto.

In some examples, in case the receiver aircraft 20 is not positioned within the engagement area, maneuvering instructions module 1820 can be configured to calculate maneuvering instructions for positioning the receiver aircraft 20 within the engagement area (block 2020). It can be appreciated that once the maneuvering instructions module 1820 determines the receiver aircraft's 20 spatial disposition with respect to the engagement area related thereto, it can also calculate maneuvering instructions for positioning the receiver aircraft 20 within the engagement area related thereto. Maneuvering instructions module 1820 can also provide the calculated maneuvering instructions for positioning the receiver aircraft 20 (and, in some cases, an auto pilot system that controls the maneuvering of the receiver aircraft 20) within the engagement area related thereto to the pilot of the receiver aircraft 20 (block 2030) and return to block 2005.

It is to be noted that, in some cases, as indicated herein, maneuvering instructions module 1820 can be configured to provide the maneuvering instructions by using a light directing system. Such light directing system can be mounted, for example, on the tanker aircraft 12, at any location visible to the receiver aircraft 20 pilot. In some cases, the light directing system can provide the pilot of the receiver aircraft 20 with maneuvering instructions on three axes: forward-backward, left-right and up-down, thus enabling it to maneuver the receiver aircraft 20 to the engagement area 2110.

Alternatively or additionally, the maneuvering instructions can be provided by using voice commands (e.g. by utilizing speakers, pilot headset, etc.) or by any other means known per se. In some cases, maneuvering instructions module 1820 can be configured to communicate the maneuvering instructions to an auto pilot system of the receiver aircraft 20, if such system exists.

It is to be noted that, with reference to FIG. 20, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

It is to be further noted that in some cases instead of monitoring that the receiver aircraft 20 is positioned within the engagement area, an alternative light directing system can be used. Such an alternative lighting system can be designed to display alternative light indications depending on the angle from which it is viewed. Thus, in some cases, viewing the light directing system from its bottom side can result in display of light in a certain color, looking at the same light directing system from its upper side can result in display of light in a second color, looking at the same light directing system from its right side can result in display of light in a third color, and looking at the same light directing system from its left side can result in display of light in a fourth color. Additional angles can result in display of additional colors. When using such a light directing system, upon arrival of the receiver aircraft 20 to the engagement area, the light directing system can be automatically directed to the receiver aircraft 20 (based on its current determined spatial disposition) and provide a color indication indicating that it is positioned within the engagement area. If the receiver aircraft 20 does not maintain its position, the pilot will receive appropriate color indications from the light directing system so that he will be able to make the required corrections to maintain the receiver aircraft's 20 spatial disposition.

Turning to FIG. 21, there is shown a flowchart illustrating a sequence of operations carried out for providing steering commands to a refueling device for maneuvering to an engagement enabling position, according to certain examples of the presently disclosed subject matter.

When a non-aircraft-fixed in-flight refueling system is used steering control module 1830 can be configured to determine (it is to be noted that in some cases, as indicated herein, such determination is made, for example, repeatedly) the refueling device's 100 spatial disposition with respect to the engagement enabling position (in which the boom member 130 is in a predetermined maximal spaced and spatial relationship with respect to the fuel receptacle 22 of the receiver aircraft 20) related thereto (block 2105), as further detailed with respect to FIG. 23.

Following determination of the refueling device's 100 spatial disposition with respect to the engagement enabling position related thereto, steering control module 1830 can be configured to check if the refueling device 100 is positioned within the engagement enabling position (block 2110). In case the refueling device 100 is positioned within the engagement enabling position (in which the boom member 130 is in a predetermined maximal spaced and spatial relationship with respect to the fuel receptacle 22 of the receiver aircraft 20), and at least until the refueling device 100 is engaged with the fuel receptacle 22 of the receiver aircraft 20 (in some cases this process can continue until the refueling process ends), the steering control module 1830 can be configured to return to block 2105 and re-determine the refueling device's 100 spatial disposition with respect to the engagement enabling position related thereto.

In case the refueling device 100 is not positioned within the engagement enabling position (in which the boom member 130 is in a predetermined maximal spaced and spatial relationship with respect to the fuel receptacle 22 of the receiver aircraft 20), steering control module 1830 can be configured to calculate steering commands for maneuvering the refueling device 100 to an engagement enabling position, in which the boom member 130 is in a predetermined maximal spaced and spatial relationship with respect to the fuel receptacle 22 of the receiver aircraft 20 (block 2120). It can be appreciated that once the steering control module 1830 determines the refueling device's 100 spatial disposition with respect to an engagement enabling position related thereto, it can also calculate steering commands for maneuvering the refueling device 100 to an engagement enabling position related thereto. Steering control module 1830 can also provide the refueling device 100 with calculated steering commands for maneuvering the refueling device 100 to an engagement enabling position related thereto (block 2130) and return to block 2105. The steering commands can control the operation of components of the spatial control system 160 and/or the force generating arrangement 190.

When utilizing an aircraft-fixed flying boom system, steering control module 1830 can be configured to determine (it is to be noted that in some cases, as indicated herein, such determination is made, for example, repeatedly) the boom fueling unit 310 spatial disposition with respect to the engagement enabling position (in which the boom member 312 is in a predetermined maximal spaced and spatial relationship with respect to the fuel receptacle 22 of the receiver aircraft 20) related thereto (block 2105), as further detailed with respect to FIG. 23.

Following determination of the boom fueling unit 310 spatial disposition with respect to the engagement enabling position related thereto, steering control module 1830 can be configured to check if the boom fueling unit 310 is positioned within the engagement enabling position (block 2110). In case the boom fueling unit 310 is positioned within the engagement enabling position (in which the boom member 312 is in a predetermined maximal spaced and spatial relationship with respect to the fuel receptacle 22 of the receiver aircraft 20), and at least until the boom fueling unit 310 is engaged with the fuel receptacle 22 of the receiver aircraft 20 (in some cases this process can continue until the refueling process ends), the steering control module 1830 can be configured to return to block 2105 and re-determine the boom fueling unit 310 spatial disposition with respect to the engagement enabling position related thereto.

In case the boom fueling unit 310 is not positioned within the engagement enabling position (in which the boom member 312 is in a predetermined maximal spaced and spatial relationship with respect to the fuel receptacle 22 of the receiver aircraft 20), steering control module 1830 can be configured to calculate alignment commands for maneuvering the boom fueling unit 310 to an engagement enabling position, in which the boom member 312 is in a predetermined maximal spaced and spatial relationship with respect to the fuel receptacle 22 of the receiver aircraft 20 (block 2120). It can be appreciated that once the steering control module 1830 determines the boom fueling unit 310 spatial disposition with respect to an engagement enabling position related thereto, it can also calculate alignment commands for maneuvering the boom fueling unit 310 to an engagement enabling position related thereto. Steering control module 1830 can also provide the boom fueling unit 310 with calculated alignment commands for maneuvering the boom fueling unit 310 to an engagement enabling position related thereto (block 2130) and return to block 2105. The alignment commands can control the operation of components of the motion control system 330 and/or the mechanical connection 320 and/or the telescoping aft section 314.

It is to be noted that, with reference to FIG. 21, some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realizes them, this is by no means binding, and the blocks can be performed by elements other than those described herein.

Turning to FIG. 22, there is provided a flowchart illustrating a sequence of operations carried out for determining the receiver aircraft's spatial disposition with respect to the engagement area related thereto, according to certain examples of the presently disclosed subject matter. In some cases, maneuvering instructions module 1820 can be configured to acquire an image of the receiver aircraft 20 (block 2210).

For that purpose, in some cases, maneuvering instructions module 1820 can be configured to utilize sensor control module 1810 for repeatedly (e.g. every pre-determined period) or continuously (e.g. in the form of a video stream) acquiring an image of the area aft the refueling device 100 and/or aft the tanker aircraft 12, at a predetermined Field of View. Such Field of View can depend, inter alia, on the distance from which a receiver aircraft 20 is to be identified. In some cases, the farther it is required to identify the receiver aircraft, the larger the Field of View is.

It is to be noted that although reference in the description is sometimes made to an image, any other data that can be indicative of presence of a receiver aircraft can be utilized mutatis mutandis (e.g. radar data, acoustic signature data, etc.). It is to be further noted that in some cases, when reference is made to an image (throughout the description) it can also include an image based on data acquired by the LIDAR unit 351.

For the purpose of acquiring an image, sensor control module 1810 can be configured to utilize sensor 1890. In some cases, one or more sensor/s 1890 can be mounted on the refueling device 100 and/or on the tanker aircraft 12. As indicated herein, in some cases the imaging system 150 can be used as one or more of the sensor/s 1890. It is to be noted that, as indicated herein, the imaging system 150 can, in some cases, comprise one or more FLADAR units and/or one or more LIDAR units 351.

It can be appreciated that for acquiring an image of the receiver aircraft 100, the receiver aircraft 100 should be present in the sensed area (e.g. the sensing volume 159 or the sensing volume 359). In some cases the receiver aircraft 20 is expected to approach the refueling device 100 and/or the boom fueling unit 310 and/or the fuel tanker 12 for the refueling process to begin. In some cases, the approach of receiver aircraft 20 to the refueling device 100 and/or the boom fueling unit 310 is made from a certain direction or through a virtual funnel such as, for example, from the rear and bottom side of the refueling device 100 and/or the boom fueling unit 310 and/or the fuel tanker 12 while the pilot of the receiver aircraft 20 has a line of sight to the refueling device 100 and/or the boom fueling unit 310 and/or the fuel tanker 12. However, in other cases, other directions of approach are also possible (e.g. approach from the front and bottom side of the refueling device 100 and/or the boom fueling unit 310 and/or the fuel tanker 12, etc.), depending, inter alia, on the characteristics of the receiver aircraft 20 (e.g. the location of the fuel receptacle 22 of the receiver aircraft 20, etc.).

In some cases, maneuvering instructions module 1820 can be configured to analyze sensed images in order to determine if a receiver aircraft 20 can be identified within the sensed image. It is to be noted that such analysis can be performed using various known methods and techniques, such as, in the case of digital images—image correlation, in the case of LIDAR based images—comparison with look-up tables comprising reference depth data and reference electromagnetic data relating to reference spatial dispositions with respect to the receiver aircraft, optionally based on the type of the receiver aircraft 20 (e.g. F-15, F-16, etc.), etc.

In some cases, maneuvering instructions module 1820 can be configured to cause the signaling system to provide the pilot of the receiver aircraft 20 with a notification indicating that its location with respect to the engagement area has been acquired. Such indication can be provided, for example, by a signaling system (e.g. a lighting system mounted on the refueling device 100 and/or the boom fueling unit 310 and/or on the tanker aircraft 12, etc.). Additionally or alternatively, the indication can be a voice indication provided to the pilot of the receiver aircraft 20 (e.g. by utilizing speakers, pilot headset, etc.). Additionally or alternatively, the indication can be any other indication (including visual or voice indication) provided to the pilot of the receiver aircraft 20 (e.g. by utilizing speakers, pilot headset, a display, a light, etc.).

In some cases, maneuvering instructions module 1820 can be further configured to fetch configuration data (block 2220), including, inter alia, data indicative of the engagement area specification. As detailed herein, the engagement area can be defined by various specifications that depend on several parameters, such as, for example, the length of the hose 52 (when a non-aircraft-fixed in-flight refueling system is used), the extension length of the telescoping aft section 314 (when utilizing an aircraft-fixed flying boom system), the flight speed, the flight altitude, weather conditions, the fuel pressure within the hose 52 (when a non-aircraft-fixed in-flight refueling system is used), the location of the fuel receptacle 22 of the receiver aircraft 20, etc.

In some cases, maneuvering instructions module 1820 can be further configured to fetch a reference image of a reference receiver aircraft (block 2230). In some cases the reference image is fetched inter alia according to the fetched configuration data and/or the type of the receiver aircraft 20 (e.g. F-15, F-16, etc.). Such a reference image can be an image of an aircraft similar to the actual receiver aircraft 20, and in some cases of identical type as the actual receiver aircraft 20. If necessary, the maneuvering instructions module 1820 can obtain current measurements for certain parameters in the configuration DR 1860, to compute appropriate engagement area specifications.

It is to be noted that such a reference image should depict a scene in which the reference aircraft is positioned within the engagement area having the fetched specification (fetched in block 2220). In some cases, the reference image can depict a scene in which the reference aircraft is not positioned within the engagement area having the fetched specification, however the offset of the reference receiver aircraft from the engagement area can be calculated or alternatively is a-priori known.

Maneuvering instructions module 1820 can be further configured to utilize the reference image of a reference receiver aircraft within the engagement area having the fetched specification (or not within such engagement area but with data of its offset from the engagement area) for calculating the relative spatial disposition of the receiver aircraft with respect to the engagement area (block 2240), for example using methods and techniques known per se (such as, in the case of digital images, image correlation, etc.).

In some cases, 3-D models can be used instead of images. According to further examples, the reference DR 1870 can store one or more generic 3-D models (e.g. one for each type of aircraft), and as part of determining the spatial disposition of the receiver aircraft 20 with respect to the engagement area, an appropriate 3-D model can be selected (for example according to the type of the receiver aircraft 20) and the 3-D model can be adapted using current measurements (e.g. obtained by the sensor 1890) and respective parameters of the 3-D model.

It is to be noted that various other methods and techniques can be used in order to determine the receiver aircraft's 20 spatial disposition with respect to the engagement area.

One example of such alternative technique is using LIDAR. In such cases, the sensor 1890 can be a LIDAR unit 351 that can acquire the images as further detailed herein, inter alia with reference to FIGS. 30-32. As indicated herein, the images obtained by the LIDAR unit 351 can comprise both depth data and electromagnetic data within the sensing volume 359. In such cases, the depth and electromagnetic data can be compared with one or more look-up tables comprising reference depth data and reference electromagnetic data relating to reference spatial dispositions with respect to the receiver aircraft, optionally based on the type of the receiver aircraft 20 (e.g. F-15, F-16, etc.). Based on the comparison, the spatial disposition of the refueling device 100 and/or the boom fueling unit 310 and/or the receiver aircraft 20 with respect to the tanker aircraft 12 can be calculated. In some cases, a full or partial 3-D model of the receiver aircraft 20 and/or the refueling device 100 and/or the boom fueling unit 310 can be calculated based on the depth and electromagnetic data received from the LIDAR unit 351 and such full or partial 3-D model can be compared with one or more pre-stored generic full or partial 3-D models (e.g. one for each type of aircraft). Based on the comparison, the spatial disposition of the refueling device 100 and/or the boom fueling unit 310 and/or the receiver aircraft 20 with respect to the tanker aircraft 12 can be calculated. The look up tables and/or the 3-D models can be stored for example on the reference DR 1870.

It is to be noted that, with reference to FIG. 22, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Turning to FIG. 23 there is provided a flowchart illustrating a sequence of operations carried out for determining the refueling device's 100 (or boom fueling unit 310) spatial disposition with respect to the engagement enabling position, according to certain examples of the presently disclosed subject matter. In some cases, steering control module 1830 can be configured to acquire an image of the receiver aircraft 20 (block 2310), and, in some cases, more specifically, of the area of the fuel receptacle 22 of the receiver aircraft 20.

For that purpose, in some cases, steering control module 1830 can be configured to utilize sensor control module 1810 for repeatedly (e.g. every pre-determined period) or continuously acquiring an image (it is to be noted again that although reference in the description is made to an image, any other data that can be indicative of presence of a receiver aircraft can be utilized mutatis mutandis. It is to be further noted that in some cases, when reference is made to an image it can also include an image based on data acquired by the LIDAR unit 351) of the area aft the refueling device 100 or boom fueling unit 310, at a predetermined Field of View. Such Field of View can depend, inter alia, on the distance from which a receiver aircraft 20, and more specifically a fuel receptacle 22 thereof, is to be identified. In some cases, the farther it is required to identify the receiver aircraft, and more specifically a fuel receptacle 22 thereof, the larger the Field of View is.

For the purpose of acquiring an image, sensor control module 1810 can be configured to utilize sensor 1890. In some cases, one or more sensor/s 1890 can be mounted on the refueling device 100 and/or the boom refueling unit 310 and/or on the tanker aircraft 12. As indicated herein, in some cases the imaging system 150 can be used as one or more of the sensor/s 1890. It is to be noted that, as indicated herein, the imaging system 150 can, in some cases, comprise one or more FLADAR units and/or one or more LIDAR units 351.

It can be appreciated that for acquiring an image of the receiver aircraft 20, and more specifically a fuel receptacle 22 thereof, the receiver aircraft 20, and more specifically a fuel receptacle 22 thereof, must be present in the sensed area (e.g. the sensing volume 159). In some cases, the receiver aircraft 20 is expected to be positioned within the engagement area related thereto.

In some cases steering control module 1830 can be configured to analyze a sensed image in order to determine if a receiver aircraft 20, and more specifically a fuel receptacle 22 thereof, can be identified within the sensed image. A series of images can be analyzed, each substantially immediately after it has been captured (for example as described herein), in order for the steering control module 1830 to be able to provide steering or alignment commands that are based on the actual (dynamic) relative position of the refueling device 100 and/or the boom fueling unit 310 and the engagement enabling position.

In some cases, 3-D models can be used instead of images. According to further examples, the reference DR 1870 can store one or more generic 3-D models (e.g. one for each type of aircraft), and as part of determining the spatial disposition of the refueling device 100 and/or the boom fueling unit 310 with respect to the engagement enabling position, an appropriate 3-D model can be selected (for example according to the type of the receiver aircraft 20) and the 3-D model can be adapted using current measurements (e.g. obtained by the sensor/s 1890) and respective parameters of the 3-D model.

It is to be noted that such analysis can be performed using various known methods and techniques, such as, in the case of digital images—image correlation, in the case of LIDAR based images—comparison with look-up tables comprising reference depth data and reference electromagnetic data relating to reference spatial dispositions with respect to the receiver aircraft, optionally based on the type of the receiver aircraft 20 (e.g. F-15, F-16, etc.), etc.

In some cases, steering control module 1830 can be further configured to fetch configuration data (block 2320), including, inter alia, data indicative of the engagement enabling position specification. As detailed herein, the engagement enabling position can be defined by a predetermined maximal spaced and spatial relationship with respect to the fuel receptacle 22 of the receiver aircraft 20. As further indicated herein, such configuration data can depend on several parameters, such as, for example, the length of the hose 52 (when a non-aircraft-fixed in-flight refueling system is used), the extension length of the telescoping aft section 314 (when utilizing an aircraft-fixed flying boom system), the flight speed, the flight altitude, weather conditions, the fuel pressure within the hose 52 (when a non-aircraft-fixed in-flight refueling system is used), the location of the fuel receptacle 22 of the receiver aircraft 20, etc. The configuration data is fetched according to current measurements and respective parameters stored in association with each set of configuration data.

In some cases, steering control module 1830 can be further configured to fetch a reference image of a reference receiver aircraft, and more specifically a fuel receptacle thereof (block 2330). In some cases the reference image is fetched inter alia according to the fetched configuration data (which, in turn, was fetched according to current measurements and respective parameters stored in association with each set of configuration data). Such a reference image can be an image of an aircraft, and more specifically a fuel receptacle thereof, similar, and in some cases identical to, the actual receiver aircraft 20, and more specifically, an actual fuel receptacle 22 of the actual receiver aircraft 20.

It is to be noted that such a reference image should depict a scene in which the reference aircraft, and more specifically a fuel receptacle thereof, is positioned within an engagement enabling position having the fetched specification (fetched in block 2320). In some cases, the reference image can depict a scene in which the reference aircraft, and more specifically a fuel receptacle thereof, is not positioned within the engagement enabling position having the fetched specification, however the offset of the reference receiver aircraft from the engagement enabling position can be calculated or alternatively is a-priori known.

In some cases, steering control module 1830 can be further configured to utilize the reference image of a reference receiver aircraft, and more specifically a fuel receptacle thereof, within the engagement area having the fetched specification (or not within such engagement area but with data of its offset from the engagement area) for calculating the relative spatial disposition of the receiver aircraft 20, and more specifically the fuel receptacle 22 thereof, with respect to an engagement enabling position (block 2340), for example using methods and techniques known per se (such as, in the case of digital images, image correlation, etc.).

In some cases, 3-D models can be used instead of images. According to further examples, the reference DR 1870 can store one or more generic 3-D models (e.g. one for each type of aircraft), and as part of determining the spatial disposition of the refueling device 100 with respect to engagement enabling position, an appropriate 3-D model can be selected (for example according to the type of the receiver aircraft 20) and the 3-D model can be adapted using current measurements (e.g. obtained by the sensor 1890) and respective parameters of the 3-D model.

It is to be noted that various other methods and techniques can be used in order to determine the refueling device 100 and/or the boom fueling unit 310 spatial disposition with respect to the engagement area.

One example of such alternative technique is using LIDAR. In such cases, the sensor 1890 can be a LIDAR unit 351 that can acquire the images as further detailed herein, inter alia with reference to FIG. 30-32. As indicated herein, the images obtained by the LIDAR unit 351 can comprise both depth data and electromagnetic data within the sensing volume 359. In such cases, the depth and electromagnetic data can be compared with one or more look-up tables comprising reference depth data and reference electromagnetic data relating to reference spatial dispositions with respect to the receiver aircraft, optionally based on the type of the receiver aircraft 20 (e.g. F-15, F-16, etc.). Based on the comparison, the spatial disposition of the refueling device 100 and/or the boom fueling unit 310 and/or the receiver aircraft 20 with respect to the tanker aircraft 12 can be calculated. In some cases, a full or partial 3-D model of the receiver aircraft 20 and/or the refueling device 100 and/or the boom fueling unit 310 can be calculated based on the depth and electromagnetic data received from the LIDAR unit 351 and such full or partial 3-D model can be compared with one or more pre-stored generic full or partial 3-D models (e.g. one for each type of aircraft). Based on the comparison, the spatial disposition of the refueling device 100 and/or the boom fueling unit 310 and/or the receiver aircraft 20 with respect to the tanker aircraft 12 can be calculated. The look up tables and/or the 3-D models can be stored for example on the reference DR 1870.

It is to be noted that, with reference to FIG. 23, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 28:
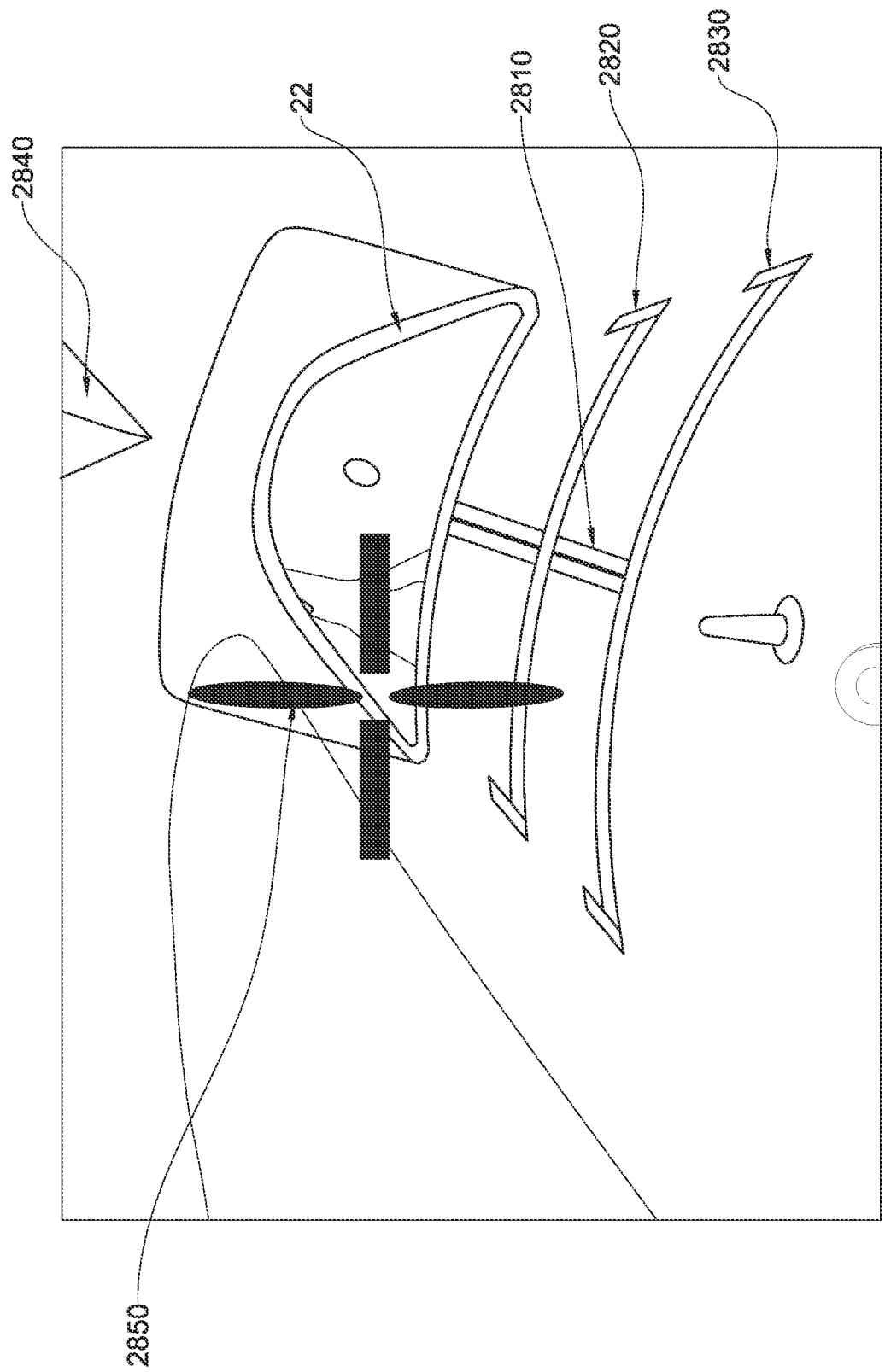
FIG. 28 is an illustration of an example of a sensed image indicating that the refueling device is not positioned in an engagement enabling position, according to certain examples of the presently disclosed subject matter.

Looking, by way of example, at FIG. 28, there is shown an illustration of an example of a sensed image indicating that the refueling device is not positioned in an engagement enabling position, according to certain examples of the presently disclosed subject matter. In some cases, the sensed image of the receiver aircraft 20, and more specifically a fuel receptacle 22 thereof, and the reference image of the reference receiver aircraft, and more specifically a fuel receptacle thereof, can contain some elements (e.g. 2810, 2820, 2830, 2840, etc.) that enable determination of the sensed image offset from the reference image (thereby enabling determination of the offset of the refueling device 100 or the boom fueling unit 310 from an engagement enabling position, in which the boom member 130 or boom member 312 is in a predetermined maximal spaced and spatial relationship with respect to the fuel receptacle 22 of the receiver aircraft 20). It is to be noted that virtual cross 2850 indicates the center of the image. Such elements (e.g. 2810, 2820, 2830, 2840) can be used for example by various known per se image correlation algorithms in order to determine the spatial disposition of the receiver aircraft 20, and more specifically the fuel receptacle 22 thereof, with respect to an engagement enabling position. The illustration of FIG. 28 is provided for clarity of explanation only and is by no means binding.

Attention is now drawn to FIG. 29, showing an illustration of an example of a reference image indicating that the refueling device is positioned in an engagement enabling position, according to certain examples of the presently disclosed subject matter. Looking at the illustration, it can be appreciated that the fuel receptacle of a receiver aircraft should be aligned with the cross 2850 (that indicates the center of the image) and that elements 2810, 2820, 2830, and 2840 should also be aligned with the cross 2850 vertical and horizontal axis, thus indicating that a refueling device is positioned in an engagement enabling position, in which the boom member 130 or boom member 312 is in a predetermined maximal spaced and spatial relationship with respect to the fuel receptacle 22 of the receiver aircraft 20. It can be appreciated that there is an offset between the sensed image shown in FIG. 28 and the reference image shown in FIG. 29, thus indicating that at the time the sensed image shown in FIG. 28 was sensed, the refueling device 100 or the boom fueling unit 310 was not in an engagement enabling position. The illustration of FIG. 29 is provided for clarity of explanation only and is by no means binding.

It has been indicated herein that when a non-aircraft-fixed in-flight refueling system is used the engagement enabling position is a position from which utilization of the force generating arrangement 190 enables the nozzle 135 to engage with the fuel receptacle 22 of the receiver aircraft 20. When utilizing an aircraft-fixed flying boom system, the engagement enabling position is a position from which the nozzle 316 is able to engage with the fuel receptacle 22 of the receiver aircraft 20. Therefore, in some cases, there can be more than one engagement enabling position that meets such criteria and thus, in some cases, a certain offset between the sensed image and the reference image can be allowed, as long as the refueling device is in a position from which, when a non-aircraft-fixed in-flight refueling system is used, utilization of the force generating arrangement 190 enables the nozzle 135 to engage with the fuel receptacle 22 of the receiver aircraft 20 or from which, when utilizing an aircraft-fixed flying boom system, the nozzle 316 is able to engage with the fuel receptacle 22 of the receiver aircraft 20.

It is to be noted that various other methods and techniques can be used in order to determine the receiver aircraft's 20 spatial disposition with respect to the engagement enabling position, including the known per se 3-D modeling adaptation and/or the selection of the reference image which provides the highest correlation to the sensed data.

Operation Mode II

In this operation mode, once the tanker aircraft 12 and receiver aircraft 20 are in close proximity and flying in formation, with the receiver aircraft 20 at a position behind the tanker aircraft 12, the refueling device is flown into engagement with the fuel receptacle 22 of the receiver aircraft 20 by an operator.

In a first example of Operation Mode II, the operator is stationed in the tanker aircraft 12, which comprises a suitable control station operatively connected to the refueling device, which can be refueling device 100 according to the first example or alternative variations thereof, or refueling device 200 according to the second example or alternative variations thereof, or a refueling device according to other suitable examples thereof according to the first aspect of the presently disclosed subject matter. The control station comprises a display device for suitably displaying data relating to the spatial disposition of the refueling device at least with respect to the receiver aircraft 20 and the fuel receptacle 22 thereof, and an output device for providing control signals to the refueling device for controlling the flight thereof.

For example, and referring to refueling device 100 according to the first example or alternative variations thereof, the display device can comprise a screen display that displays real time images (2D, and/or stereoscopic images, and/or 3D images), for example in video streams, provided by the imaging system 150. Additionally or alternatively, such imaging can be provided or augmented via suitable cameras or other imaging units, provided on the tanker aircraft 12 and/or the receiver aircraft 20 and/or any other suitable air vehicle in the vicinity of the refueling device 100, and thus in at least some such examples the refueling device 100 can omit the imaging system 150.

The output device can comprise, for example, a joystick that is hand-manipulated by the operator to provide the required control signals to the spatial control system 160, in particular the controllable aerodynamic surfaces thereof, to provide the required design angle $\theta_{des}$ between the boom axis 131 and the forward direction A, while flying the refueling device 100 into proximity with the receiver aircraft 20 and the fuel receptacle 22 thereof.

The operator first ensures that the refueling device 100 is being towed behind the tanker aircraft 12 at a suitable distance therefrom, and can control this spacing by extending or retracting the hose 52 with respect to the tanker aircraft 12.

When the operator determines that the nozzle 135 is properly aligned with the fuel receptacle 22 (the boom member 130 and boom axis 131 being at the design angle $\theta_{des}$ to the forward direction A) and sufficiently close thereto, i.e., at the engagement enabling position at a predetermined spacing from the receiver aircraft, said boom axis being aligned in an engagement enabling orientation at said spaced position, the operator provides a suitable control signal to the refueling device 100 to activate the force generating arrangement 190, i.e., by deploying the air brakes 195, 196, generating a force along boom axis 131 that effectively pushes the nozzle into engagement with the receptacle 22. In other words, once the refueling device 100 is at the aforesaid engagement enabling orientation and spaced position, the boom member is subsequently moved along said boom axis towards the receiver aircraft for enabling fuel communication therebetween. Movement of the boom member can be effected in one of two ways, or combination thereof: the refueling device 100 remains in the spaced position, and the boom member 130 is extended telescopically; the boom member 130 can be in the retracted or extended position, and the refueling device 100 is bodily moved towards the receiver aircraft for enabling fuel communication therebetween.

Thereafter, the air brakes 195, 196 are retracted, and fuel is pumped to the receiver aircraft 20 from the tanker aircraft 12. The refueling device 100 can be automatically or manually controlled to maintain the required design angle $\theta_{des}$ between then boom axis 131 and the forward direction A during refueling.

Once refueling is completed, the operator disengages the nozzle 135 from the fuel receptacle 22 and flies the refueling device 100 at least to a safe position away from the receiver aircraft 20, and/or the receiver aircraft 20 maneuvers to such a position, and the refueling device 100 can be retracted back into the tanker aircraft 12, or reused with another receiver aircraft 20.

It is to be noted that the same operator can carry out Operation Mode II with each of the plurality of refueling systems 50 of the tanker aircraft 12. Alternatively, the tanker aircraft 12 can comprise a dedicated control station operatively connected to each refueling device 100, and operated by a respective dedicated operator; thus different operators control each of the refueling devices 100.

In an alternative variation of this example of Operation Mode II, the operator is stationed in another aircraft different from the receiver aircraft 20 or tanker aircraft 12, or is located in a ground station, and Operation Mode II can be carried out in a similar; manner to that described above for the first example, mutatis mutandis, with the main difference that the operator receives the data relating to the spatial disposition of the refueling device at least with respect to the receiver aircraft 20 and the fuel receptacle 22 thereof, and provides control signals to the refueling device for controlling the flight thereof, via a suitable communications link respect to the refueling device 100, which is correspondingly equipped with suitable communication system.

In another alternative variation of this example of Operation Mode II, the operator is stationed in the receiver aircraft 20 rather than in tanker aircraft 12, and Operation Mode II can be carried out in a similar; manner to that described above for the first example, mutatis mutandis, with the main difference that the operator receives the data relating to the spatial disposition of the refueling device at least with respect to the receiver aircraft 20 and the fuel receptacle 22 thereof, and provides control signals to the refueling device for controlling the flight thereof, via a suitable communications link with respect to the refueling device 100, and the receiver aircraft 20 and the refueling device 100 are each correspondingly equipped with a suitable communication system. Alternatively, in at least some circumstances, the operator can have the refueling device 100 in particular the boom member 130 and nozzle 135, and the fuel receptacle 22 in the operator's visual field of view, and does not require the aforesaid spatial disposition data in order to control the refueling device 100, and thus in such cases the refueling device 100 can omit the imaging system 150.

Clearly, Operation Mode II can be applied to other variations of the first example of refueling device 100, or to the second example of refueling device 200 or alternative variations thereof, in a similar manner to that described above for the first example of refueling device 100, mutatis mutandis.

It is to be noted that according to Operation Mode I and/or Operation Mode II, the refueling unit can be selectively controlled to adopt an aligned configuration with the hose 52. By way of non-limiting example, such a situation is illustrated in FIG. 2 for the fuselage-mounted system 50. Such a configuration can include controlling the spatial control system 160 to align the longitudinal axis 111 with the forward direction A in the case of the first example of refueling device 100 or alternative variations thereof, or maintaining the boom 230 in a retracted configuration accommodated in body 210 in the case of the second example of refueling device 200 or alternative variations thereof, for example.

Operation Mode III

In this operation mode, the tanker aircraft 12 and receiver aircraft 20 are maneuvered to be in close proximity and flying in formation, with the receiver aircraft 20 at a position behind the tanker aircraft 12. It is first ensured that the refueling device 100 is being towed behind the tanker aircraft 12 at a suitable distance therefrom, and an operator (typically in the tanker aircraft) can control this spacing by extending or retracting the hose 52 with respect to the tanker aircraft 12.

In a first example of Operation Mode III, the refueling device 100 is not flown or controlled per se, but attains a stable configuration with the boom member 135 at the required angle with respect to the forward direction A, design angle $\theta_{des}$. Accordingly the refueling device 100 can optionally omit the controllable spatial control system 160, and instead comprises a suitable configuration that provides stability to the boom member 135 at this spatial disposition.

The receiver aircraft 20 maneuvers to a position where it can engage the nozzle to the receiver aircraft fuel receptacle, and when an operator in the receiver aircraft (for example the pilot) determines that the nozzle 135 is properly aligned with the fuel receptacle 22 and sufficiently close thereto, the operator provides a suitable control signal to the refueling device 100 to activate the force generating arrangement 190, i.e., by deploying the air brakes 195, 196, generating a force along boom axis 131 that effectively pushes the nozzle into engagement with the receptacle 22. Thereafter, the air brakes 195, 196 are retracted, fuel is pumped to the receiver aircraft 20 from the tanker aircraft 12, and the refueling device 100 maintains the required design angle $\theta_{des}$ between then boom axis 131 and the forward direction A during refueling.

The receiver aircraft can comprise a display device for suitably displaying data relating to the spatial disposition of the refueling device at least with respect to the receiver aircraft 20 and the fuel receptacle 22 thereof.

For example, and referring to refueling device 100 according to the first example or alternative variations thereof, the display device can comprise a screen display that displays to the operator (for example the pilot or navigator of the receiver aircraft) real time images (2D, and/or stereoscopic images, and/or 3D images), for example in video streams, provided by the imaging system 150. Additionally or alternatively, such imaging can be provided or augmented via suitable cameras or other imaging units, provided on the tanker aircraft 12 and/or the receiver aircraft 20 and/or any other suitable air vehicle in the vicinity of the refueling device 100, and thus in at least some such examples the refueling device 100 can omit the imaging system 150.

Alternatively, in at least some circumstances, the operator can have the refueling device 100 in particular the boom member 130 and nozzle 135, and the fuel receptacle 22 in the operator's visual field of view, and does not require the aforesaid spatial disposition data, and thus in such examples the refueling device 100 can omit the imaging system 150.

In at least some circumstances, the operator/pilot can maneuver the receiver aircraft 12 such as to provide a suitable force via the fuel receptacle 22 to engage the nozzle 135 thereto, or alternatively the receiver aircraft can comprise a suitable arrangement configured for engage the nozzle 135 to the fuel receptacle 22 without the need to generate such a force, and thus in such examples the refueling device 100 can omit the force generating arrangement 190.

Once refueling is completed, the operator disengages the nozzle 135 from the fuel receptacle 22 and the receiver aircraft 20 maneuvers to at least a safe position spaced from the refueling device 100, and the refueling device 100 can be retracted back into the tanker aircraft 12, or reused with another receiver aircraft 20.

It is to be noted that Operation Mode III can be carried out with each of the plurality of refueling systems 50 of the tanker aircraft 12.

Clearly, Operation Mode III can be applied to other variations of the first example of refueling device 100, or to the second example of refueling device 200 or alternative variations thereof in a similar manner to that described above for the first example of refueling device 100, mutatis mutandis.

Figure 32:
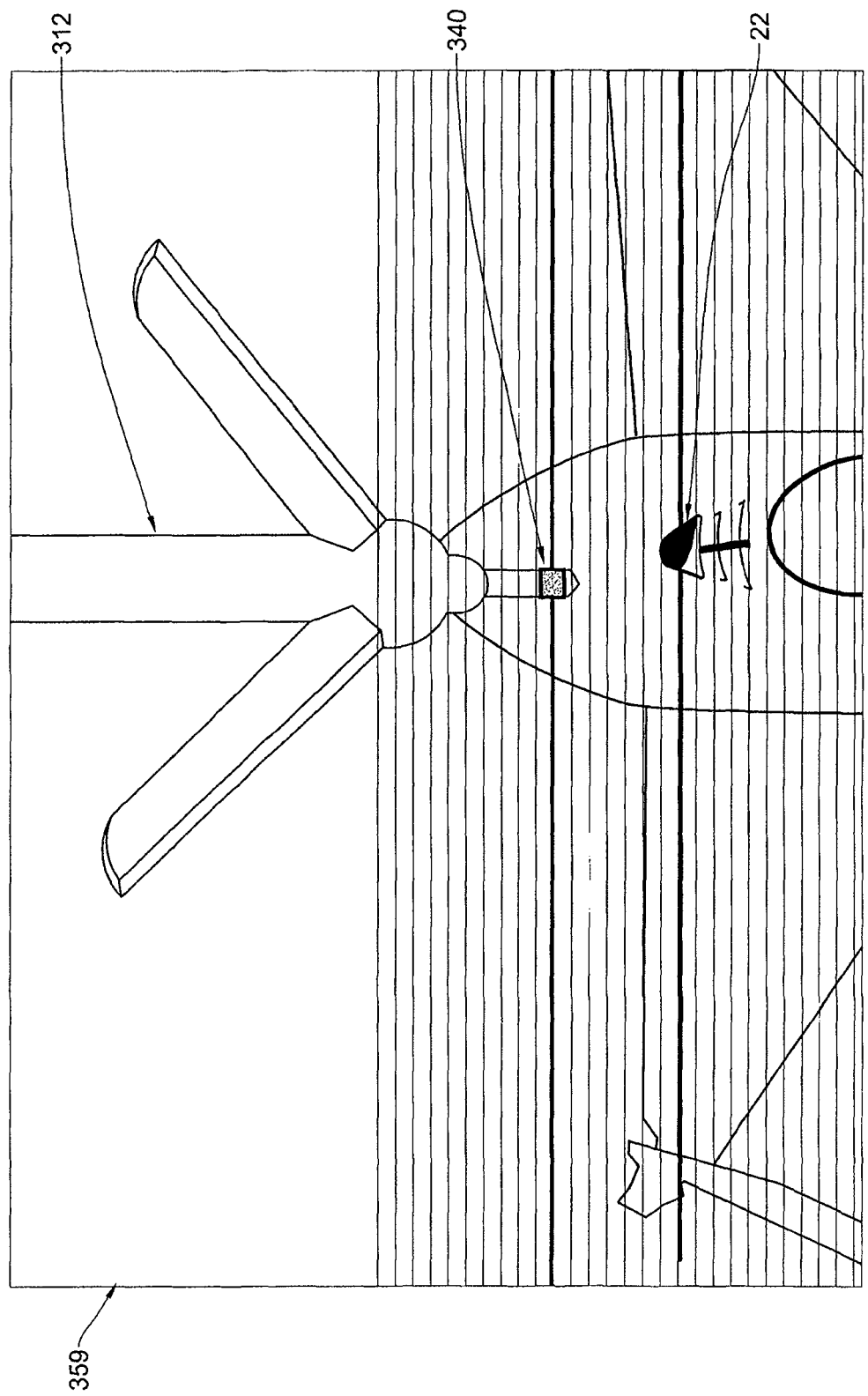
FIG. 32 is a schematic illustration of a scene sensed the LIDAR unit according to certain examples of the presently disclosed subject matter.

Reference is made to FIG. 32, showing a schematic illustration of a scene sensed by the LIDAR unit according to certain examples of the presently disclosed subject matter.

In this example, the LIDAR unit 351 scans the sensing volume 359, while at least one scan line intersects with the fuel receptacle 22 (or another recognizable part from which the position and orientation of the fuel receptacle 22 can be estimated) of the receiver aircraft 20 and at least one scan line intersects with a certain location on the boom member 312 (e.g. a boom tip marker 340 located thereon) or refueling device 100.

It is to be noted that although in this example the scan lines are horizontal alternative scan pattern can be used as well.

Figure 33:
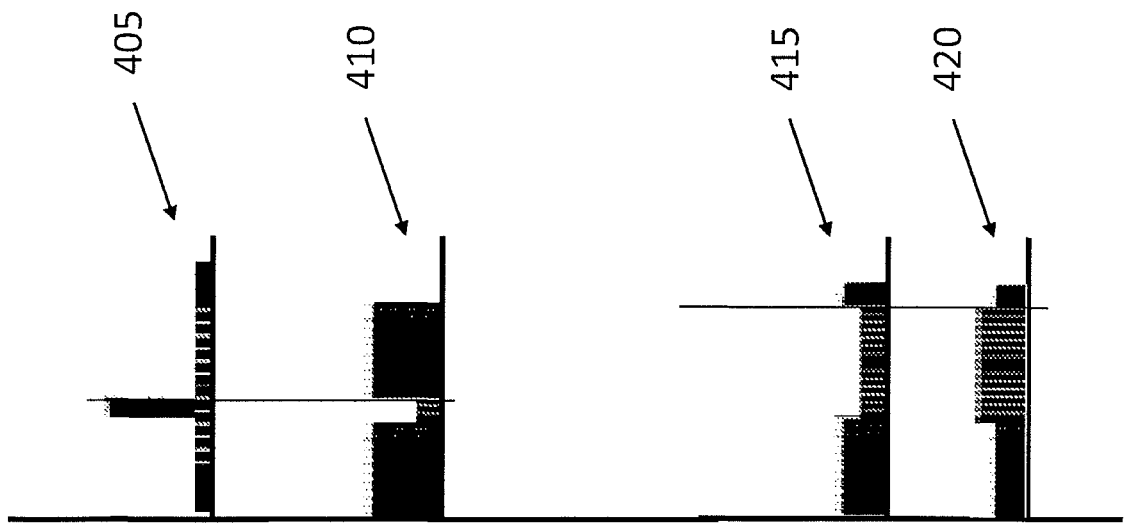
FIG. 33 is a schematic representation of the depth and electromagnetic data relating to the boom refueling device and to the fuel receptacle of the receiver aircraft as acquired by the LIDAR unit according to certain examples of the presently disclosed subject matter.

Turning to FIG. 33, there is shown a representation of the depth and electromagnetic data relating to the boom refueling device and to the fuel receptacle of the receiver aircraft as acquired by the LIDAR unit according to certain examples of the presently disclosed subject matter.

The boom fueling device 310 electromagnetic data, shown as element 405 in the figure, shows that at a certain area, having a certain width, within a certain scan line of the LIDAR unit 351, the electromagnetic value was higher than the electromagnetic value in its surrounding area, thus indicating that the boom member 312 (or, sometimes, more specifically, boom tip marker 340) is located in this area. As indicated above, in some cases the intensity can be affected, for example, by a fuel receptacle marker 342 located at a pre-determined location on the boom member 312 and causing strong intensity reflection of the respective beam B2 when illuminated by beam B1, as compared with the reflection intensity obtained from other surfaces of the boom fueling unit 310, for example.

The boom fueling device 310 depth data, shown as element 410 in the figure, shows that at a certain area, having a certain width, within a certain scan line of the LIDAR unit 351, the depth value was lower than the depth value in its surrounding area, thus also indicating that the boom member 312 is located in this area. The area in which the boom member 312 is located is closer to the LIDAR unit 351 in comparison to its surrounding area, and thus the time interval between the outgoing beams and the return beams associated with the area comprising the boom member 312 is lower than the time interval between the outgoing beams and the return beams associated with areas surrounding it.

The fuel receptacle 22 electromagnetic data, shown as element 415 in the figure, shows that at a certain area, having a certain width, within a certain scan line of the LIDAR unit 351, the electromagnetic value was lower than the electromagnetic value in its surrounding area, thus indicating that the fuel receptacle is located in this area. The electromagnetic value is lower at that area, for example since the fuel receptacle 22 located within the corresponding area is deeper than its surrounding area.

As indicated above, in some cases the intensity can be affected by a fuel receptacle marker 342 comprised on the receiver aircraft 20 in a pre-determined location with respect to the fuel receptacle 22 thereof and causing strong intensity reflection of the respective beam B2 when illuminated by beam B1, as compared with the reflection intensity obtained from other surfaces of the receiver aircraft 20, for example.

The fuel receptacle 22 depth data, shown as element 420 in the figure, shows that at a certain area, having a certain width, within a certain scan line of the LIDAR unit 351, the depth value was higher than the depth value in its surrounding area, thus also indicating that the fuel receptacle 22 is located in this area. The area in which the fuel receptacle 22 is located is farther from the LIDAR unit 351 in comparison to its surrounding area, and thus the time interval between the outgoing beams and the return beams associated with the area comprising the boom member 312 is lower than the time interval between the outgoing beams and the return beams associated with areas surrounding it.

It is to be noted that, as any person of ordinary skill in the art can appreciate, the depths and width of the fuel receptacle depth data and/or the boom fueling device depth data can enable calculation of the spatial dispositions of the fuel receptacle 22 and/or the boom fueling device 310 (and its tip) with respect to the fuel tanker 12 and with respect to each other.

It is to be further noted that the boom fueling device 310 electromagnetic data shown as element 405, the boom fueling device 310 depth data shown as element 410, the fuel receptacle 22 electromagnetic data shown as element 415 and the fuel receptacle 22 depth data shown as element 420 can be compared with pre-stored look-up tables comprising reference depth data and reference electromagnetic data relating to reference spatial dispositions with respect to the receiver aircraft, optionally based on the type of the receiver aircraft 20 (e.g. F-15, F-16, etc.), thus enabling calculation of various spatial relationships, e.g. between any two of the following: the boom fueling device 310, the fuel receptacle 22, the refueling device 100, the receiver aircraft 20, the engagement enabling position, the engagement area.

It is to be further noted that although the description of FIG. 33 refers to a boom fueling device 310 the same also applies to a non-aircraft-fixed in-flight refueling system (e.g. refueling device 100, etc.).

In the method claims that follow, alphanumeric characters and Roman numerals used to designate claim steps are provided for convenience only and do not imply any particular order of performing the steps.

It should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A refueling device for use in in-flight refueling operation, the refueling device comprising:
    a body;
    a boom member; and
    a coupling, wherein:
    (a) the body has a longitudinal axis and is configured for enabling towing of the refueling device by a tanker aircraft via a flexible fuel hose at least during the in-flight refueling operation, and comprising a fuel delivery lumen configured for fluid communication with said flexible fuel hose at least during the in-flight refueling operation, said boom member having a boom axis and accommodating at least a part of said lumen, wherein said lumen is configured to enable transfer of fuel from the flexible fuel hose to a receiver aircraft during said in-flight refueling operation; and
    (b) said coupling having a hose interface configured for connecting said lumen to the flexible fuel hose, said coupling configured for allowing relative rotation between the flexible fuel hose and said body in at least one degree of freedom while maintaining said fuel communication;
    wherein said boom member is pivotably movable with respect to said body independently of said coupling.

2. The refueling device according to claim 1, wherein said coupling is configured for allowing relative rotation between the flexible fuel hose and said body in at least two degrees of freedom.

3. The refueling device according to claim 1, wherein said coupling is configured for allowing relative rotation between the flexible fuel hose and said body in three degrees of freedom.

4. The refueling device according to claim 1, wherein said at least one degree of freedom has the respective axis of rotation generally orthogonal to said boom axis.

5. The refueling device according to claim 1, wherein said coupling comprises a universal coupling.

6. The refueling device according to claim 1, wherein at least during said in flight refueling operation the boom axis is at a non-zero angular displacement with respect to the longitudinal axis of the body.

7. The refueling device according to claim 1, wherein said boom member is pivotably mounted with respect to said body, and wherein said boom member is pivotable between a retracted position and a deployed position, wherein in said retracted position said boom axis is at a smaller angular disposition with respect to said longitudinal axis than in said deployed position.

8. The refueling device according to claim 7, wherein in said deployed position said boom axis is at an angular disposition with respect to said longitudinal axis between 20° to 40°.

9. The refueling device according to claim 7, wherein said boom member is in said deployed position during said in-flight refueling operation.

10. The refueling device according to claim 1, wherein said the boom member includes a fuel delivery nozzle, configured for engaging with a fuel receptacle of the receiver aircraft to enable refueling of the receiver aircraft.

11. The refueling device according to claim 1, further, comprising a spatial control system configured for selectively steering said refueling device.

12. The refueling device according to claim 11, wherein said spatial control system is configured for selectively providing control moments in at least one of pitch, yaw and roll wherein to enable flight of the refueling device while towed by the tanker aircraft in a forward direction via said flexible fuel hose.

13. The refueling device according to claim 11, wherein said spatial control system is configured for enabling steering of the refueling device in one, or two, or three degrees of freedom in translation, and in one, or two, or three degrees of freedom in rotation, independently of the tanker aircraft or of the refueling aircraft.

14. The refueling device according to claim 11, wherein said spatial control system comprises selectively controllable aerodynamic control system.

15. The refueling device according to claim 14, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces.

16. The refueling device according to claim 1, further comprising an aerodynamic stabilizer arrangement, distinct from the spatial control system.

17. The refueling device according to claim 16, wherein said aerodynamic stabilizer arrangement is in the form of a drogue structure having a stowed configuration, in which drogue structure generates a minimum drag, and a deployed configuration in drogue structure generates greater drag than in the inactive configuration.

18. The refueling device according to claim 1, further comprising a force generating arrangement configured for selectively generating a force along said boom axis in a direction towards said fuel delivery nozzle.

19. The refueling device according to claim 1, further comprising a data acquisition system configured for providing spatial data relating to a relative spatial disposition between said fuel delivery nozzle and said fuel receptacle, to enable selectively controlling the refueling device to provide automatic or autonomous or manual engagement of the fuel delivery nozzle to the fuel receptacle of the receiver aircraft.

20. The refueling device according to claim 1, further comprising a controller for controlling operation of the refueling device.

21. A refueling system for use in in-flight refueling operation, the refueling system comprising:
    a refueling fuel reservoir connected to a refueling device via a flexible fuel hose, the refueling device including a body, a boom member, and a coupling, wherein:
      (a) the body has a longitudinal axis and is configured for enabling towing of the refueling device by a tanker aircraft via the flexible fuel hose at least during in-flight refueling operation, and comprising a fuel delivery lumen configured for fluid communication with said flexible fuel hose at least during the in-flight refueling operation, said boom member having a boom axis and accommodating at least a part of said lumen, wherein said lumen is configured to enable transfer of fuel from the flexible fuel hose to a receiver aircraft during said in-flight refueling operation; and
      (b) said coupling having a hose interface configured for connecting said lumen to the flexible fuel hose, said coupling configured for allowing relative rotation between the flexible fuel hose and said body in at least one degree of freedom while maintaining said fuel communication;
    wherein said boom member is pivotably movable with respect to said body independently of said coupling.

22. A tanker aircraft, comprising:
at least one refueling system including a refueling fuel reservoir connected to a refueling device via a flexible fuel hose, said refueling device including a body, a boom member, and a coupling, wherein:
    (a) the body has a longitudinal axis and is configured for enabling towing of the refueling device by the tanker aircraft via the flexible fuel hose at least during the in-flight refueling operation, and comprising a fuel delivery lumen configured for fluid communication with said flexible fuel hose at least during the in-flight refueling operation, said boom member having a boom axis and accommodating at least a part of said lumen, wherein said lumen is configured to enable transfer of fuel from the flexible fuel hose to a receiver aircraft during said in-flight refueling operation; and
    (b) said coupling having a hose interface configured for connecting said lumen to the flexible fuel hose, said coupling configured for allowing relative rotation between the flexible fuel hose and said body in at least one degree of freedom while maintaining said fuel communication;
wherein said boom member is pivotably movable with respect to said body independently of said coupling.

* * * * *